(12) United States Patent
Hunt et al.

(10) Patent No.: US 8,254,651 B2
(45) Date of Patent: Aug. 28, 2012

(54) REGIONS OF INTEREST PROCESSING

(75) Inventors: Brandon T. Hunt, Seattle, WA (US); Ernst S. Henle, Issaquah, WA (US); Andrey Bondarenko, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 12/605,277

(22) Filed: Oct. 23, 2009

(65) Prior Publication Data

US 2010/0106426 A1  Apr. 29, 2010

Related U.S. Application Data

(60) Provisional application No. 61/107,988, filed on Oct. 23, 2008.

(51) Int. Cl.
*G06K 9/00* (2006.01)
*G01N 33/53* (2006.01)

(52) U.S. Cl. ............... 382/128; 382/274; 435/7.2

(58) Field of Classification Search ............ 382/100, 382/103, 128–134, 154, 162, 168, 173, 181, 382/190, 191, 199, 203, 219, 224, 232, 254, 382/274, 276, 278, 286, 291, 305, 312; 435/7.21
See application file for complete search history.

(56) References Cited

U.S. PATENT DOCUMENTS

| | | | | |
|---|---|---|---|---|
| 6,165,734 A | * | 12/2000 | Garini et al. | 435/7.21 |
| 6,181,811 B1 | * | 1/2001 | Kuan et al. | 382/133 |
| 8,116,551 B2 | * | 2/2012 | Gallagher et al. | 382/133 |
| 2004/0108452 A1 | | 6/2004 | Graber et al. | |
| 2004/0156854 A1 | | 8/2004 | Mulligan et al. | |
| 2010/0104153 A1 | * | 4/2010 | Hunt et al. | 382/128 |

FOREIGN PATENT DOCUMENTS

| | | |
|---|---|---|
| EP | 1 577 823 A1 | 9/2005 |
| GB | 2 403 342 A | 12/2004 |
| WO | WO 01/33573 A1 | 5/2001 |
| WO | WO 01/45046 A1 | 6/2001 |
| WO | WO 2007/059117 A2 | 5/2007 |
| WO | WO 2007059117 A2 * | 5/2007 |

OTHER PUBLICATIONS

European Search Report dated Apr. 12, 2010, for related Application Serial No. EP 09 17 3923.5, 10 pages.*
Reichenbach, et al., Image background removal in comprehensive two-dimensional gas chromatography Journal of Chromatography A, 985:47-56 (2003).*

* cited by examiner

*Primary Examiner* — Seyed Azarian
(74) *Attorney, Agent, or Firm* — Klarquist Sparkman, LLP

(57) ABSTRACT

After prepared biological samples have been submitted to liquid-chromatography/mass spectrometry equipment, digital images are produced that show variations. Some of these variations may be of interest while others are not of interest. Variations in regions of interest can be correlated and correlation scores produced to classify biological features aid in scientific discovery. Shape properties of variations can also be calculated by geometric scores. A microalignment method aids the correlation calculation without resorting to macroalignment.

20 Claims, 61 Drawing Sheets

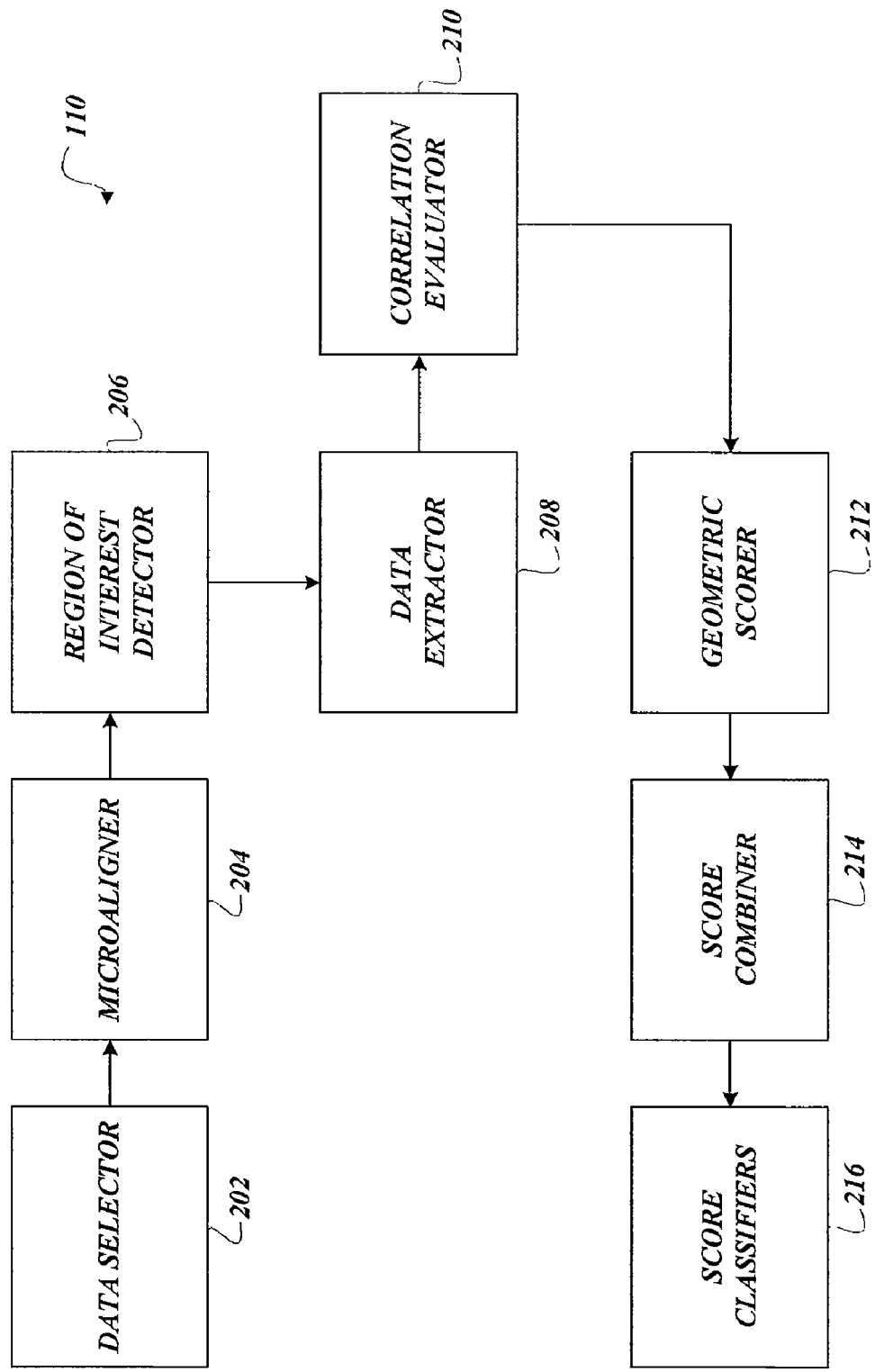

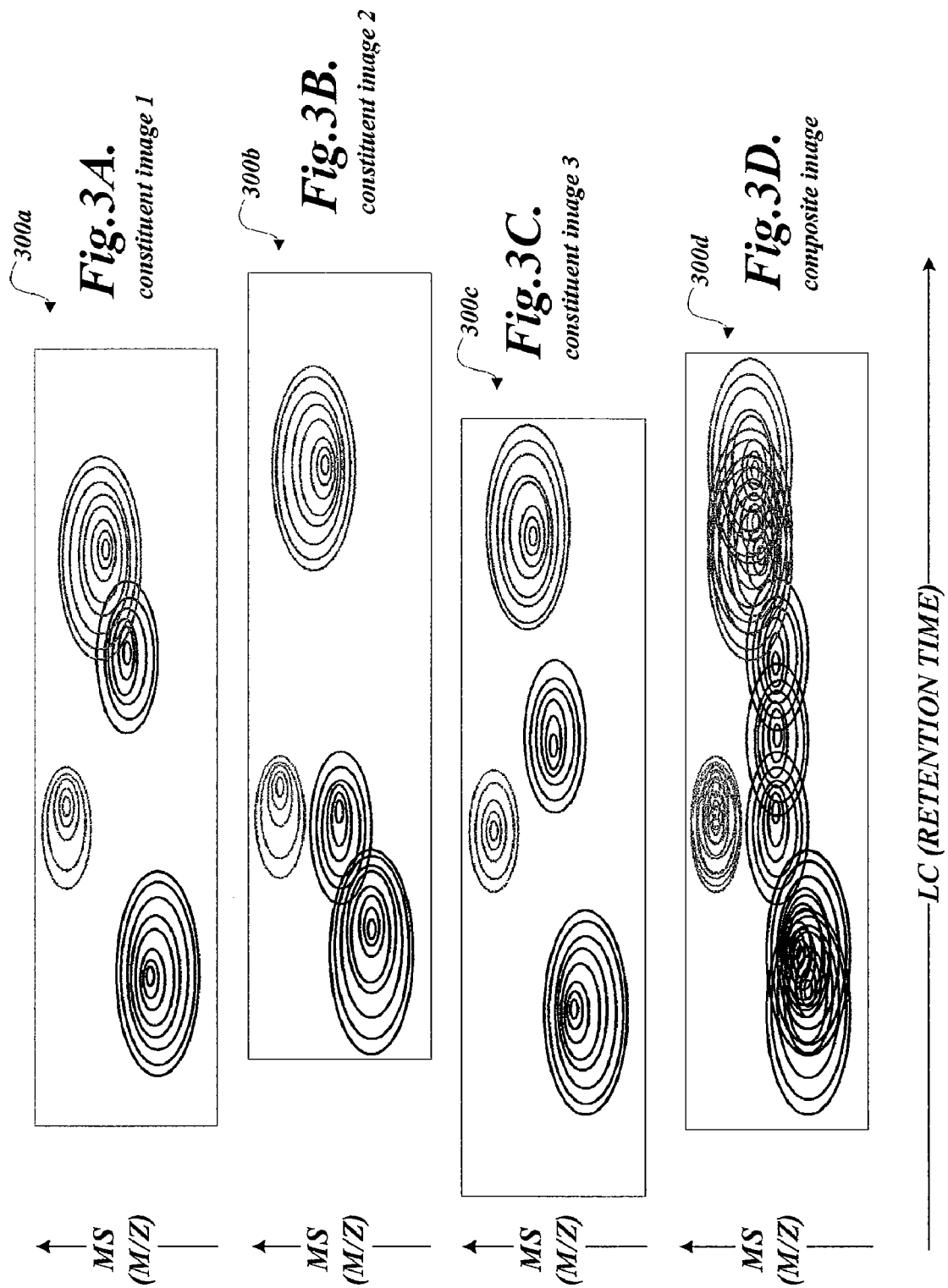

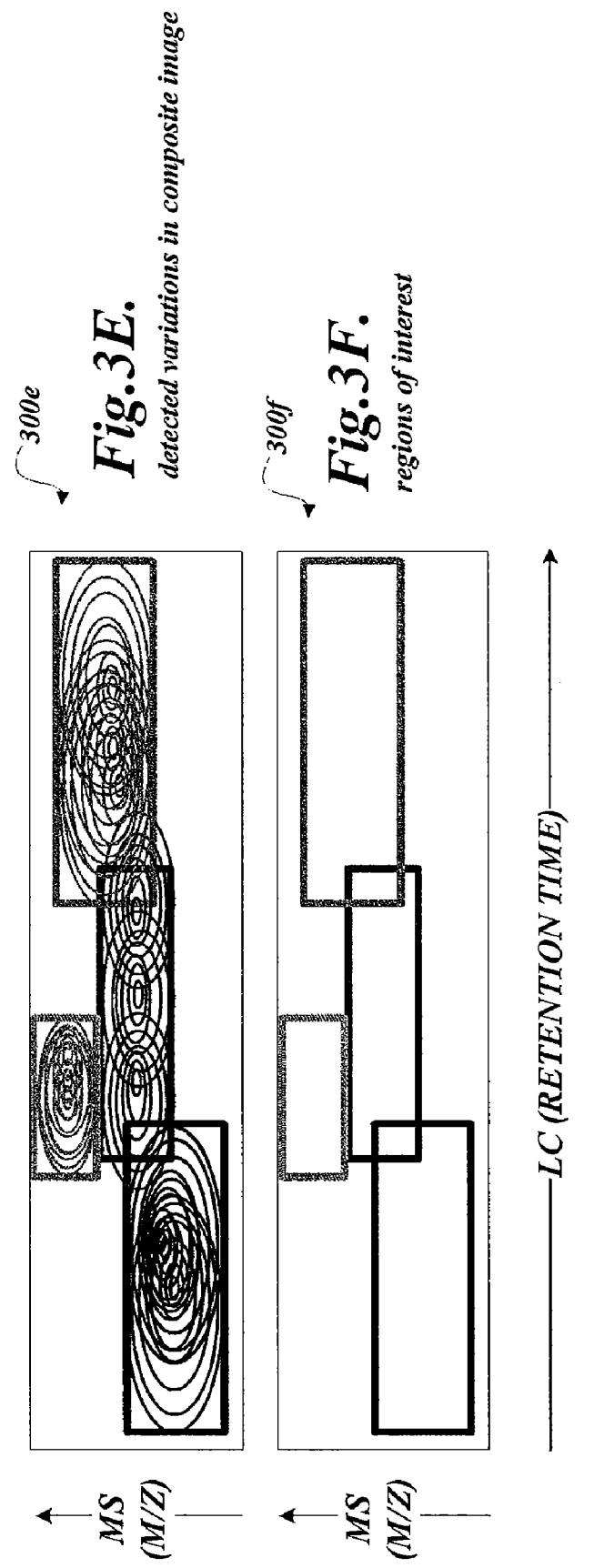
Fig. 3E. detected variations in composite image
Fig. 3F. regions of interest

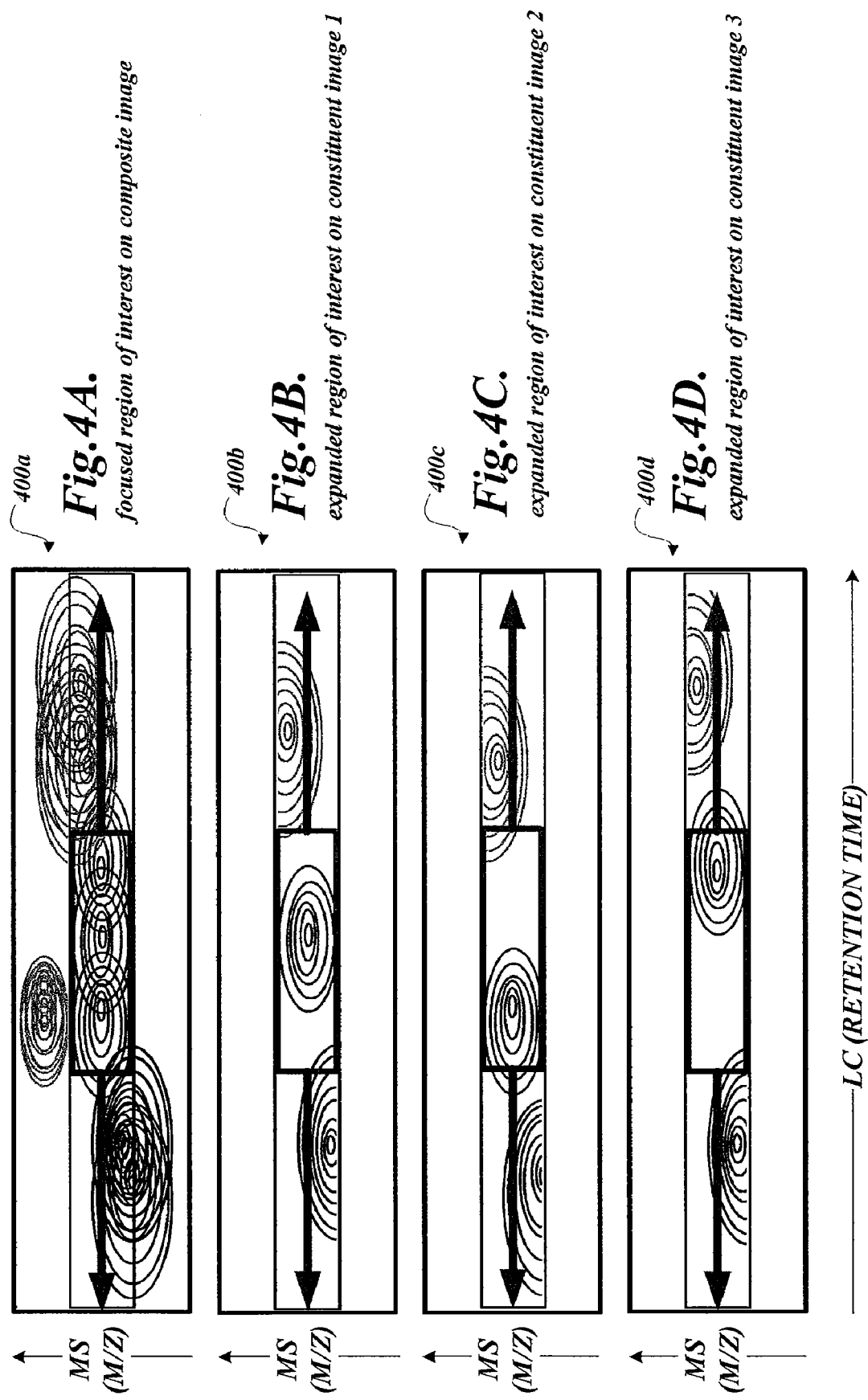

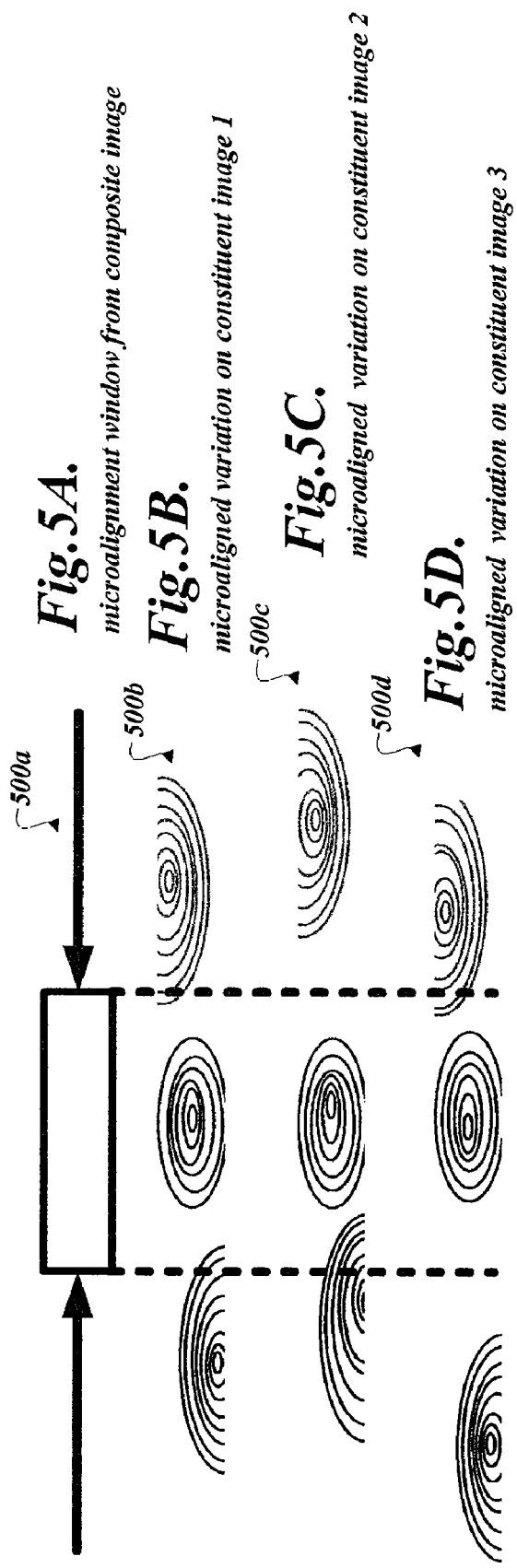
Fig.5A. microalignment window from composite image
Fig.5B. microaligned variation on constituent image 1
Fig.5C. microaligned variation on constituent image 2
Fig.5D. microaligned variation on constituent image 3

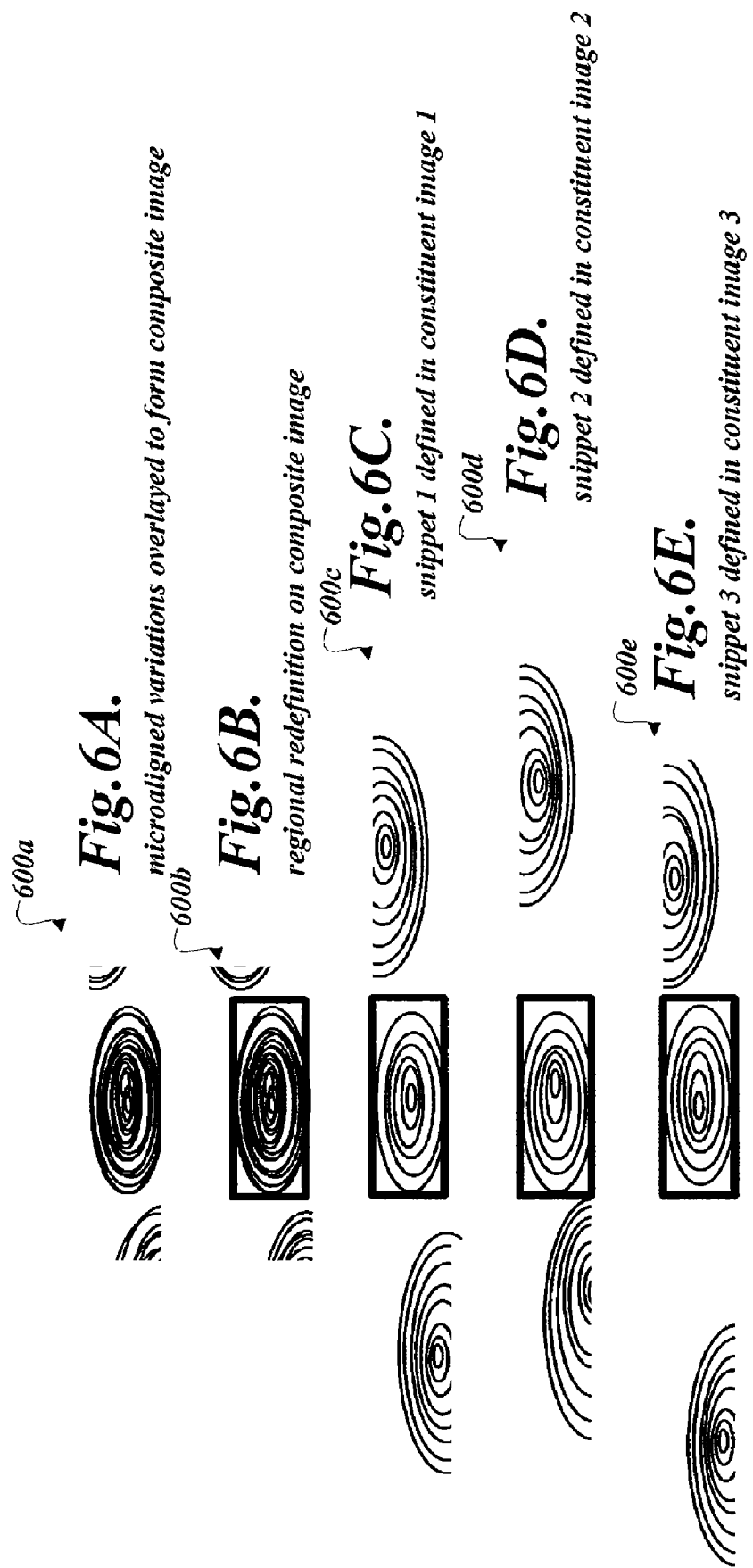

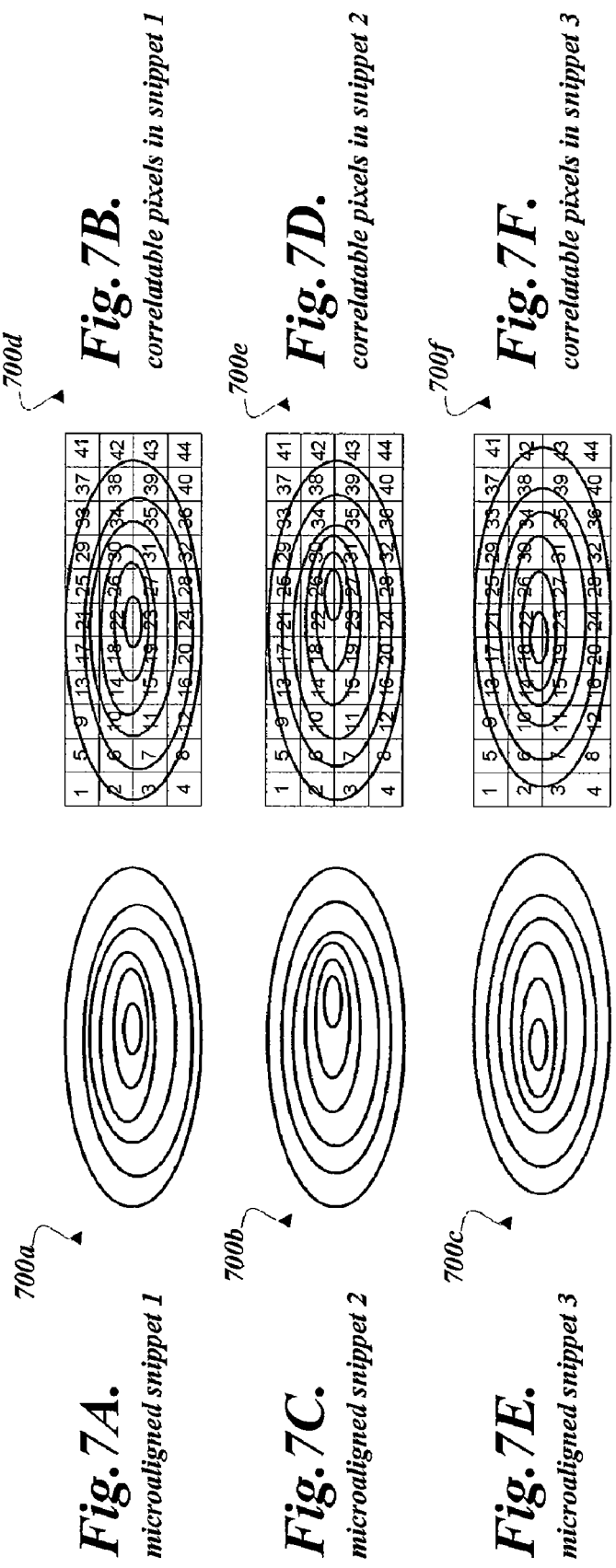

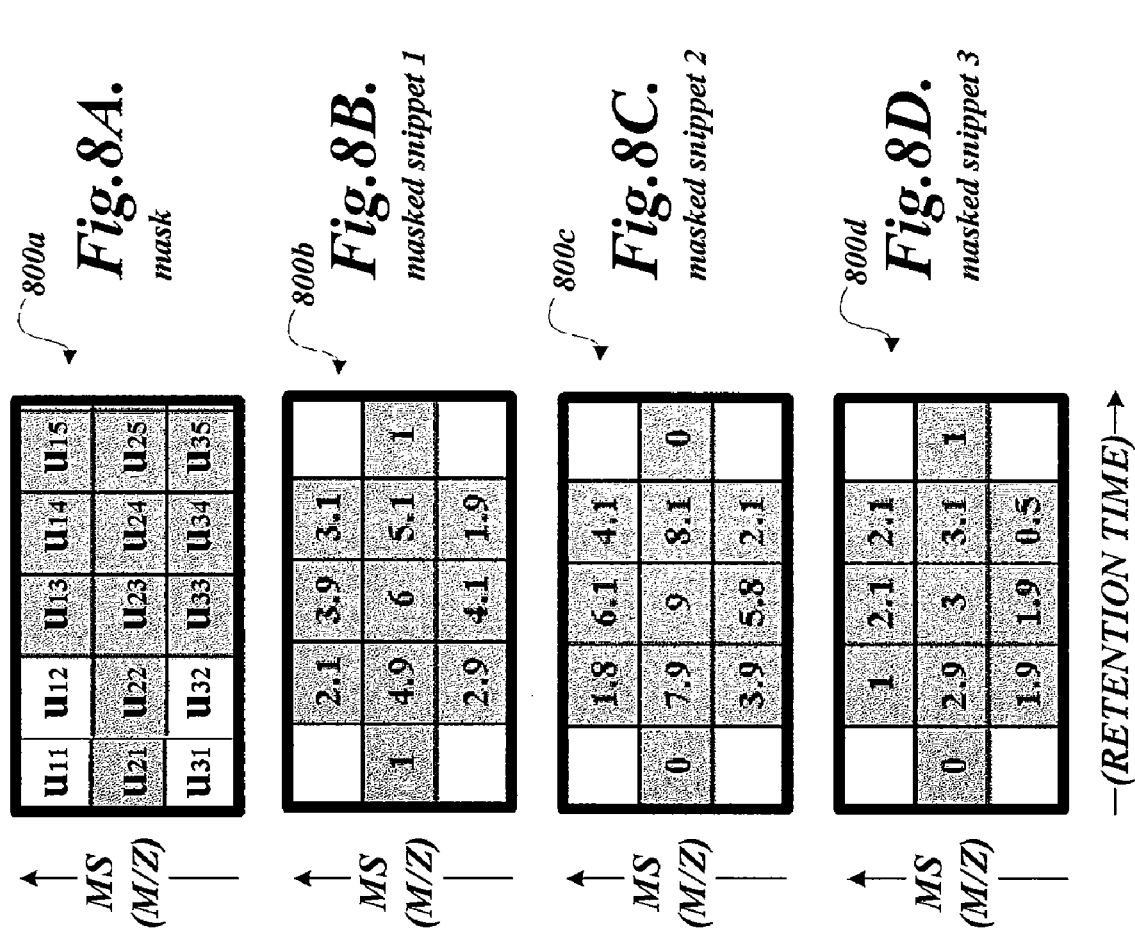

| Mask Pixel | Snippet 1 | Snippet 2 | Snippet 3 | Consensus |
|---|---|---|---|---|
| U21 | 1.0 | 0.0 | 0.0 | 0.3 |
| U12 | 2.1 | 1.8 | 1.0 | 1.7 |
| U22 | 4.9 | 7.9 | 2.9 | 5.3 |
| U32 | 2.9 | 3.9 | 1.9 | 3.0 |
| U13 | 3.9 | 6.1 | 2.1 | 4.0 |
| U23 | 6.0 | 9.0 | 3.0 | 6.0 |
| U33 | 4.1 | 5.8 | 1.9 | 4.0 |
| U14 | 3.1 | 4.1 | 2.1 | 3.0 |
| U24 | 5.1 | 8.1 | 3.1 | 5.3 |
| U34 | 1.9 | 2.1 | 0.5 | 1.7 |
| U25 | 1.0 | 0.0 | 1.0 | 0.7 |

Fig. 9.

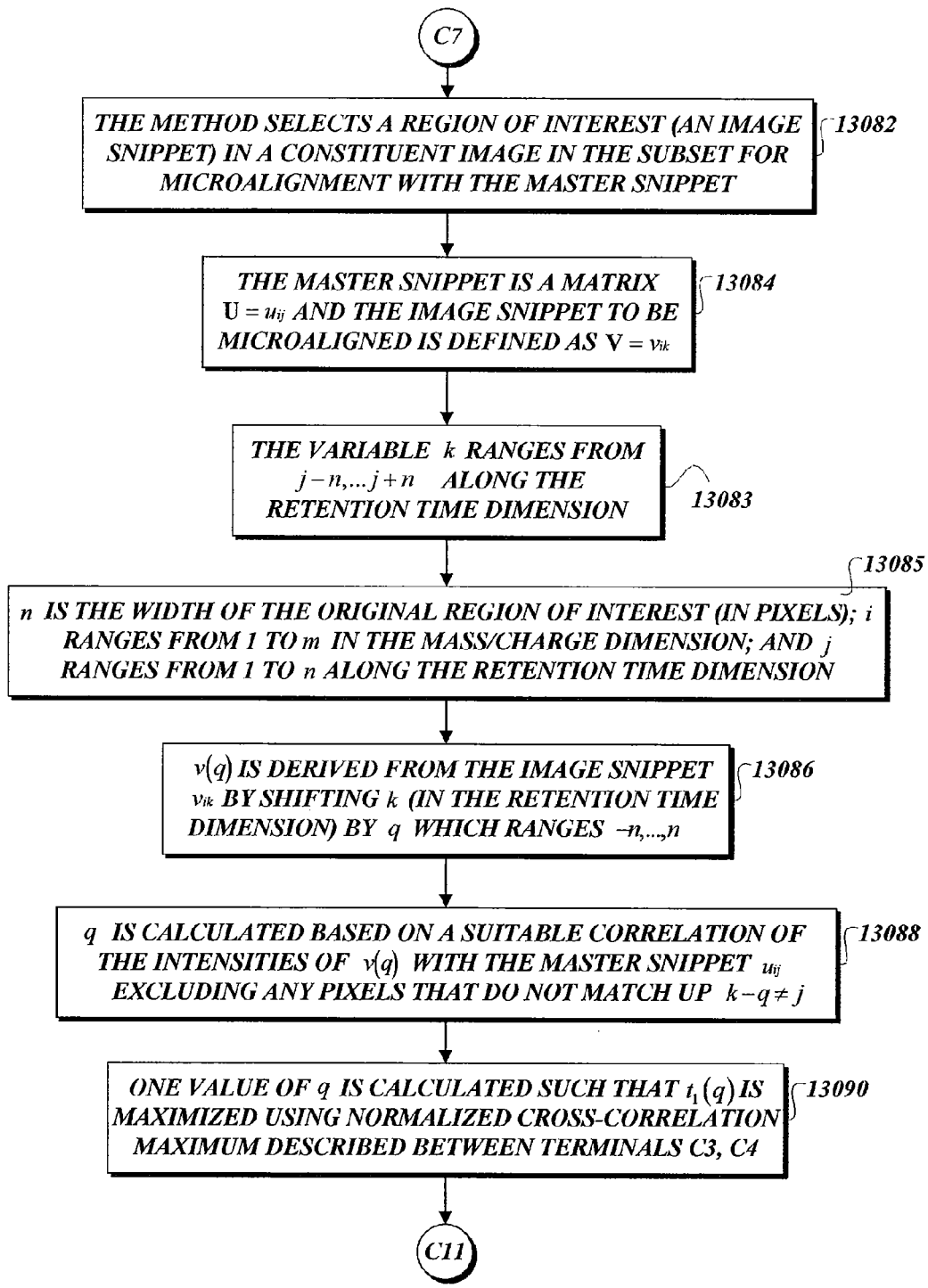
Fig.13I1.

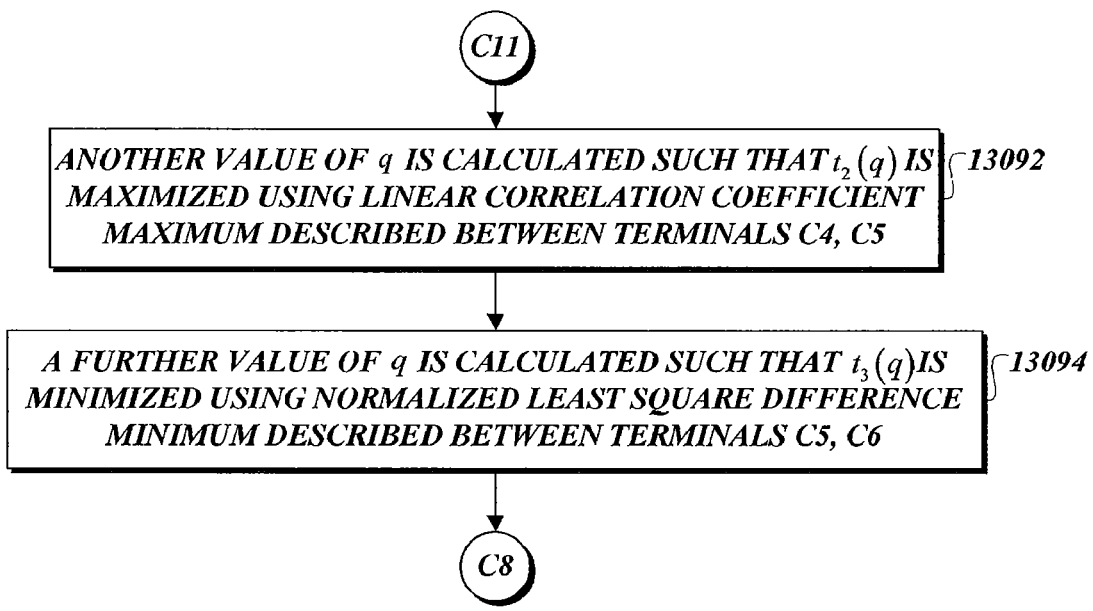
Fig.1312.

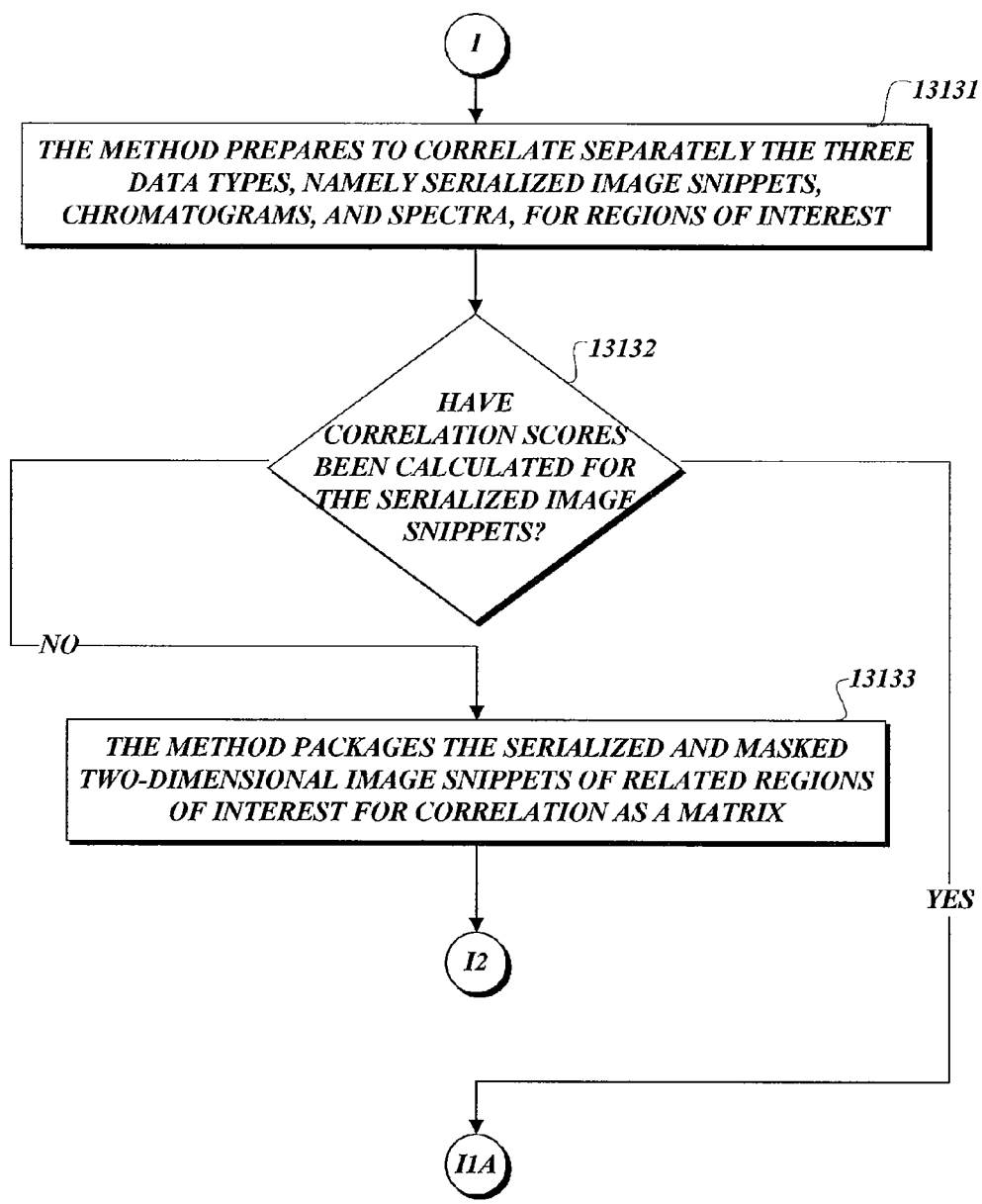
Fig.13N1.

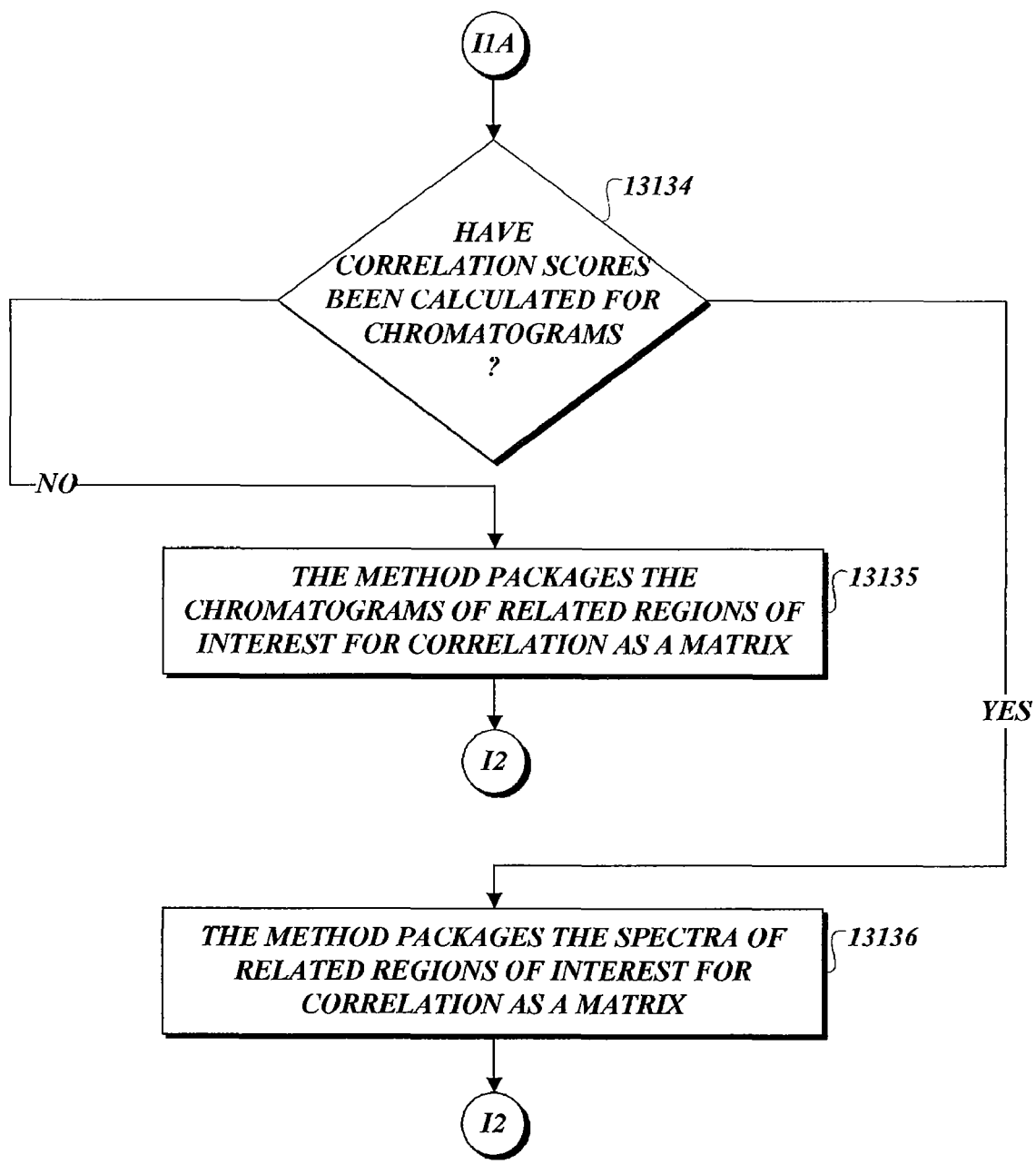
Fig.13N2.

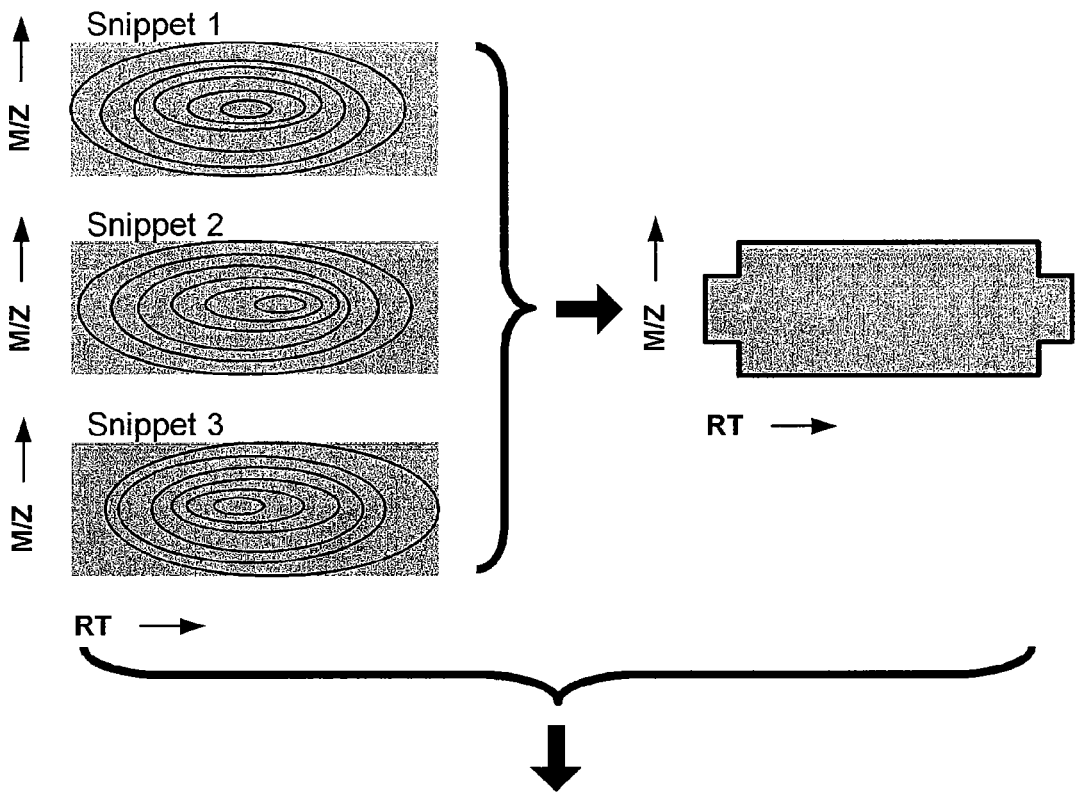
The mask is applied to each snippet. As a consequence, the regions within the masked snippets are comparable.
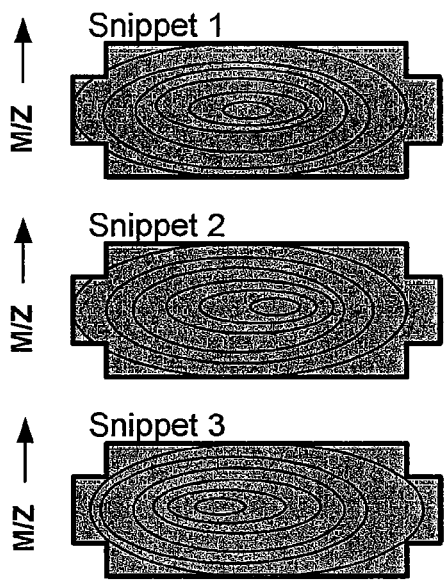
*Fig.14K.*

REGIONS OF INTEREST PROCESSING

CROSS REFERENCE TO RELATED APPLICATION

The present application claims the benefit of U.S. Provisional Application 61/107,988, filed Oct. 23, 2008, which is incorporated herein by reference.

BACKGROUND

Analysis of biological specimens is difficult in view of the complex mixtures of components such specimens contain. Most analytical instruments are unable to completely separate the effects of one component from another, and often the associated signals can be small, or concentrations low. Thus, overlapping, noisy signals are common, requiring considerable study be an analysis to reveal any useful information. Such human study can be slow and subjective, and important features can be easily disregarded or overlooked. In some cases, application of conventional analysis techniques can introduce errors. Thus, improved analytical methods and apparatus are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a region of interest processor, which comprises a microaligner configured to align a region of interest in a constituent image with the corresponding region of interest in the other constituent image without having to align any other regions of interest in the constituent images. The region of interest processor further includes a correlation evaluator configured to produce a correlation score that is indicative of a reliability of variations found in the regions of interest and therefore pointing to a potential biological feature of interest.

Another aspect of the present subject matter includes a method for processing regions of interest to discover biological features, which comprises microaligning a region of interest in a constituent image with the corresponding regions of interest in the other constituent images without having to macroalign regions of interest in any of the constituent images. The method further comprises calculating a correlation score for masked pixels in corresponding regions of interest, the correlation score indicating reliability of a variation in the regions of interest.

A further aspect of the present subject matter includes a computer-readable medium having computer-executable instructions stored thereon for implementing a method for processing regions of interest to discover biological features, which comprises microaligning a region of interest in a constituent image with another region of interest in another constituent image without having to macroalign regions of interest in the constituent image and the another constituent image. The method further comprises calculating a correlation score for masked pixels in the region of interest and masked pixels in the another region of interest, the correlation score indicating reliability of a variation in the regions of interest.

The foregoing and other objects, features, and advantages of the invention will become more apparent from the following detailed description, which proceeds with reference to the accompanying figures.

BRIEF DESCRIPTION OF THE DRAWINGS

The foregoing aspects and many of the attendant advantages of this subject matter will become more readily appreciated as the same become better understood by reference to the following detailed description, when taken in conjunction with the accompanying drawings, wherein:

FIG. 2 is a block diagram illustrating components of an exemplary region of interest processing subsystem.

FIGS. 3A-3D are pictorial diagrams illustrating time-warped constituent images, as well as a composite image, in accordance with one embodiment of the subject matter.

FIGS. 3E-3F are pictorial diagrams illustrating regions of interest detected from a composite image in accordance with one embodiment of the present subject matter.

FIGS. 4A-4D are pictorial diagrams illustrating an exemplary expansion process in accordance with one embodiment of the present subject matter.

FIGS. 5A-5D are pictorial diagrams illustrating an exemplary micro-alignment technique in accordance with one embodiment of the present subject matter.

FIGS. 6A-6E are pictorial diagrams illustrating a redefinition of regions of interest in accordance with one embodiment of the present subject matter.

FIGS. 7A-7F are pictorial diagrams illustrating portions of micro-aligned snippets for correlation in accordance with one embodiment of the present subject matter.

FIGS. 8A-8D are pictorial diagrams illustrating an exemplary mask and various masked snippets in accordance with one embodiment of the present subject matter.

FIG. 9 is a pictorial diagram illustrating an exemplary table containing constituent vectors derived by serializing image snippets and an exemplary consensus vector in accordance with one embodiment of the present subject matter.

DETAILED DESCRIPTION

Figure 1:
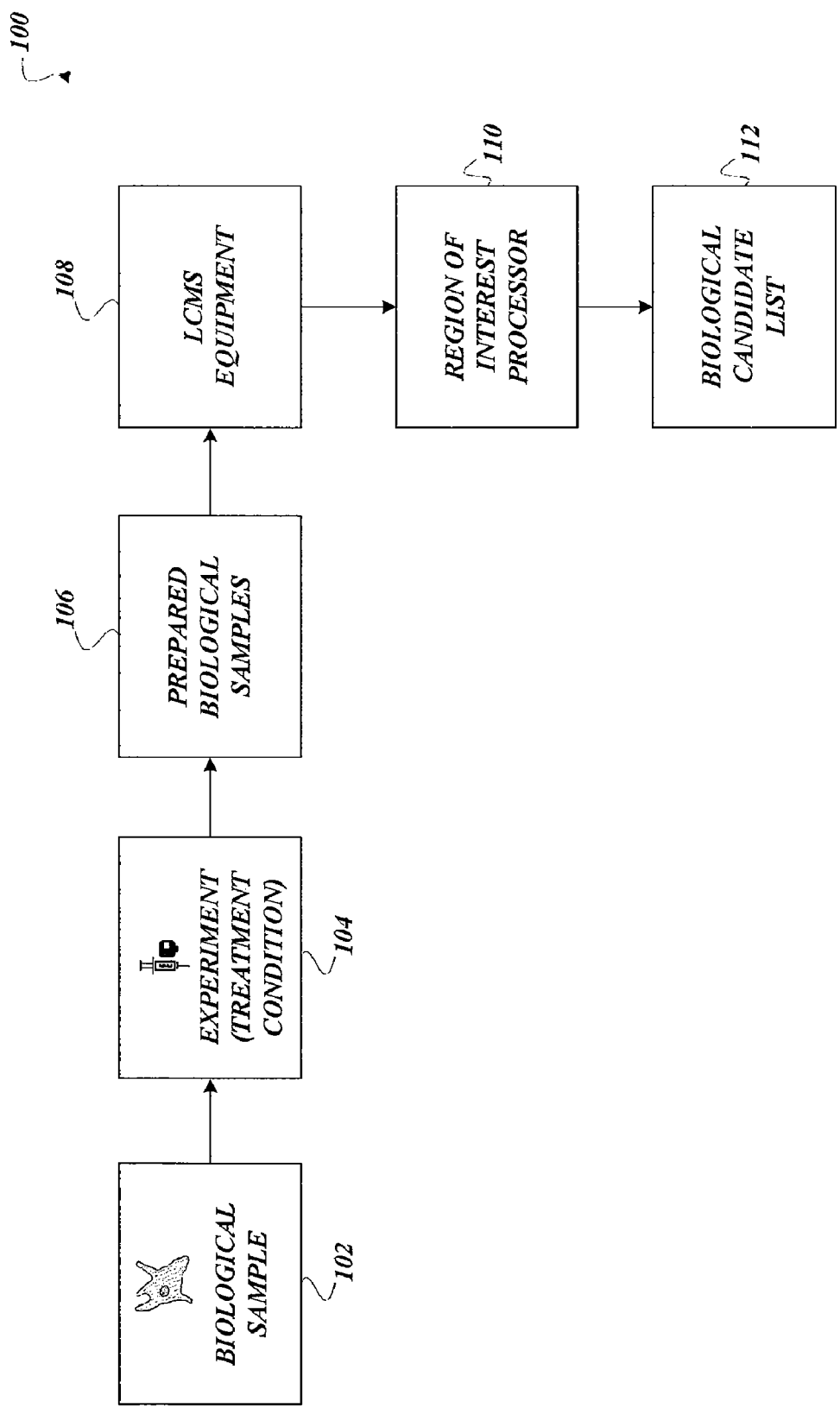
FIG. 1 is a block diagram illustrating components to process prepared biological samples to produce biological candidate lists to researchers.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed and methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, some mathematically based evaluation techniques are shown as multistep calculations. In other examples, such analyses are determined in one or more steps as is convenient. Such mathematical techniques are provided as examples, and additional techniques and modifications of the disclosed examples can also be used, and in some cases, provide simpler or more rapid computation.

Mass spectrometry can be coupled with other separation techniques such as liquid chromatography, gel electrophoresis, gas chromatography, and ion diffusion. Data obtained by combinations of such techniques can be represented as n-dimensional data sets. For example, a chromatographic retention time and a mass-to-charge ratio of a mass spectrum can be used as coordinates of first and second axes. Signal intensities associated with these coordinates can be represented as a two-dimensional array of data values, and such data can be referred to as images or image data.

Mass spectrometry and liquid chromatography are two important separation techniques that can be applied to the evaluation of biological samples, and LC/MS data sets (referred to herein as images or image data) are used in the following description, but other types of data can be used. Typical biological specimens include mixtures of proteins, carbohydrates, lipids, and metabolites, but other chemical or biological specimens can be similarly investigated, and the disclosed methods and apparatus can be applied to non-biological specimens as well.

Some examples of the disclosed methods and apparatus pertain to pharmaceutical research. Pharmaceutical medical research is often directed to determining biological chemicals that are an indicator of a physiological state, such as a disease state or a response to treatment with a medication. A set of one or more of such chemicals is called a biomarker. Biomarkers may be used to diagnose disease or other physiological states. Biomarkers can be used in a laboratory as substitutes for clinical endpoints, and such biomarkers are referred to as surrogate endpoints. Surrogate endpoints may be used to develop medicines without involving human or even animal subjects. Drug development may begin by testing for a surrogate endpoint in a test tube.

A common scenario is to process a biological specimen such as a biopsy specimen, blood, saliva, amniotic fluid, etc such that the complex chemical mixture associated with the specimen can be introduced into liquid chromatography/mass spectrometry instruments. The resulting data (signal intensity as a function of retention time and m/z ratio) is then used to identify the biochemicals in this complex mixture. The disclosed methods and apparatus permit identification of the more biologically relevant data by selecting only portions of the data. Specifically, the methods and apparatus permit identification of a signal of interest of one or more chemicals from the LC/MS data set, increased signal to noise ratio, typically by isolating or extracting the portion of the signal of interest from noise or other extraneous signals that can contaminate the signal of interest. Signal portions associated with one or more moieties can be removed or partially removed to permit investigation of additional signal features. For example, peaks associated with a particular moiety can be removed so that other peaks can be more clearly revealed.

Processing analytical data as disclosed provides superior isolation and identification and better quantification of chemicals in a complex mixture. A researcher can repeat this analysis process for healthy and diseased subjects and/or for untreated and treated subjects. Based on differences in chemicals constituents between a healthy and a diseased subject or between a treated and treated subject identified in this manner, a biomarker can be defined. In some cases, this biomarker can serve as a surrogate endpoint for use a substitute for a clinical endpoint. Such biomarkers may be used as diagnostic and treatment indicators in drug development.

Representative embodiments are described herein with respect to images based on liquid chromatography (LC) and mass spectrometry (MS). Typically, signal intensity is recorded as a function of LC retention time and MS mass-to-charge ratio (m/z), and this recorded signal intensity can be stored or processed as an image data array. For convenience herein, retention time is generally arranged along a horizontal (x-axis) and m/z is arranged along a vertical (y-axis). In other examples, other types of data are used instead of or in addition to LC retention time or m/z ratio. For example, gas chromatography (GC), ion spectroscopy, gel electrophoresis, ion diffusion, or mass spectroscopy time-of-flight data can be used.

In the following examples, analytical results associated with evaluation of biological samples are captured as digital images called replicates. Intensity variations are littered throughout the replicates. As noted above, conventional evaluation techniques are unable to identify corresponding relationships between various intensity variations among the replicates. While so-called "time warping" can be used to align these intensity variations to better identify those variations that are noise and reveal those intensity variations that are not noise, aligning some intensity variations results in the misalignment of other intensity variations, some of which might be important features.

FIG. 1 illustrates a system for processing biological samples so as to detect biological features. The system 100 receives one or more biological samples 102. Each biological sample 102 typically undergoes the same or similar treatment conditions or different treatment conditions 104. The system 100 forms prepared biological samples 106 based on the treatment, and such prepared biological samples 106 are further processed by the LC/MS equipment 108, which applies various liquid chromatography and mass spectrometry processing. The results of this processing are one or more LC/MS images, replicates, or constituent images that are directed to and further processed by a region of interest processor 110 that can be provided as one more hardware processing devices such as a dedicated processor and/or as software executing on one or more computing devices such a general purpose computer. Various scores based on the geometry and correlation of regions of interest allow the system 100 to classify biological features extracted from the prepared biological samples 106 by the LC/MS processing equipment 108 to produce a biological candidate list 112 that can be delivered to or displayed for one or more researchers for further investigation.

FIG. 2 illustrates the region of interest processor 110 in greater detail. The region of interest processor 110 includes a data selector 202. The data selector 202 selects a collection of images based on an experiment definition, based on these images' relationship to one or more experimental conditions, or based on these images' relationship to a biological variation, and so on. Each image in the collection of images may be referenced as an LC/MS (liquid chromatography/mass spectrometry) image or a replicate or a constituent image. The collection of constituent images includes various regions of interest defined by the data selector. The collection can be extracted from an image database, or the data selector can be coupled so LC/MS or other instrumentation (including specimen preparation instrumentation) so that appropriate images are produced.

Each region of interest can be defined in a variety of ways but all use suitable intensity variations to define a region of interest. Peak detection on a composite image is one suitable intensity variation that can be used to define a region of interest, and such a definition (boundary coordinates, area, and so on) is used to define regions of interest in the collection of constituent images, each image including a corresponding region of interest. These constituent images can be used to produce a composite image by a suitable technique, such as averaging or maximal projection of the constituent images to form the composite image. (In maximal projection, a maximum value associated with any of the constituent images at each x, y coordinate pair is selected as the intensity of the composite image.) Variations, such as spots, on the composite image determine feature boundaries. (As used herein, spots are intensity peaks that constitute a contiguous area in a constituent image.) The feature boundaries and a mask that are produced therefrom are used to identify corresponding regions of interest on other constituent images. Corresponding peaks from different constituent images typically overlap or are in close proximity on the composite image.

The region of interest processor 110 includes a microaligner 204. The microaligner 204 aligns in the retention time dimension to overcome an uncertainty or inadequate calibration associated with a liquid chromatography process. In one embodiment, the microaligner 204 aligns pixels of one region of interest and its corresponding regions of interest in the retention time dimension. Other parts of the constituent image and other regions of interest on the constituent image are not considered and are not affected even if these parts of regions of interest have the same retention time. This focus on a single region of interest at a time allows alignment that is not possible with conventional time warping.

The microaligner 204 aligns regions of interest in the constituent images whose boundaries are derived from a previously detected region of interest. The detection may have occurred using the composite image. Microalignment of regions of interest in the constituent images may aid in scoring; these scores reveal clues such as biological features or a lack of them that help in scientific discovery. Scoring may proceed without microalignment if the constituent images are already aligned. In some instances, redefining the boundaries of regions of interest after microalignment, such as by the region of interest detector 206, may help remove or minimize noise in the neighborhood of the region of interest.

The microaligner 204 may refine alignment of regions of interest even in the absence of a composite image. In this instance, regions of interest on various constituent images are identified if they correspond to each other on these constituent images. The microaligner 204 then aligns a set of corresponding regions of interest. One use of a composite image in microalignment is to associate regions of interest from multiple constituent images. If sets of corresponding regions of interest can be identified without a composite image, then those sets of corresponding regions of interest can be microaligned.

The region of interest processor 110 includes a region of interest detector 206. If microalignment has been executed, then the region of interest detector 206 can revise the detection of the original region of interest. The original region of interest may have been found in the composite image formed from constituent images that suffer from poor alignment. When the boundaries of the original region of interest are used to find regions of interest in the constituent images, these regions of interest may include pixels that are not of interest. Such pixels are noise, such as surrounding background and neighboring contaminates to be contrasted with a signal that includes pixels of interest. By creating a composite snippet (a portion of a composite image such as a region of interest), the original region of interest can be redefined such that it is more likely to include more of pixels of interest and fewer pixels not of interest, such as noise. With less noise, the signal becomes better identified and enables better scoring to reveal biological clues leading to scientific discovery.

The region of interest processor 110 includes a data extractor 208. A two-dimensional mask is created to describe locations of pixels of interest in the redefined original region of interest in the composite snippet. The two-dimensional mask is used to get corresponding regions of interest (image snippets), each corresponding to a region of interest of a constituent image. If microalignment has been executed, the use of pre-microaligned constituent images is preferred for getting corresponding regions of interest. These masked image snippets constitute two-dimensional regions of interest that are eventually used for scoring. From these masked image snippets, characteristic chromatograms and characteristic mass spectra are determined. Also, a serialized version of each two-dimensional image snippet is created.

The region of interest processor 110 includes a correlation evaluator 210. The correlation evaluator 210 compares corresponding regions of interest in masked image snippets, such as mass/charge spectra, liquid-chromatography chromatograms, or serialized image snippets, to determine correlation scores. When scoring the correlation of regions of interest, the correlation evaluator 210 selects corresponding regions of interest within one or more microaligned image snippets. Suitably, a correlation score is determined from a collection of constituent images that are replicates belonging to a single treatment condition and/or biological variant. Such a correlation score indicates the trustworthiness of a variation, such as a peak. In situations where significant variations are expected, a low correlation score may indicate an important biological event. If multiple treatment conditions and/or biological variants are involved, the correlation score can be derived from a particular set of one or more treatment conditions, or a weighted scoring can be used that weights individual replicates or treatment conditions differently. These options clarify that a low score is due to poor reproducibility and not a significant biological variation.

In situations where a statistically sufficient number of constituent images exist, each containing a signal that defines a corresponding region of interest, the correlation evaluator 210 uses intra-condition correlation scoring and applies equal weighting to each region of interest (variations such as a peak or a feature) in a selected constituent image. The data selector 202 may limit constituent image selections to include a single treatment condition or biological variation. If, within the selected constituent images, a variation is present in the region of interest in one constituent image but not in the regions of interest of other constituent images, then the correlation evaluator 210 may consider the variation to be unreliable and a low correlation score should be expected.

In situations where a score is derived from multiple biological variations and/or multiple experimental conditions, the correlation evaluator 210 uses constituent-weighted correlation scoring. Moreover, such constituent-weighted correlation scoring is suitable for situations where too few constituent images exist for a single treatment condition or biological variation to enable intra-condition correlation scoring, as previously described. Consequently, images from multiple treatment conditions and biological variations are used. Constituent-weighted correlation scoring considers separately the relevance of each region of interest (variations such as a peak) from a set of corresponding regions of interest. Within the context of a single variation, constituent-weighted correlation scoring applies a weight to the region of interest of each constituent image based on the characteristics found within the region of interest. The weighting can be based on other scores, which are derived from the region of interest on the constituent image. For example, the correlation evaluator 210 can use the intensity (such as peak volume, peak height, and so on) within the region of interest in the constituent image. As a further example, in the case of an absent signal, the correlation evaluator 210 would determine that the weight for the absent signal is zero.

The region of interest processor 110 includes a geometric scorer 212. The geometric scorer 212 calculates geometric scores for geometrical properties for regions of interest. Geometric scores cover a wide gamut of geometry, such as retention time symmetry, retention time monotonicity from the peak apex, area, volume, maximum height, standard deviation, area symmetry ratio, mass/charge symmetry; mass/charge monotonicity from the peak apex, solidity, peripheral gradient, and tangent volume ratio. Geometric scores are calculated for a single image, although an image may be an individual constituent image or a composite of other images. Geometric scores indicate whether the signal contained in the region of interest will further advance scientific discovery to a researcher. Because signal variations in various regions of interest appear as two-dimensional objects (such as grayscale spots), the variations can be described by their geometry. Useful regions of interest tend to contain common geometrical properties, such as elliptical areas, symmetrical intensity distributions, a monotonic decrease in intensity from the region centroid, and so on. These and other geometrical properties can be used to classify a region of interest from a single constituent image or a collection of regions of interest from multiple constituent images.

As noted above, there are numerous geometric methods of assigning scores to images based on features such as retention time symmetry, retention time monotonicity from the peak apex, area, volume, maximum height, standard deviation, area symmetry ratio, mass/charge symmetry, mass/charge monotonicity from the peak apex, solidity, peripheral gradient, and tangent volume ratio. Several examples of such scoring are described below.

Figure 16A:
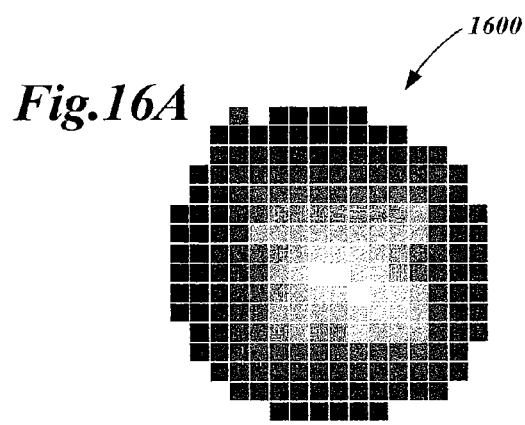
FIGS. 16A-16F illustrate peripheral gradient scoring.
Figure 16B:
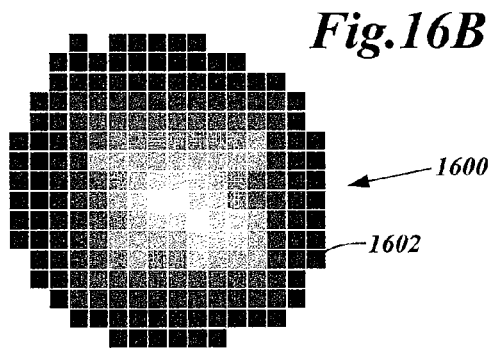
Figure 16C:
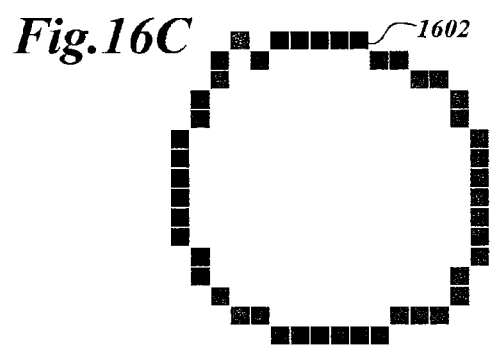
Figure 16D:
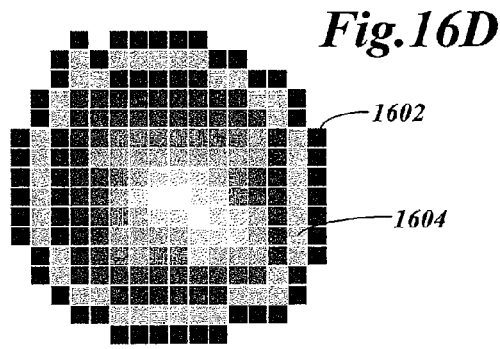
Figure 16E:
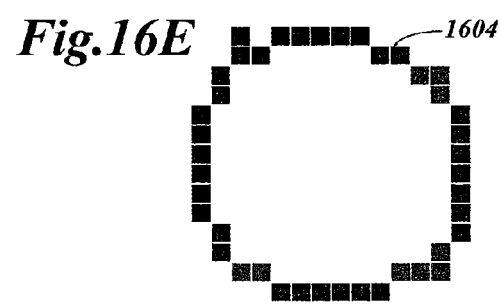
Figure 16F:
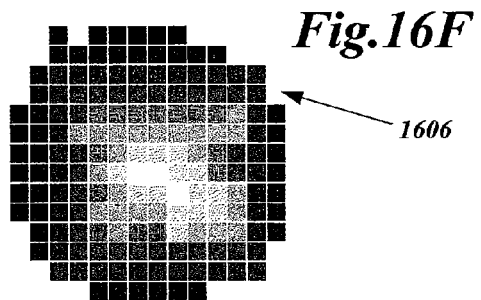

Peripheral gradient scoring is illustrated with reference to FIGS. 16A-16F that show a representative LC/MS spot, feature, or peak 1600. Pixel intensities are gray scale encoded. As shown in FIG. 16B, outer pixels 1602 of the spot 1600 are removed by a one-pixel erosion. The outer pixels 1602 are shown in FIG. 16C. Average intensity associated with the outer perimeter pixels 1602 is defined as an outer perimeter intensity for the spot 1600. Inner perimeter pixels 1604 are removed by an additional one-pixel erosion as show in FIGS. 16D-16E. An average intensity associated with the inner perimeter pixels 1604 is defined as an inner perimeter intensity for the spot 1600. A peripheral gradient of the spot 1602 is defined as the ratio of the inner perimeter intensity to the outer perimeter intensity. Reliable spots have a perimeter gradient of greater than about 0.8, 1.0, 1.5, 2.0, or greater. An eroded spot 1606 after removal of the outer perimeter pixels 1602 and the inner perimeter pixels 1604 is shown in FIG. 16F.

Figure 17:
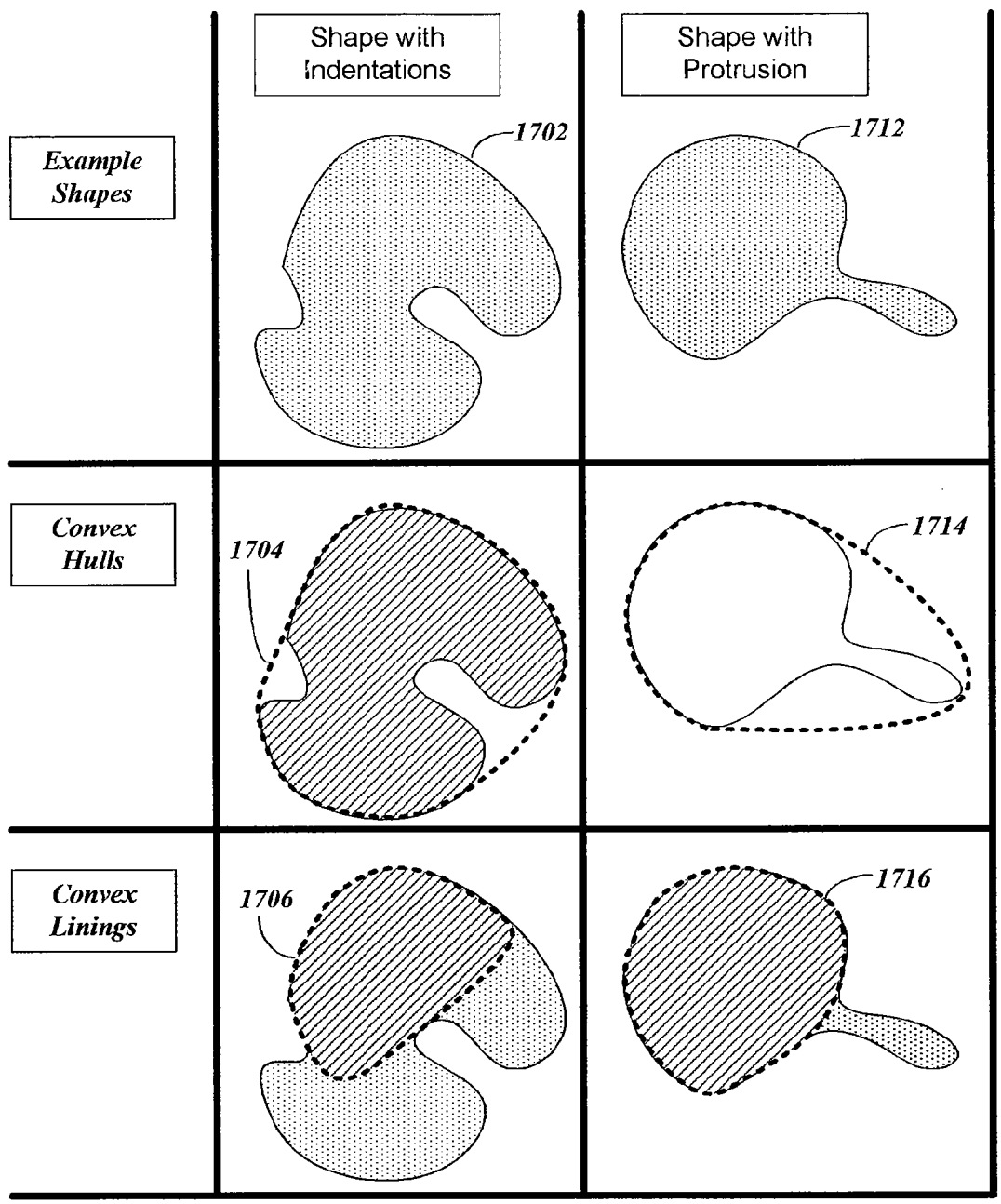
FIG. 17 illustrates solidity scoring.

Solidity scoring is based on a convex hull defined as a perimeter of a smallest two-dimensional shape that encloses a planar object and that has only convex curvature (i.e., no inflections). A convex hull can be visualized as a shape that a stretched rubber band has around an object. By analogy to a convex hull, a convex lining can be defined as an outline of the largest convex shape that is fully enclosed in an object. Convex hulls and convex linings are illustrated in FIG. 17 for a shape with indentations 1702 and a shape with protrusions 1712. The shape 1702 has a convex hull 1704 and a convex lining 1706. The shape 1712 has a convex hull 1714 and a convex lining 1716. Based on these definitions, solidity can be defined in two ways. Hull Solidity is a proportion of the number of pixels in a convex hull that are also in the object. Lining Solidity is defined as a proportion of pixels in an object that are also in the convex lining. Hull solidity is more affected by protrusions than by indentations and lining solidity is more affected by indentations than by protrusions. A solidity score is defined as a product of hull solidity and lining solidity. Solidity scores can range from 0 to 1. A solidity score of close to 1 indicates a more reliable spot. Preferably, scores ranging from 0.5 to 1.0, 0.6 to 1.0, or 0.8 to 1.0 are preferred.

Figure 18:
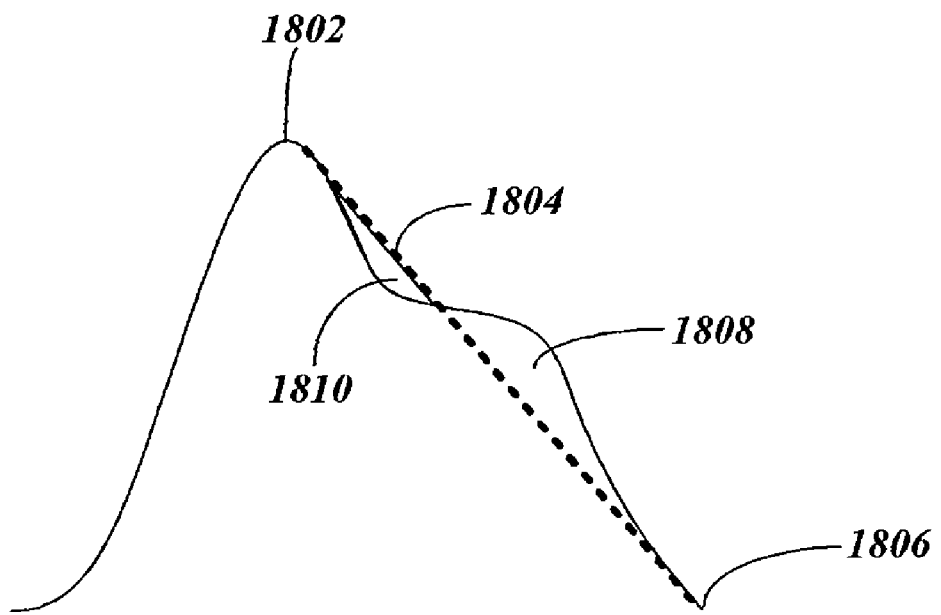
FIG. 18 illustrates tangent volume ratio scoring.

FIG. 18 illustrates scoring based on a tangent volume ratio. With reference to the example peak curve 1800, a line segment 1804 extends from a peak apex 1802 to a peak end 1806. The line segment 1804 and the peak curve 1802 define a concave down area 1810 (an area between the peak curve 1804 and the peak curve 1802 and above the line segment 1804) and a concave up area 1812 (an area between the peak curve 1804 and the peak curve 1802 and below the line segment 1804). Tangent volume ratio is defined as a ratio of concave up volume to concave down volume. Tangent volume ratio can range from zero to infinity, but scores greater than about 0.5, 0.75, 1.0, 2.0, 3.0, 5.0, and 10 are preferred, but other ranges can be selected. In some examples, tangent volume ratios of at least about 3.0 are preferred.

The region of interest processor 110 includes a score combiner 214. Scores may be used alone or combined in many suitable ways to derive new scores that classify regions of interest in a score classifier 216 so as to illuminate biological features of interest and eliminate those not of interest. Classification allows ranking and filtering of regions of interest. For example, a scientist may wish to eliminate all but the highest ranked regions of interest. Computer automation may be executed without interaction of the scientist to expose regions of interest that meet certain standards as quantified by various scores. The scores are chosen from at least two types: geometrical property scores and correlation scores.

FIGS. 3A-3D illustrate conventional time warping of constituent image 300a, constituent image 300b, and constituent image 300c prior to microalignment, which results in a composite image 300d. Each of the constituent images shows four variations appearing as peaks. The composite image 300d shows that one of these variations is aligned, but the remaining variations are misaligned. In various embodiments of the present subject matter, microalignment aligns one region of interest at a time and disregards the rest of the regions of interest in the constituent images. Note that various variations appear as contour lines which represent iso-intensity lines as on a topographical map. FIGS. 3E-3F illustrate detection of regions of interest. A set of regions of interest is found in the composite image by identifying the boundaries of the variations 300e. Removing these variations, rectangular boundaries 300f remain as shown by the set of regions of interest 300f. Note the overlapping variations (interference of contour lines) that may be undesired noise.

FIGS. 4A-4D illustrate a temporary expansion of the boundaries of a variation to better microalign the variation. The boundaries of a variation in the composite image 400a are shown as a rectangular box with an arrow showing the expansion backward in the retention time as well as forward in the retention time. Similarly, the boundaries of a variation in the constituent image 400b that corresponds to the variation in the composite image 400a are expanded. Furthermore, the boundaries of a variation in the constituent image 400c that corresponds to the variation in the composite image 400a are similarly expanded. Yet further, the boundaries of a variation in the constituent image 400d that corresponds to the variation in the composite image 400a are expanded. In one embodiment, the expansion is one retention time width earlier and one retention time width later such that the region of interest is now three times as long in the retention time dimension, but smaller or larger expansions can be used.

FIGS. 5A-5D illustrate microalignment of various regions of interest 500b, 500c, and 500d based on the microalignment window 500a. See the discussion connected with the microaligner 204 at FIG. 2. As shown in FIGS. 5A-5D, such a microalignment does not macroalign other regions of interest in the various constituent images. The regions of interest 500b, 500c, and 500d have been shifted in the retention time dimension, and all now appear to be aligned with respect to one another. Other portions of the constituent images are not aligned.

FIG. 6A illustrates a microaligned variation from a composite image 600a, which is formed when regions of interest 500b, 500c, and 500d are multiplexed.

FIG. 6B illustrates a revised regional definition of the composite image signal variation to fit the microaligned variation better with boundaries 600b that eliminate extraneous background. Using the boundaries 600b, regions of interest (image snippets) 600c, 600d, 600e are assigned based on the boundaries specified by the boundaries 600b in various constituent images as shown in FIGS. 6C-6E and as discussed with the reference to the region of interest detector 206 shown in FIG. 2. These newly microaligned, corresponding regions of interest in the image snippets 600c, 600d, 600e, are better suited for comparison analysis than they were prior to microalignment. Other regions of interest of the composite image and its constituent images undergo a similar process so that microalignment of every region of interest is executed. The regional redefinition in many cases results in a smaller region that encompasses more of the signal and less of the noise as well as less interfering signal.

FIGS. 7A, 7C, and 7E illustrate microaligned image snippets 700a, 700b, and 700c, whose regions of interest have been redefined to be rid of extraneous background areas. FIGS. 7B, 7D, and 7F illustrate overlaid pixel maps 700d, 700e, and 700f, respectively, imposed over the microaligned image snippets 700a, 700b, and 700c, to expose pixels that are suitable for subsequent correlation analysis to produce correlation scores for classifying biological features of interest. The pixels at locations (1, 4, 41, and 44) are not considered as they reside outside of the masked region of interest. Note that unlike conventional analysis, various embodiments of the present subject matter regionally redefine regions of interest to produce better scores of geometrical properties. Furthermore, because a pixel from one constituent image may be compared to a pixel at the same location of another constituent image, such a pixel-by-pixel comparison can be leveraged to better produce correlation scores for classifying biological features of interest.

FIG. 8A illustrates a two-dimensional mask 800a containing several rows and several columns. The intersection of each row and column is identified by the term $u_{ij}$, wherein i,j are positive integers identifying row and column locations, respectively. Such a nomenclature can be applied to every pixel in the mask. FIG. 8B illustrates a masked snippet 800b which shows various intensity values exposed by the mask 800a. FIG. 8C similarly illustrates another masked snippet 800c which also shows various intensity values exposed by the mask 800a. Similarly, FIG. 8D illustrates a further masked snippet 800d which further shows various intensity values exposed by the mask 800a.

FIG. 9 illustrates a table 900, which contains data corresponding to row and column locations. The first column contains the pixel labels established by the mask 800a and is used to serialize the masked two-dimensional image snippets 800b, 800c, and 800d. The second, third, and fourth columns represent constituent vectors and contain pixel intensity values obtained from the masked snippets 800b, 800c, and 800d and serialized in the order determined by the first column of the table 900. The fifth column is named "consensus" and contains consensus vector data calculated from data from the preceding three columns. In one embodiment, the consensus vector data is the arithmetic mean of the preceding three columns.

Figure 10:
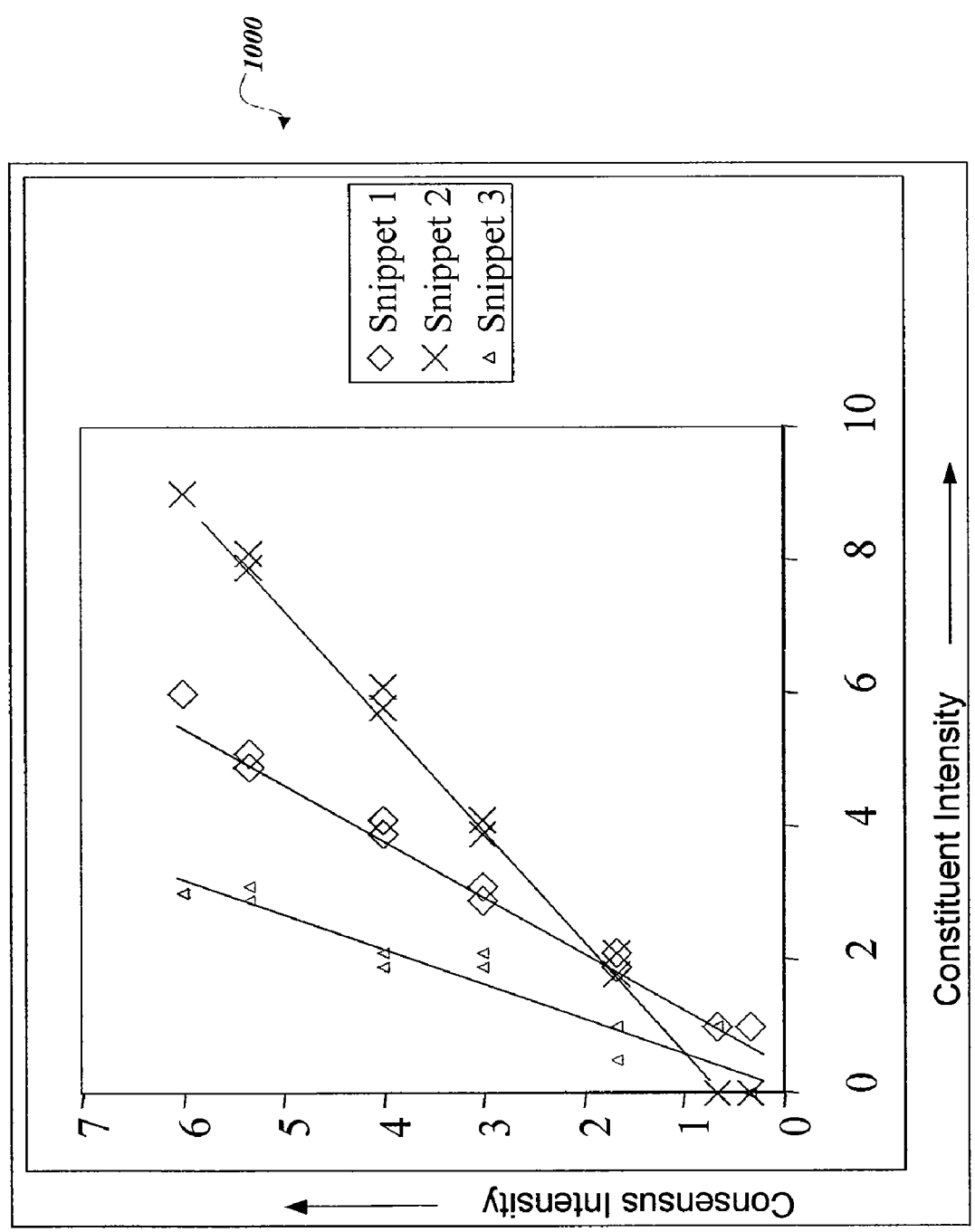
FIG. 10 is a graph of an exemplary consensus vector versus exemplary constituent vectors in accordance with one embodiment of the present subject matter.

FIG. 10 illustrates a graph 1000 consisting of data points from the table 900. Specifically, the consensus vector (values shown in the fifth column of table 900) is paired with each constituent vector (whose values are shown in the second, third, and fourth columns of table 900). The correlation evaluator 210 determines the slopes and intercepts of each of the plotted lines, which are later used for vector assimilation. The graph 1000 plots the consensus values as response values for every constituent value. From these relationships, assimilation parameters can be appreciated. If a linear relationship exists with an intercept is at the origin, then the assimilation parameter for a given constituent vector is the slope of the line fitted to the values of the consensus vector.

Figure 11:
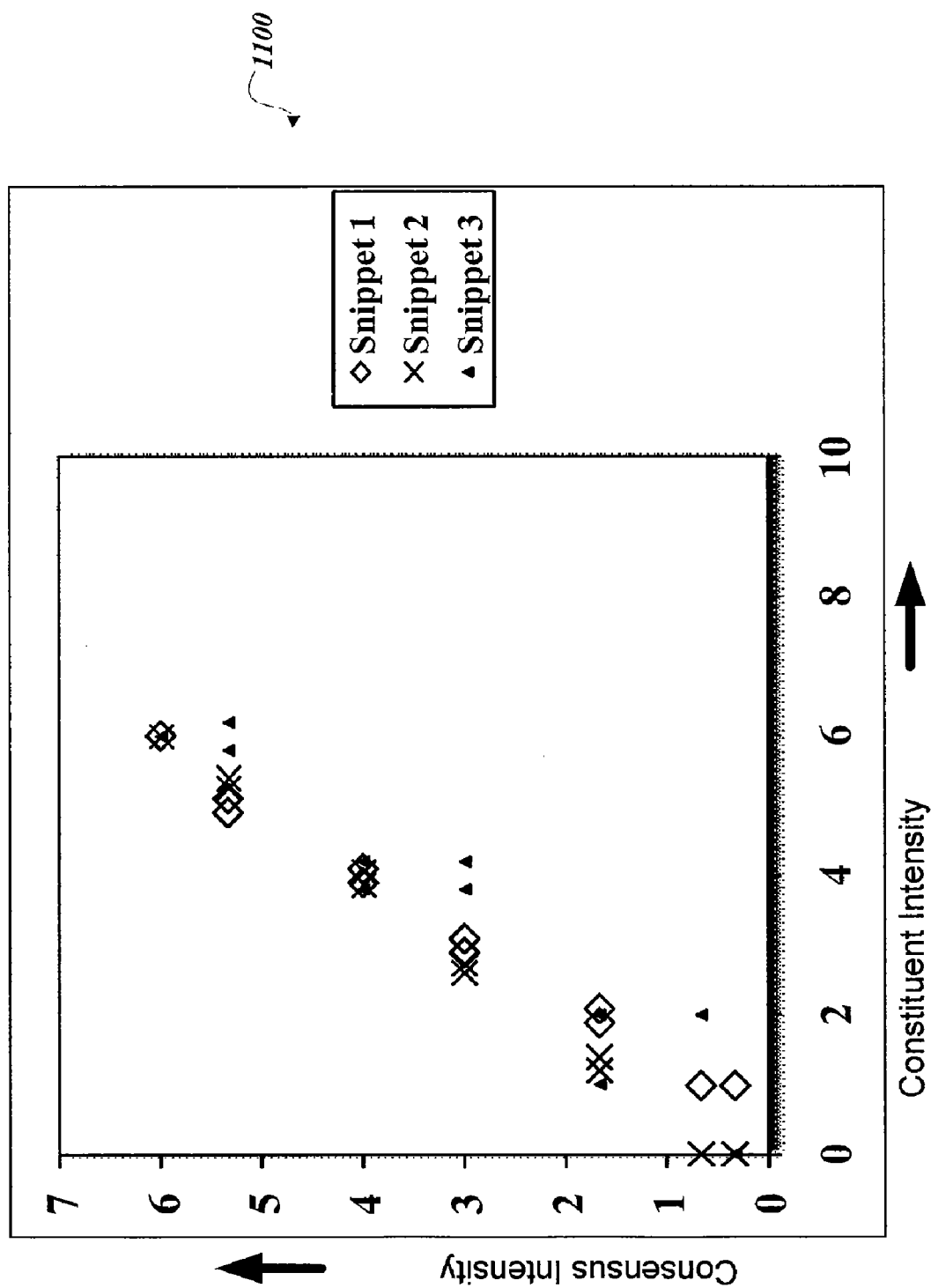
FIG. 11 is a pictorial diagram illustrating a graph of data points of FIG. 10 after individual assimilation of each constituent vector in accordance with one embodiment of the present subject matter.

FIG. 11 illustrates another graph 1100, which is derived from data shown in FIG. 10. The values of the constituent vectors (shown in the second, third, and fourth columns of table 900) have been modified by a multiplication of the slopes from the respective linear fits. In other words, the assimilation occurred by multiplying each constituent vector by the slope of the consensus vector versus the respective constituent vector. After assimilation, the slope of the linear fit of each constituent vector to the consensus vector is closer to 1.

Figure 12:
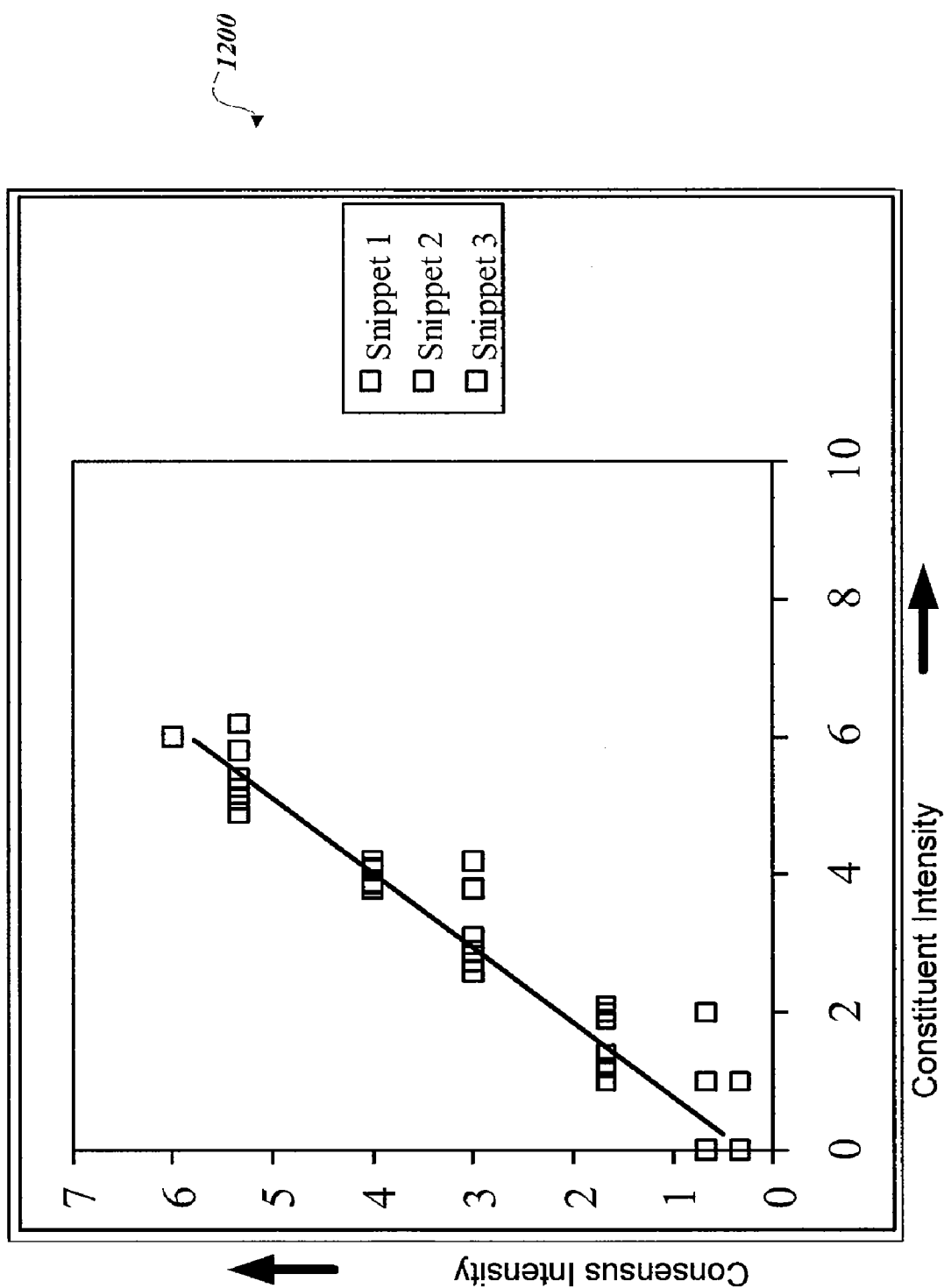
FIG. 12 is a pictorial diagram illustrating linear regression to the data in FIG. 11 in accordance with one embodiment of the present subject matter.

FIG. 12 illustrates a further graph 1200, the data for which is the same as the data graphed by graph 1100 in FIG. 11. The graph 1200 does not distinguish among the three constituent vectors. A model is developed from a relationship between the intensities from the consensus vector and the intensities of all the assimilated constituent vectors. In other words, distinctions between the image snippets have been removed, and a best fit line is plotted. A correlation score is based on fitting the points in the graph 1200 to a line. For example, a correlation score of a least squares regression to a linear fit indicates how well the data correlate with each other.

Figure 13A:
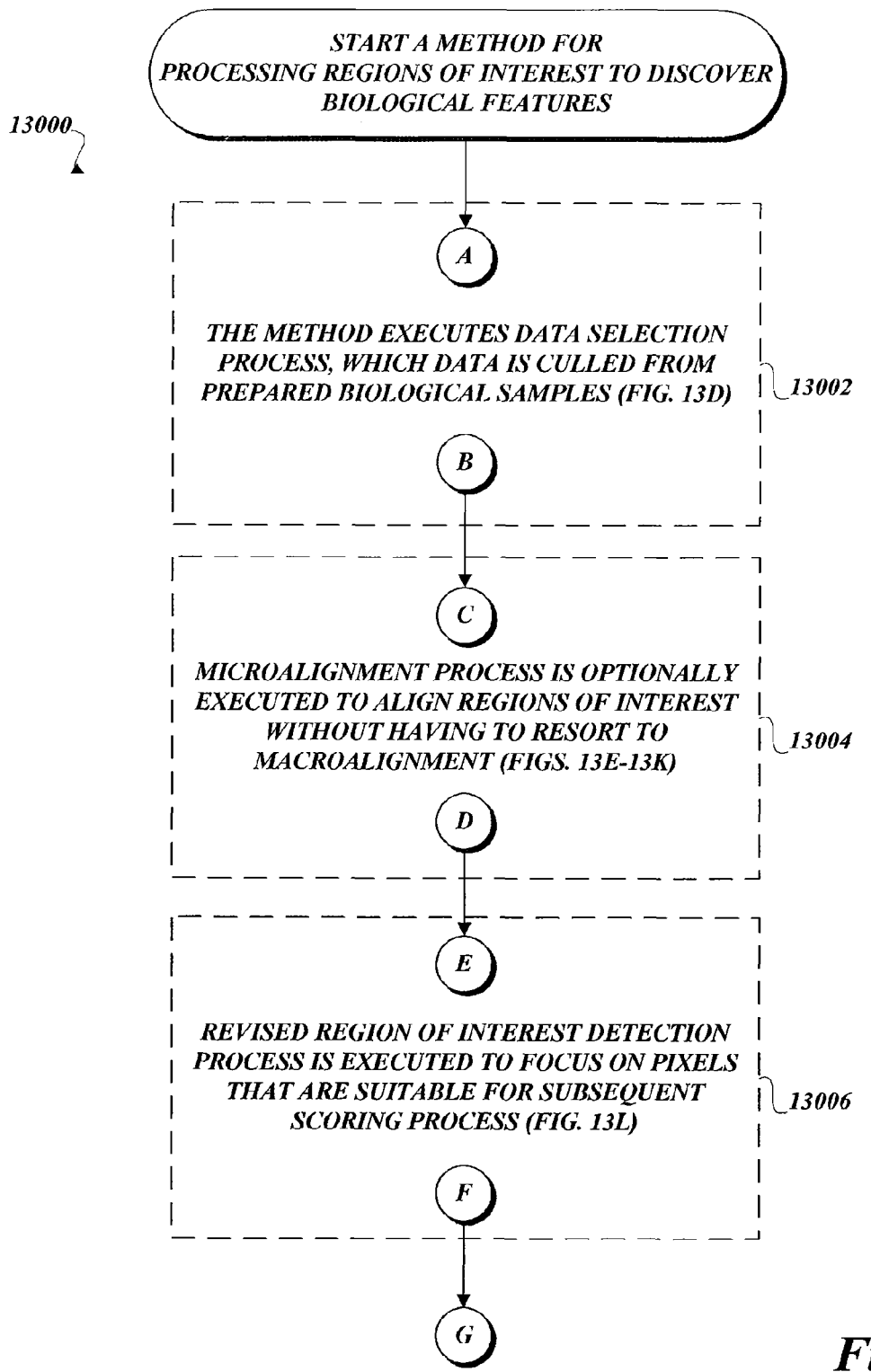
FIGS. 13A-13Y are process diagrams illustrating an exemplary method for processing regions of interest to discover biological features.
Figure 13B:
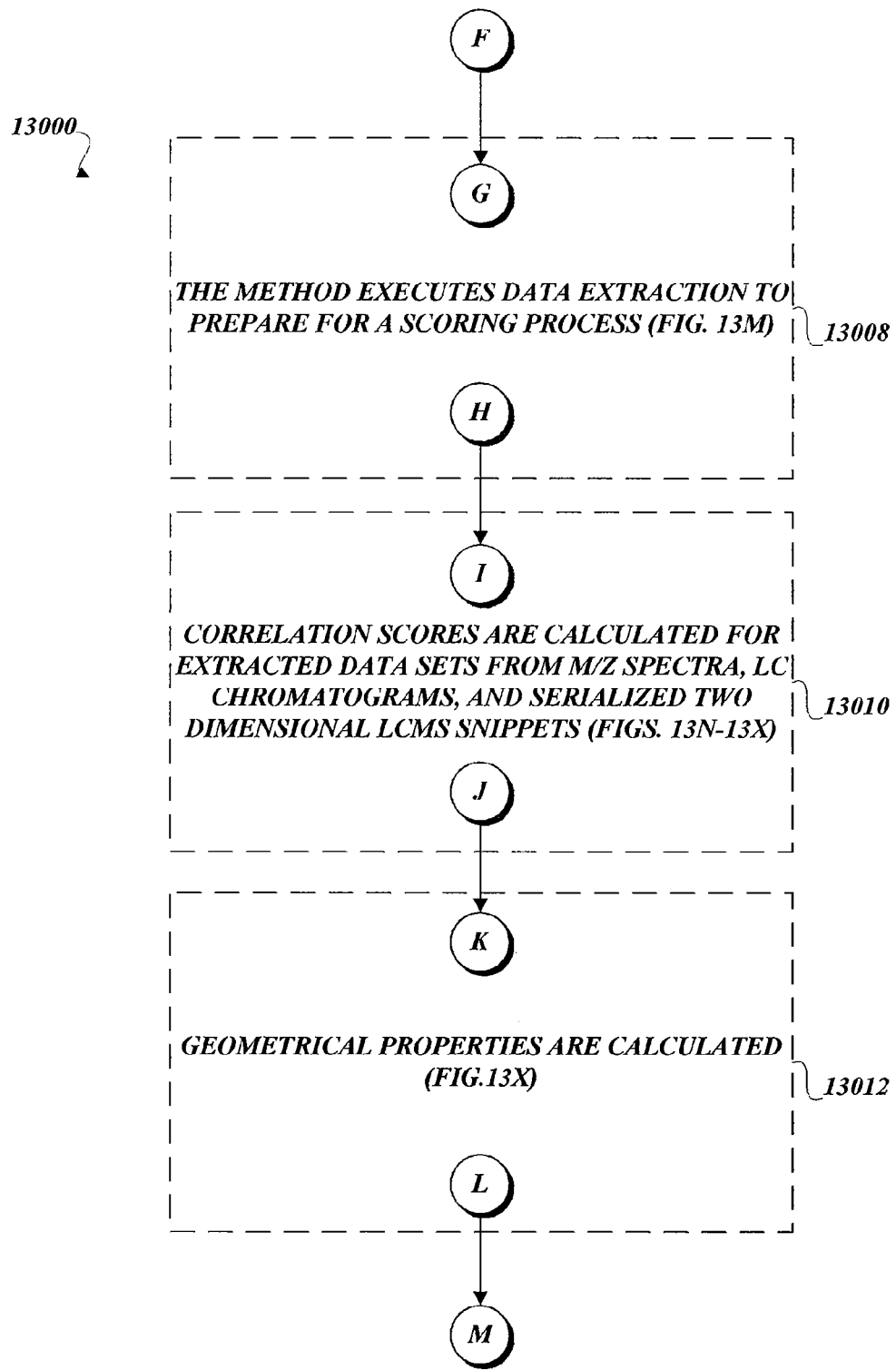
Figure 13C:
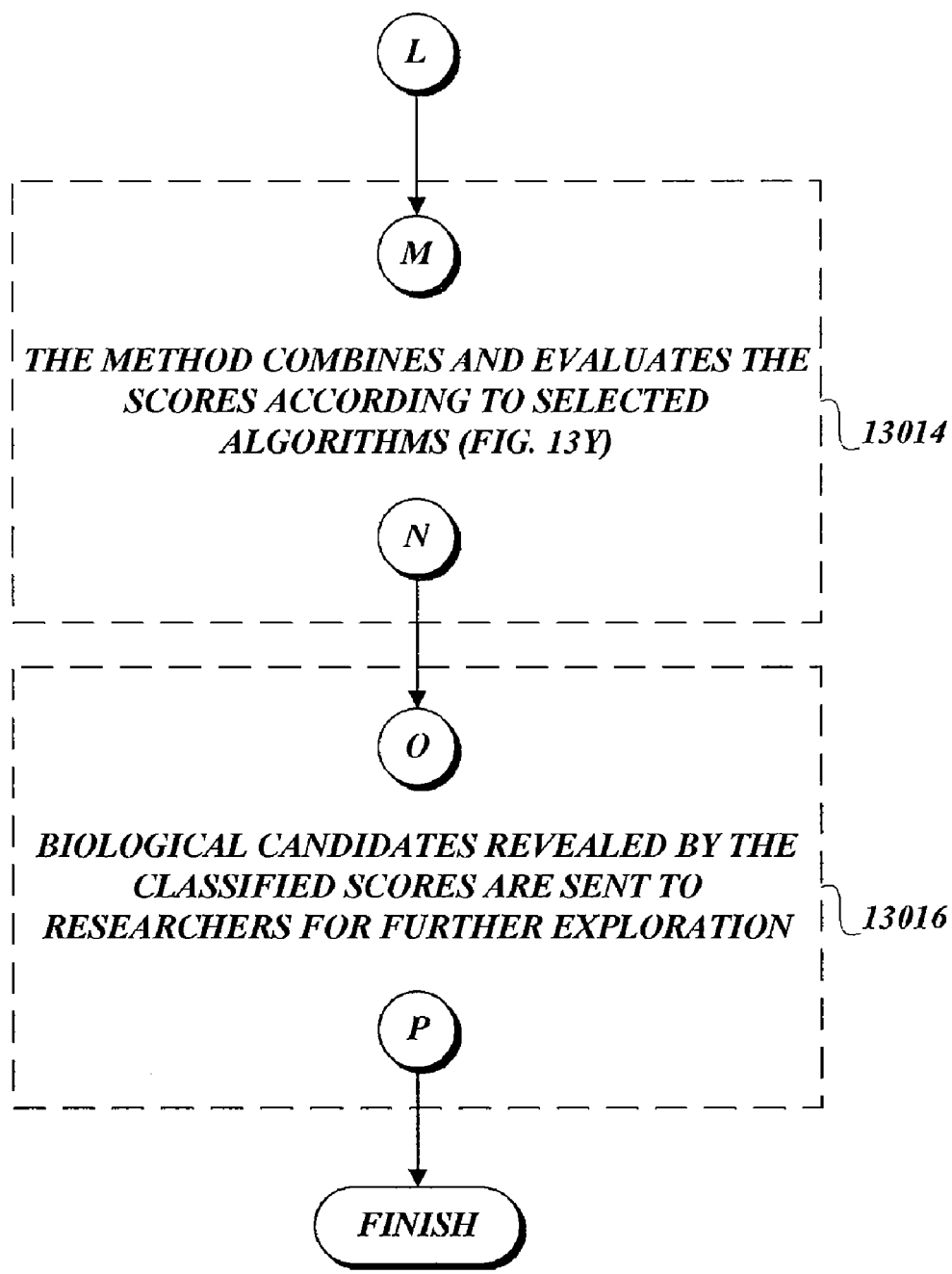
Figure 13D:
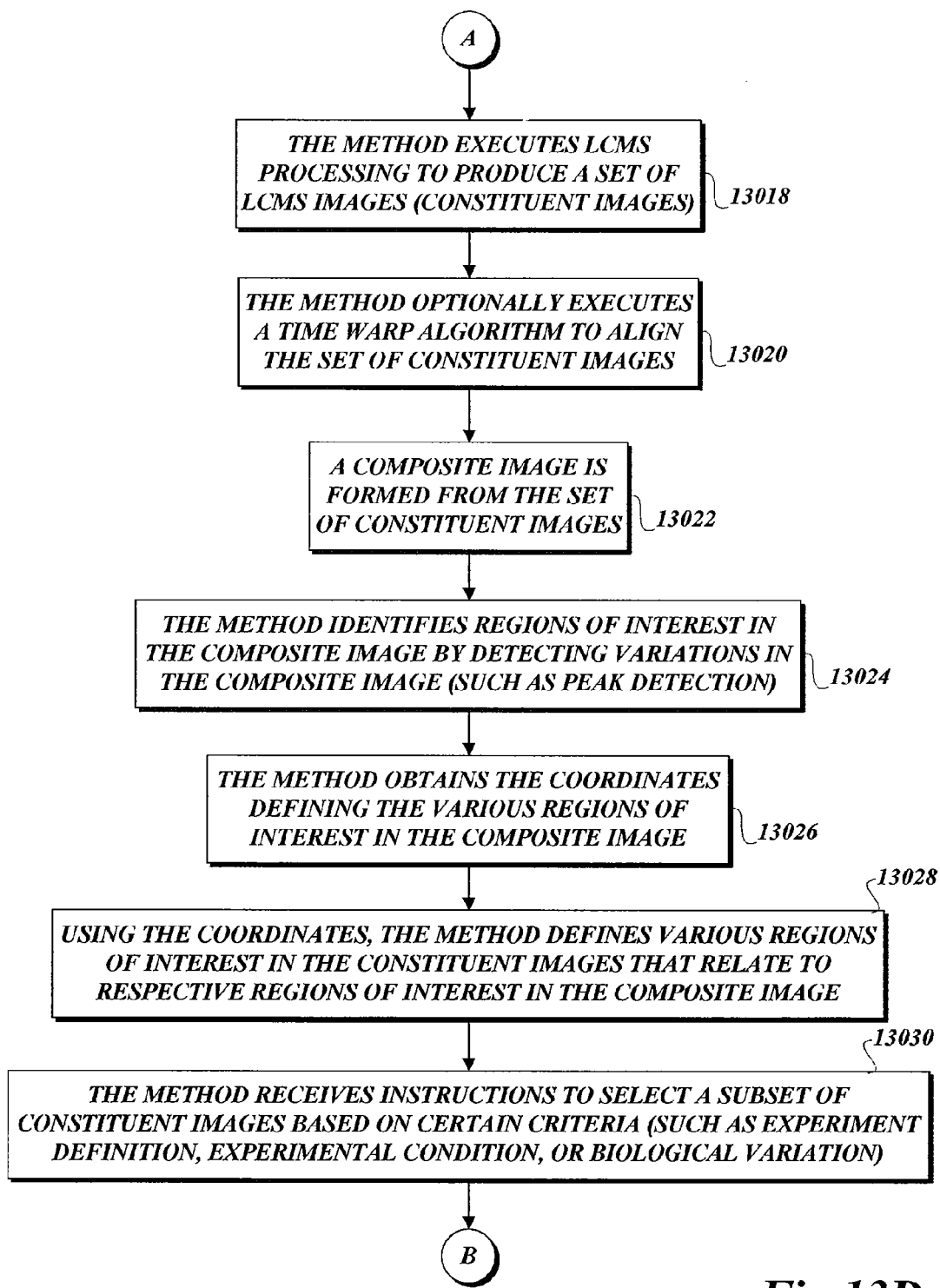
Figure 13E:
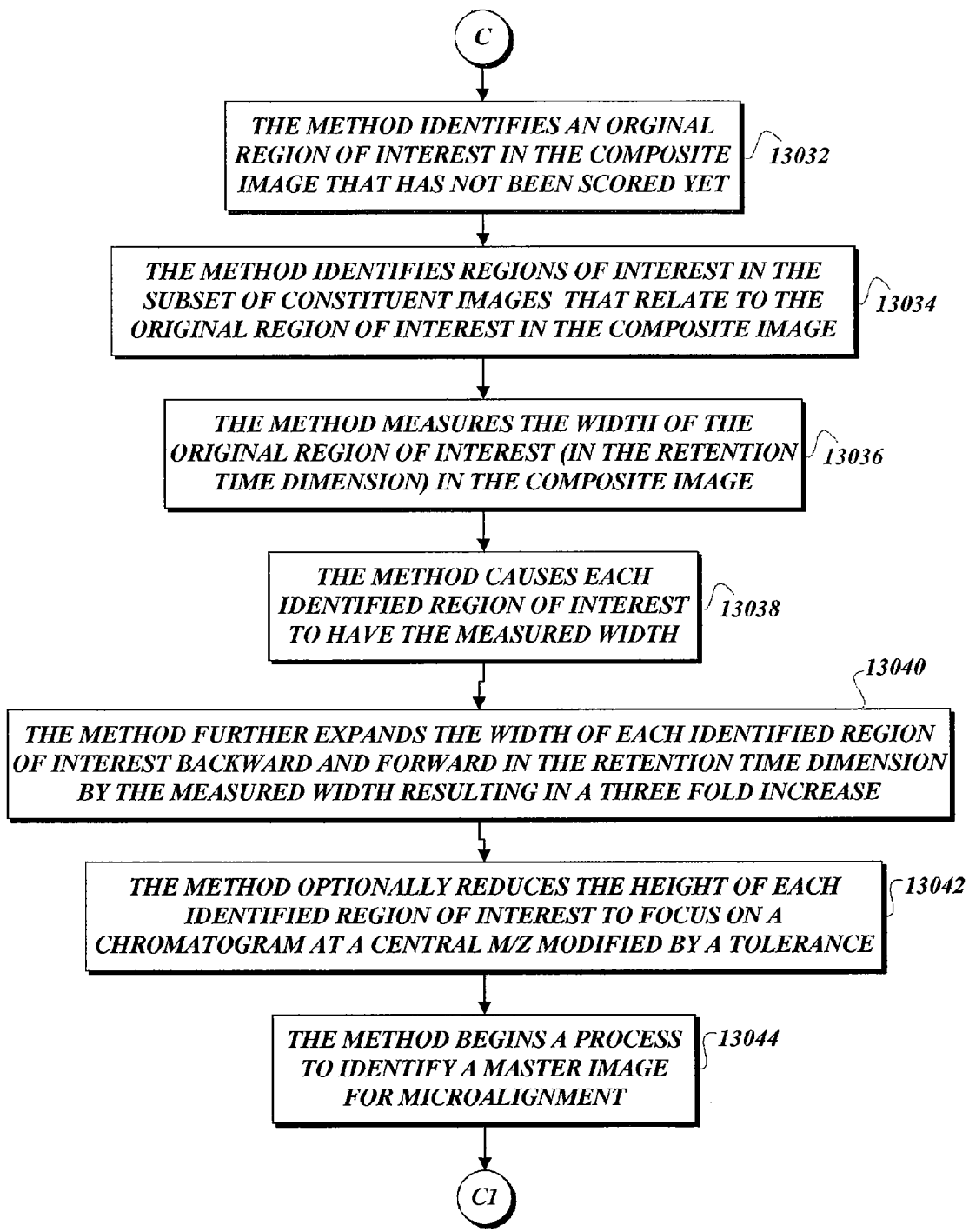
Figure 13F:
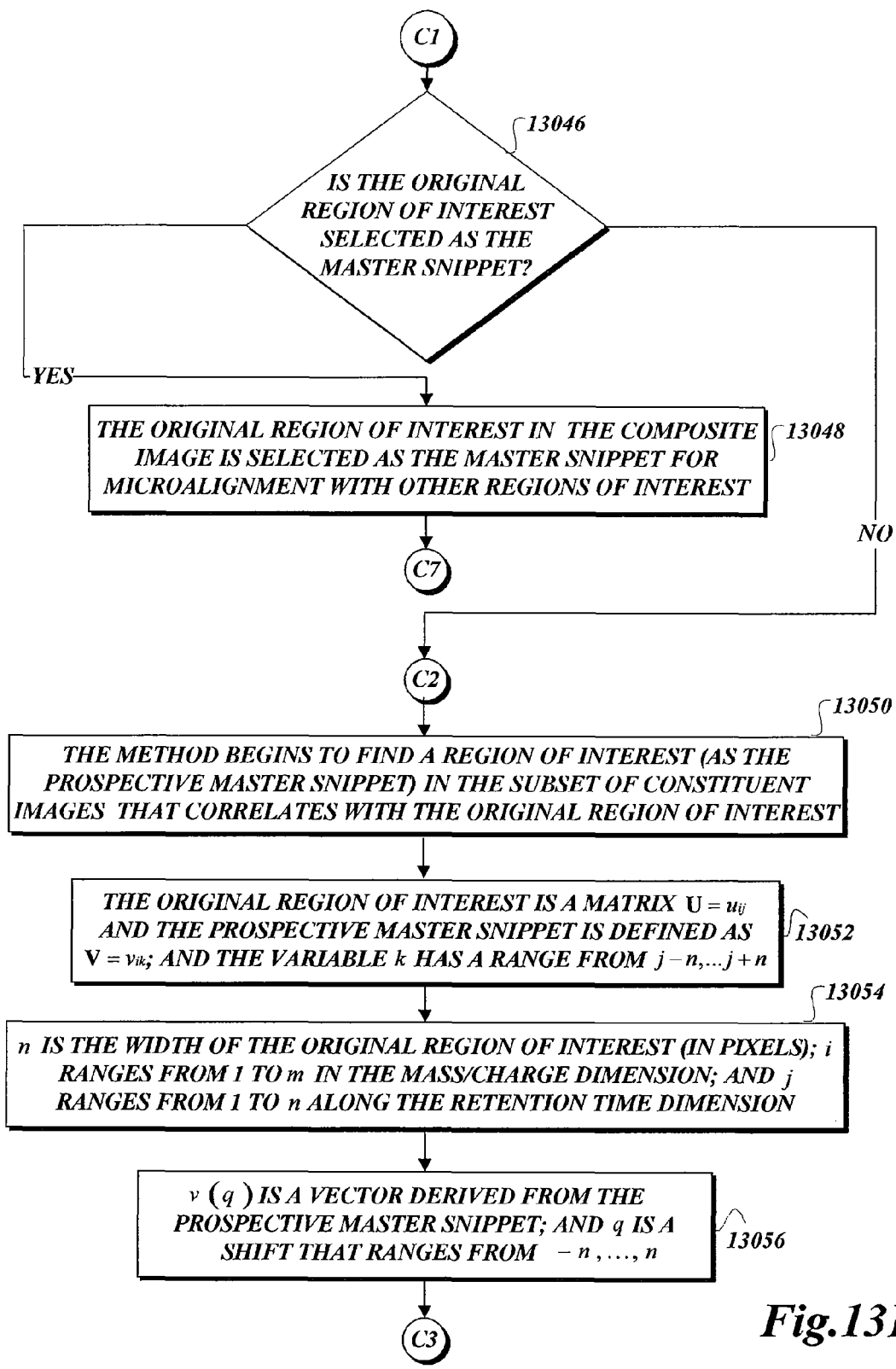
Figure 13G:
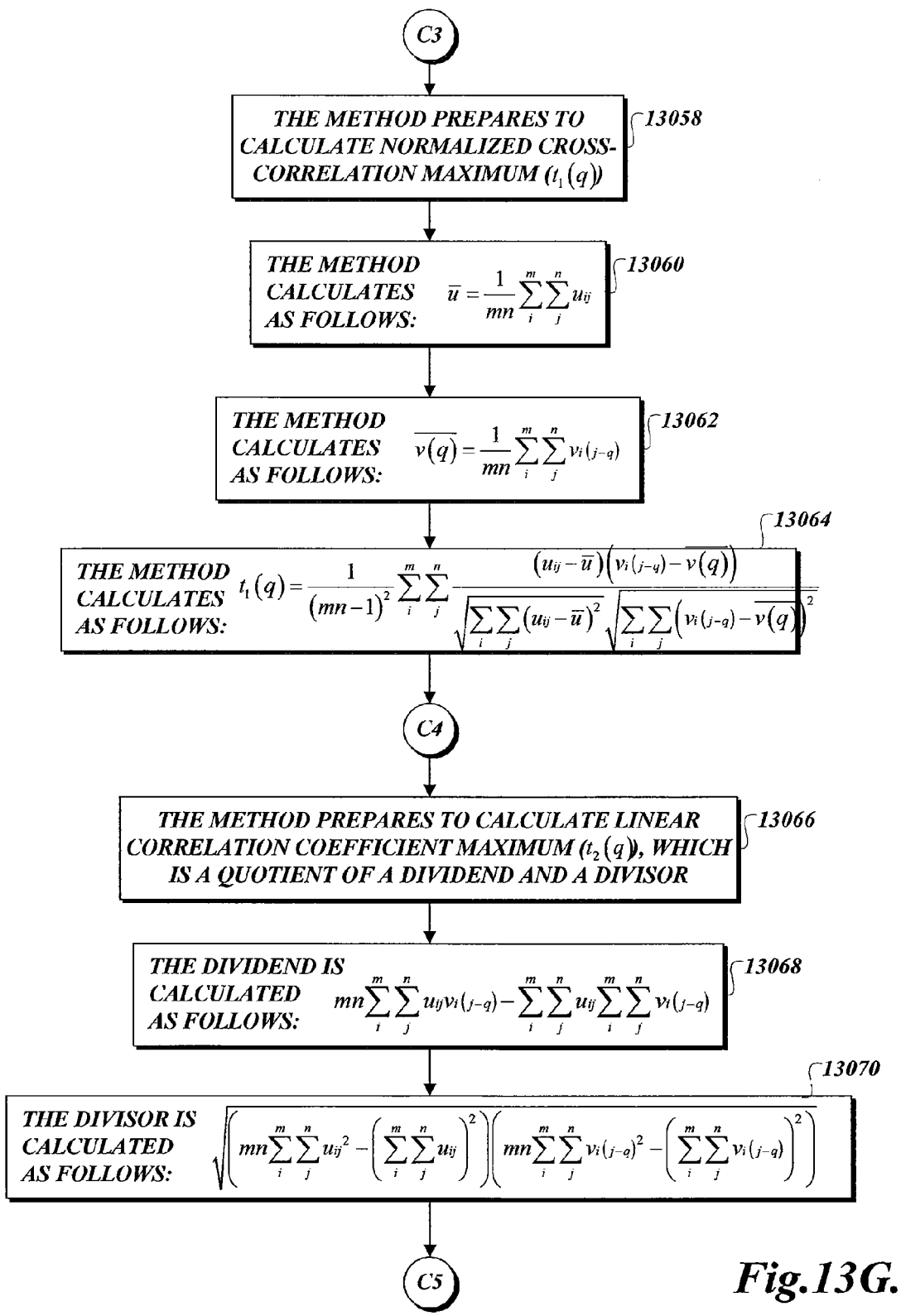
Figure 13H:
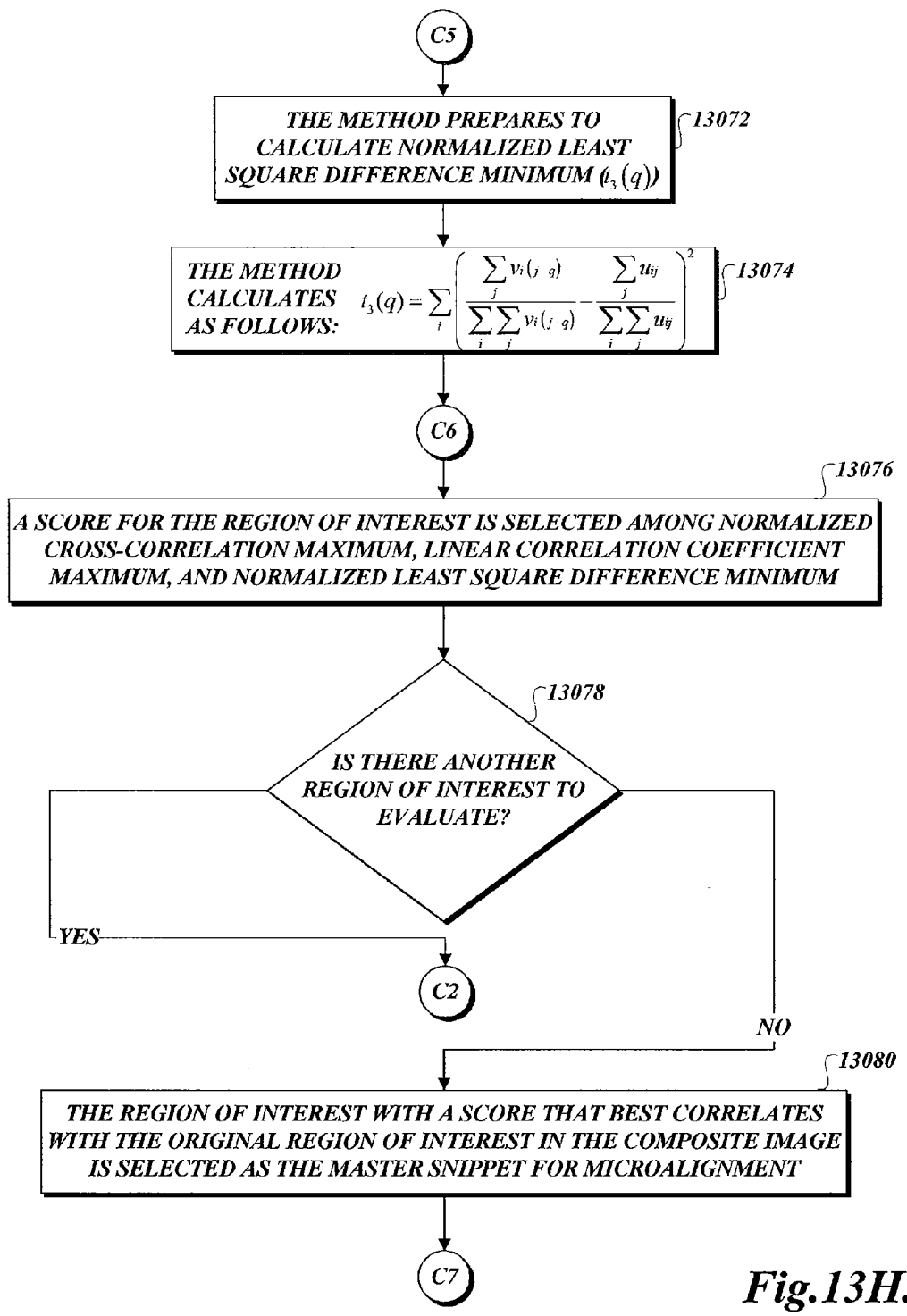
Figure 13J:
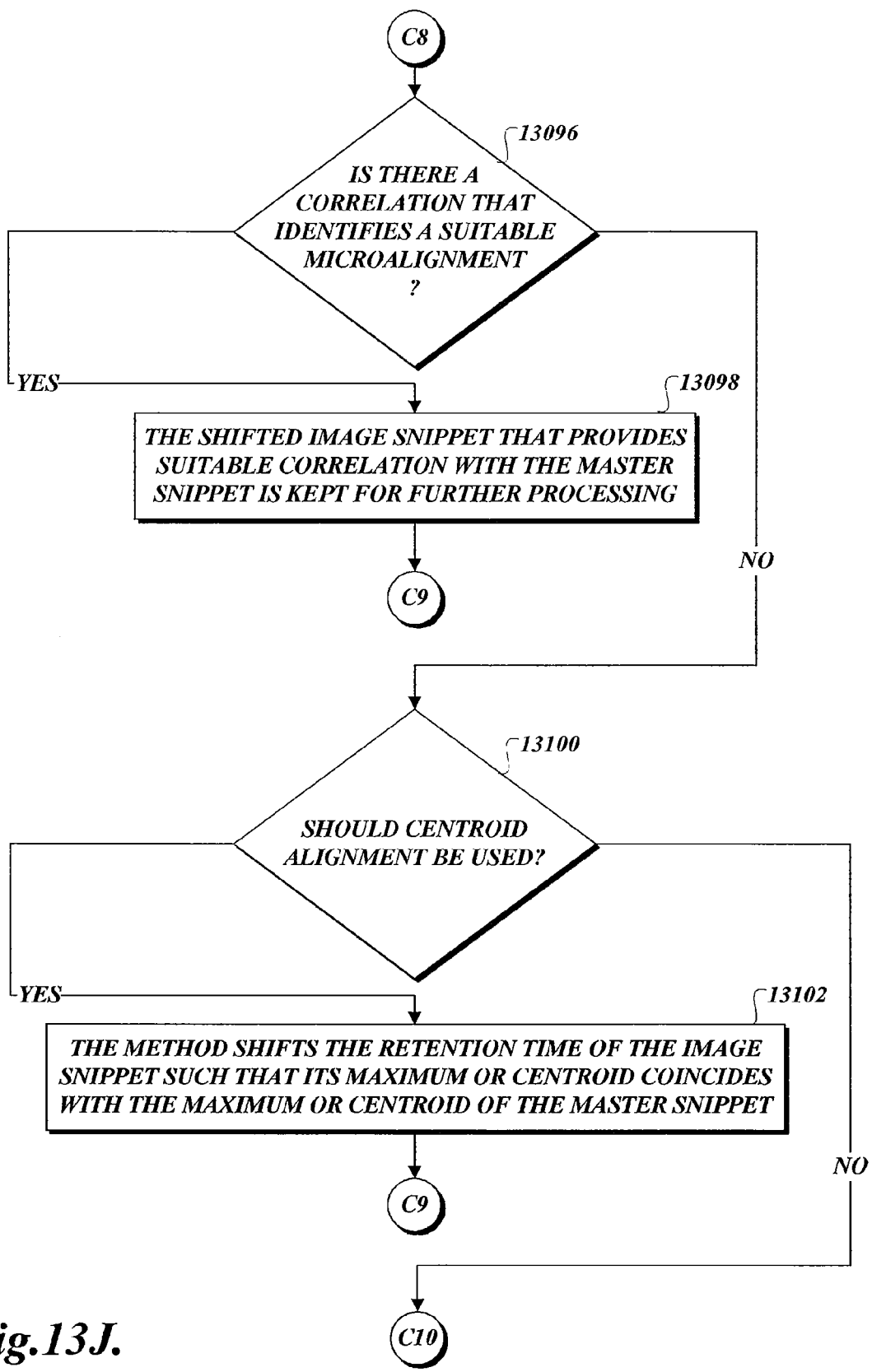
Figure 13K:
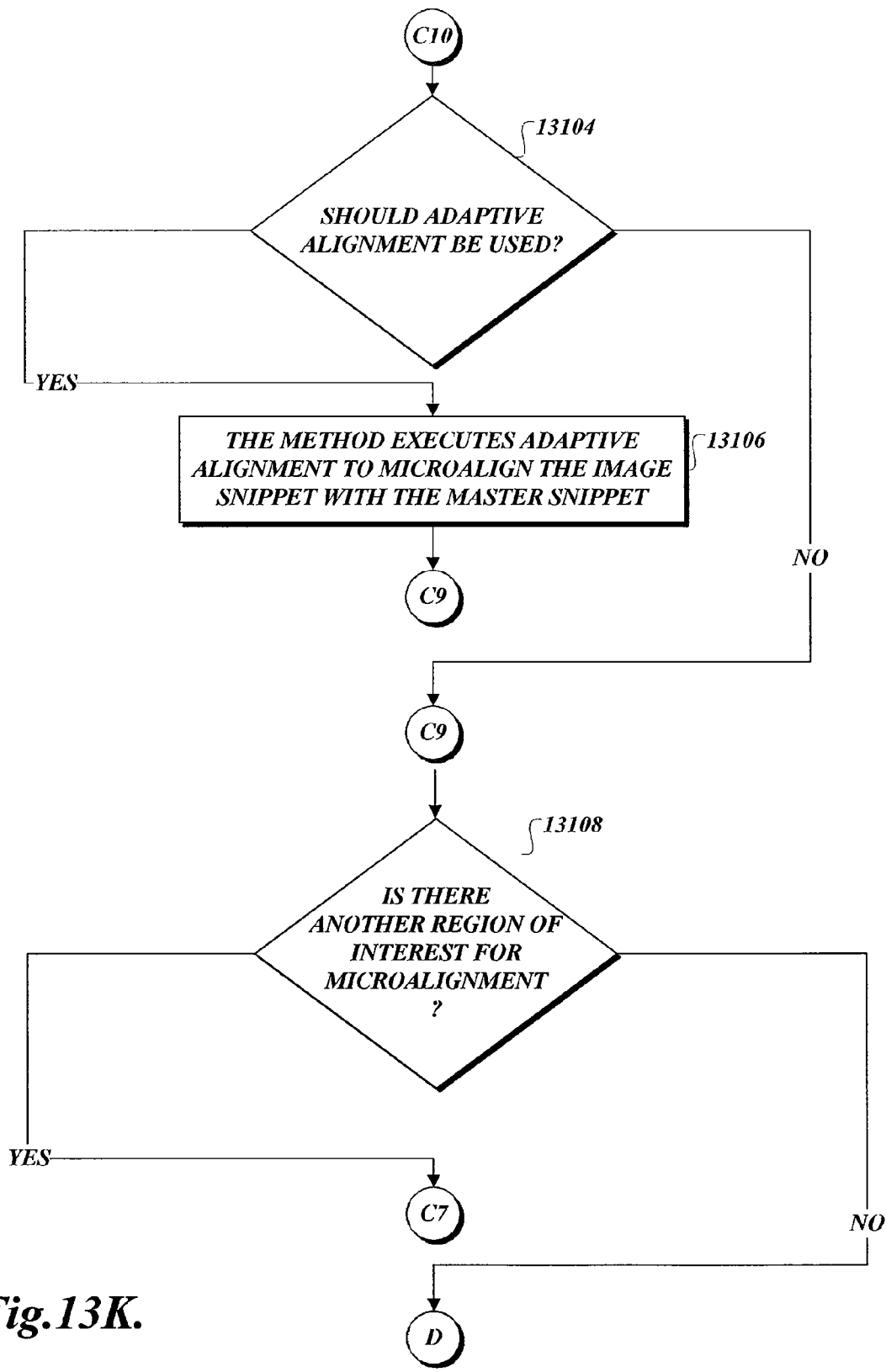
Figure 13L:
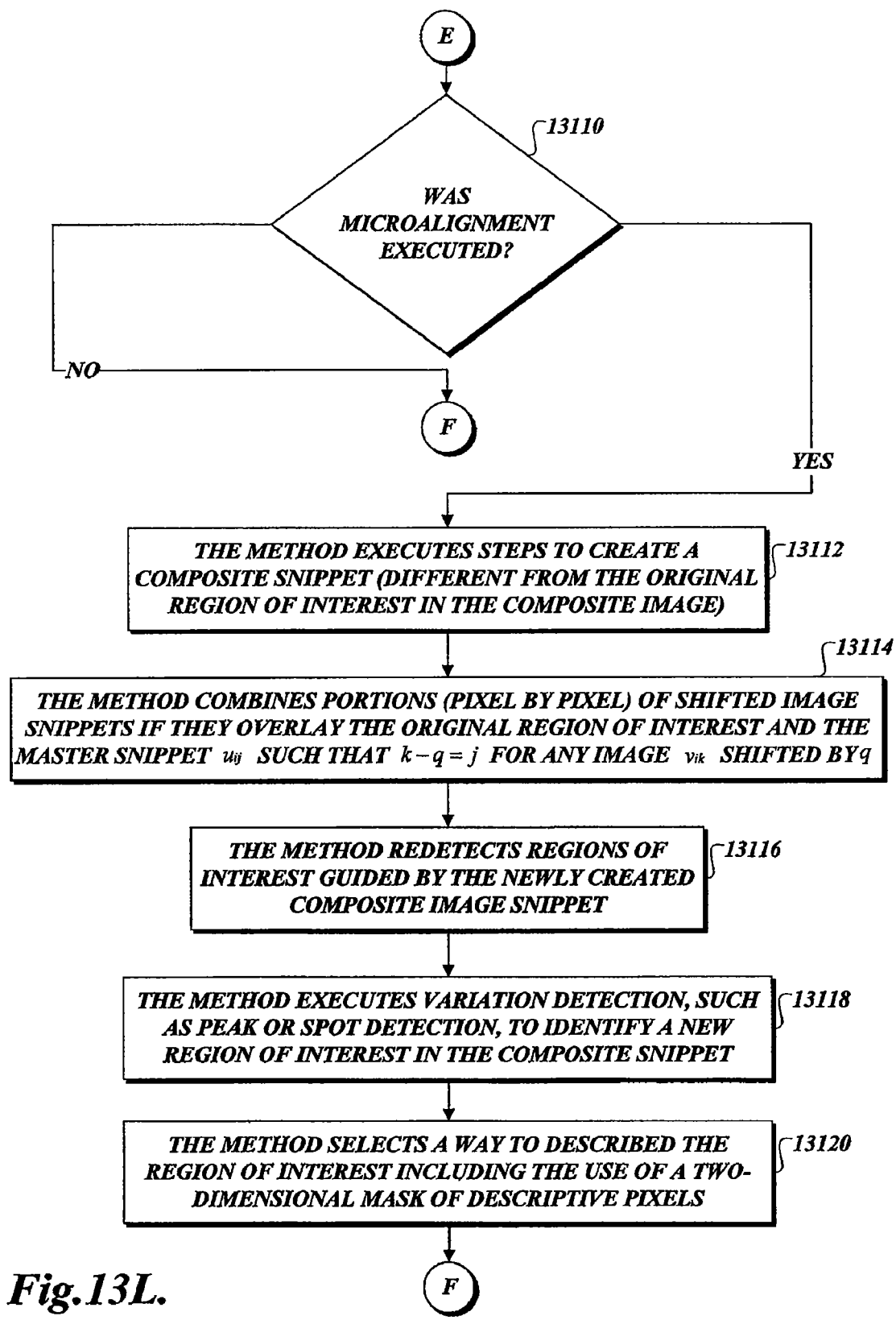
Figure 13M:
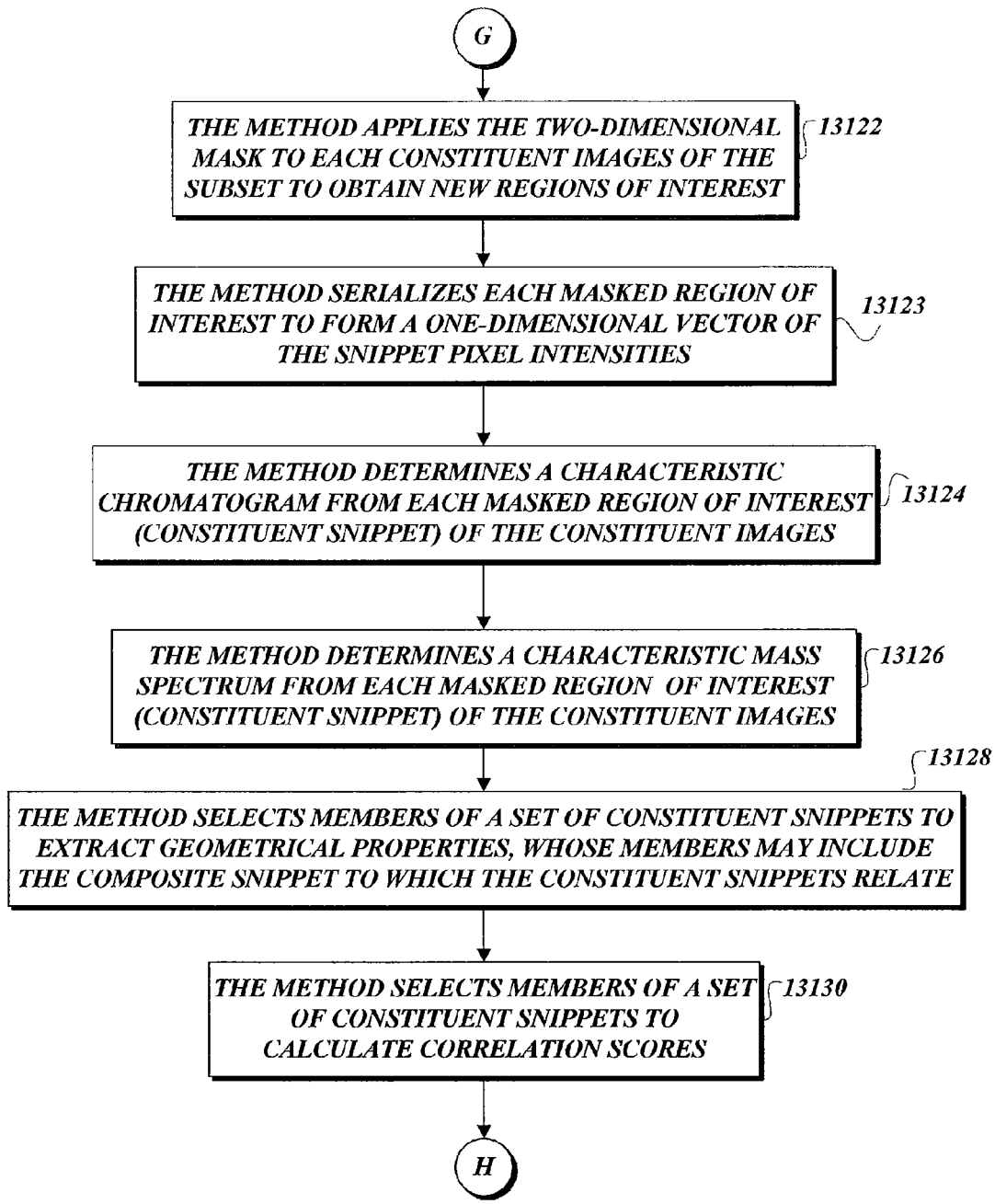
Figure 130:
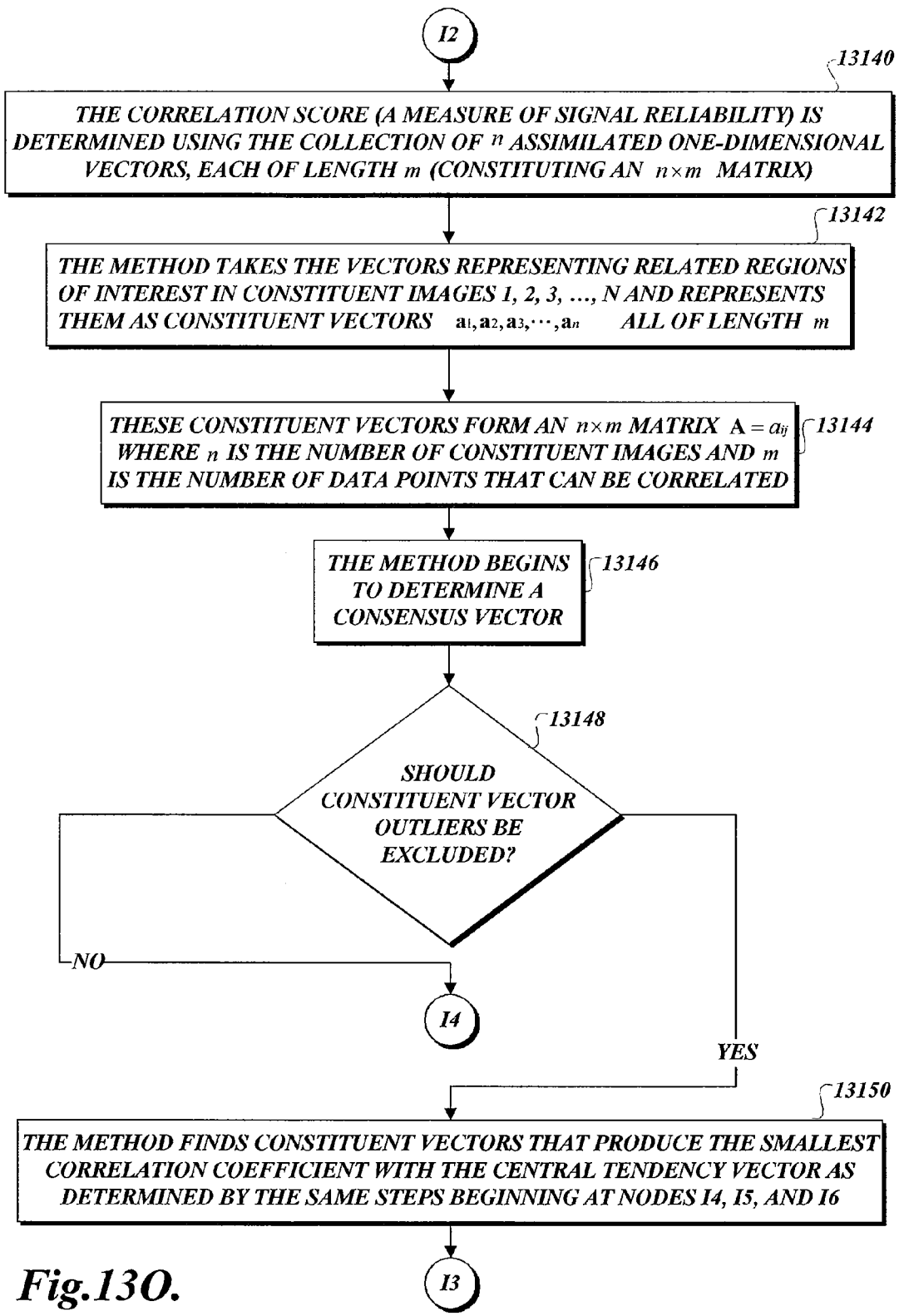
Figure 13P:
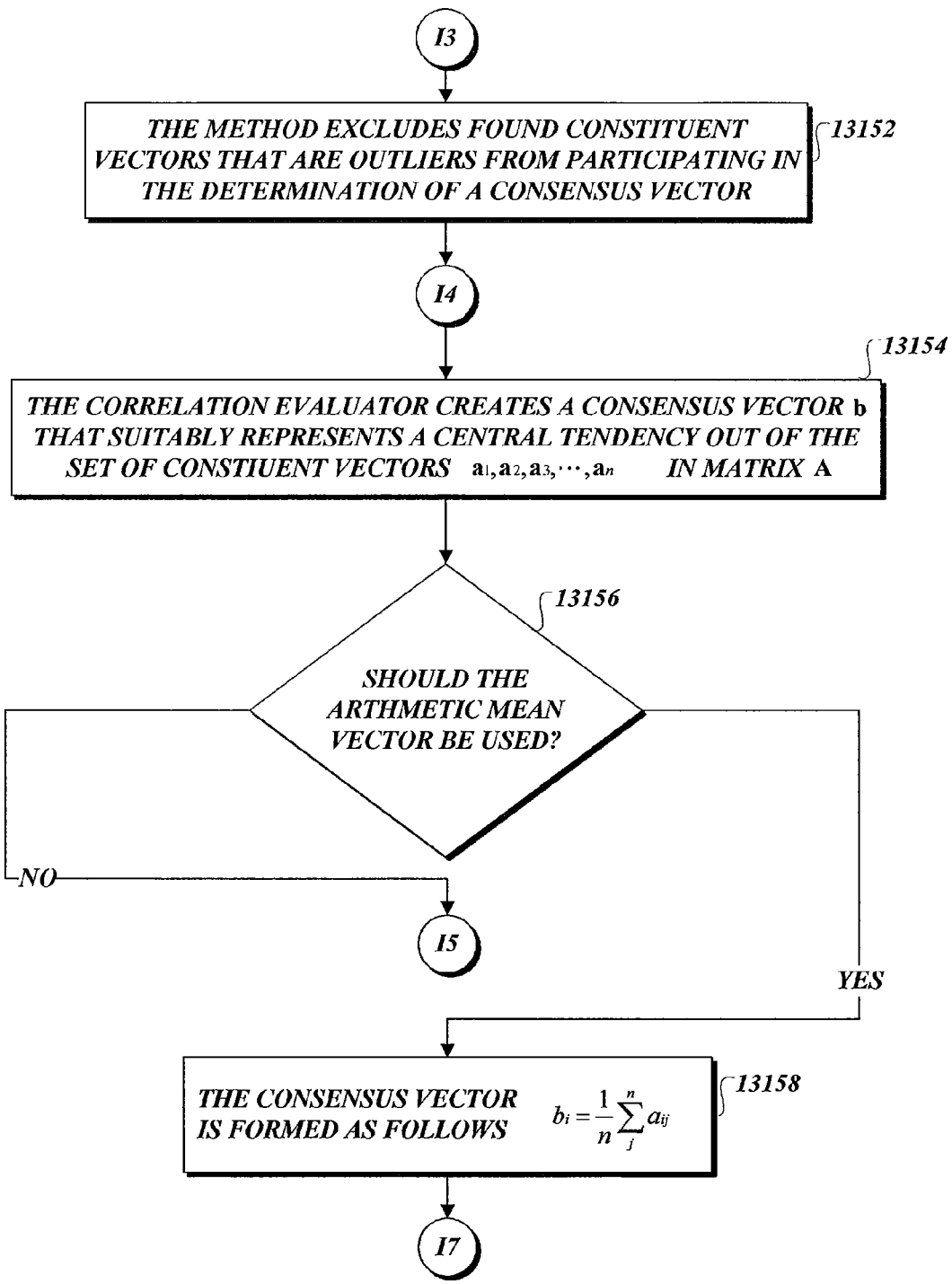
Figure 13Q:
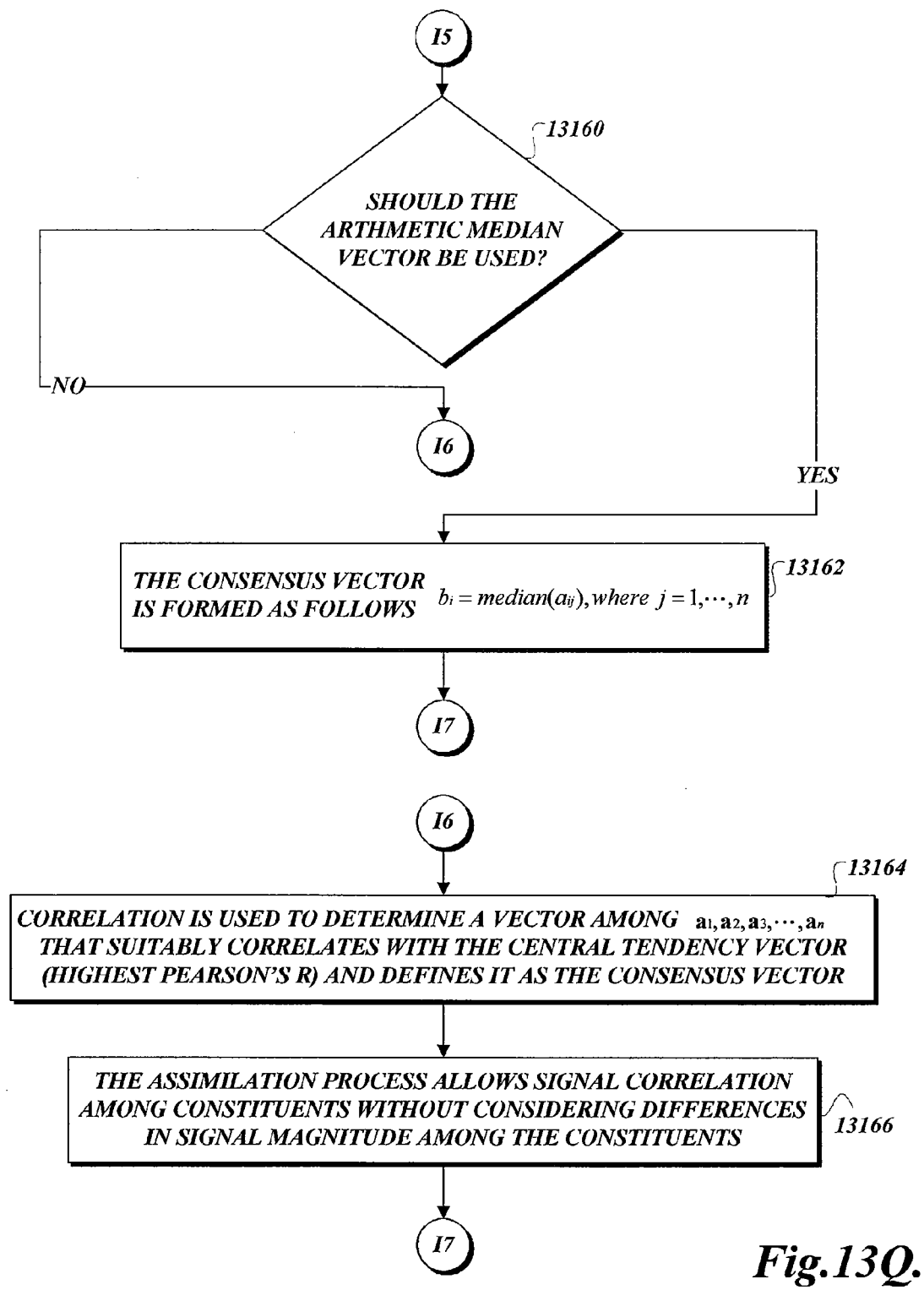
Figure 13R:
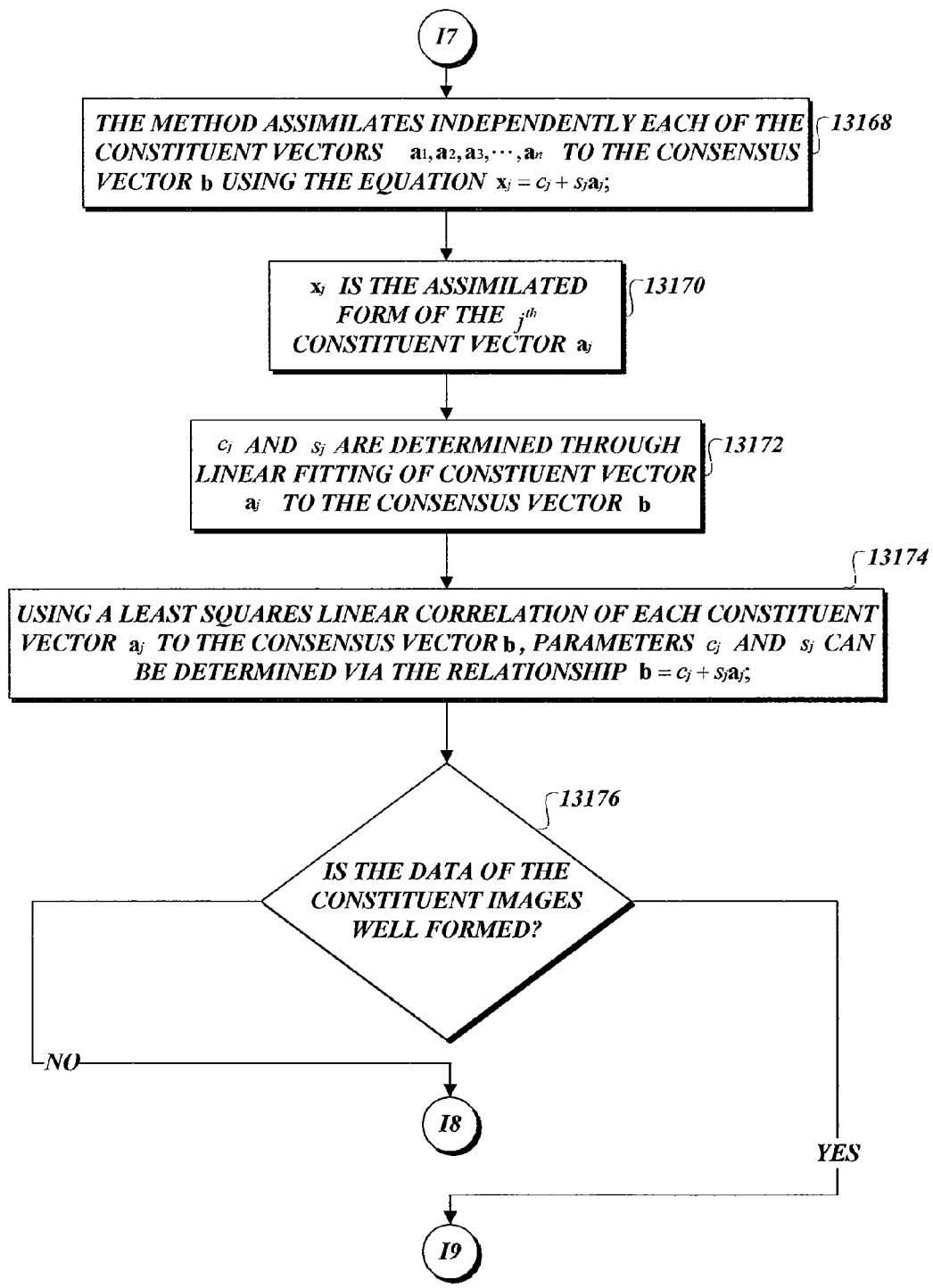
Figure 13S:
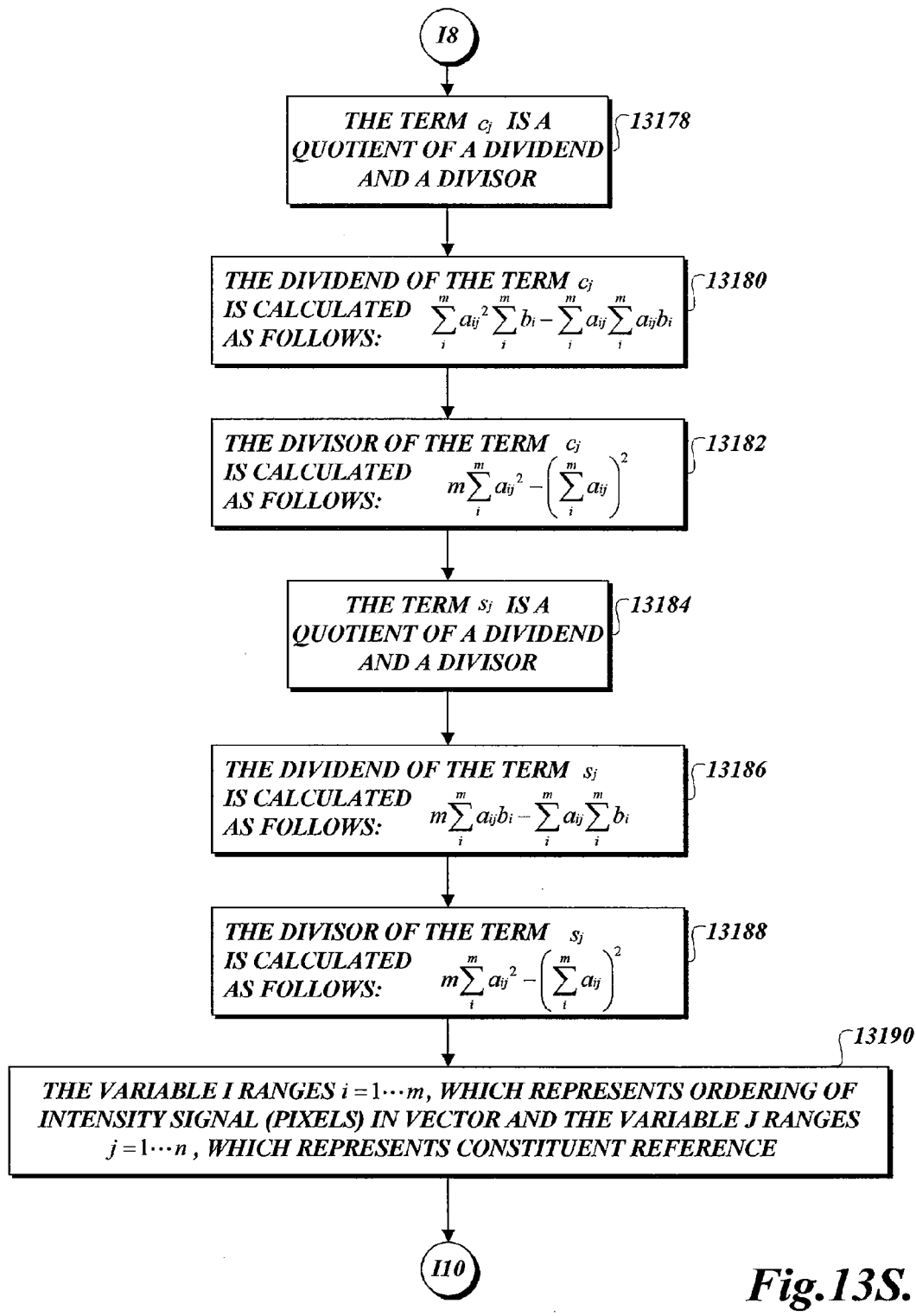
Figure 13T:
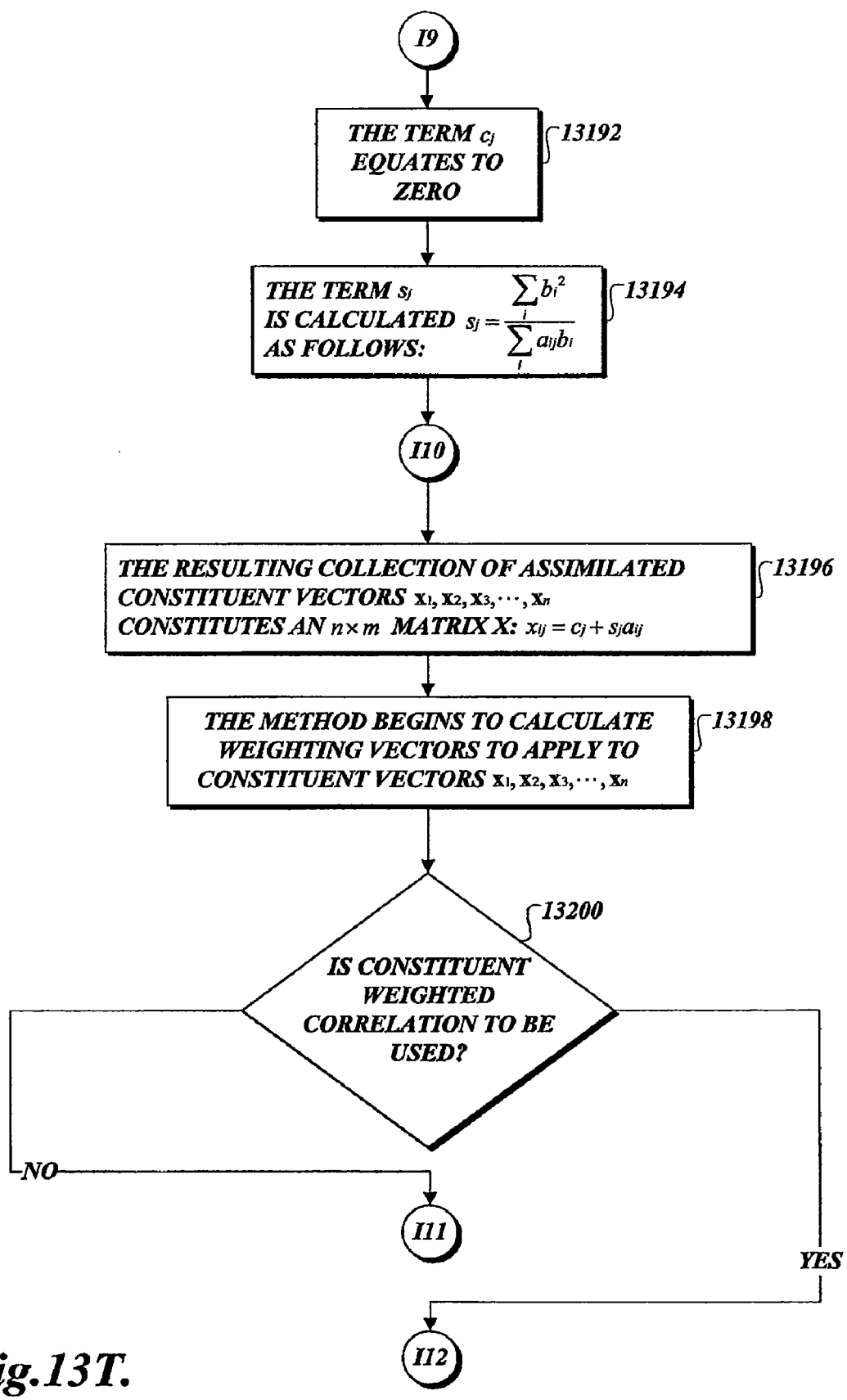
Figure 13U:
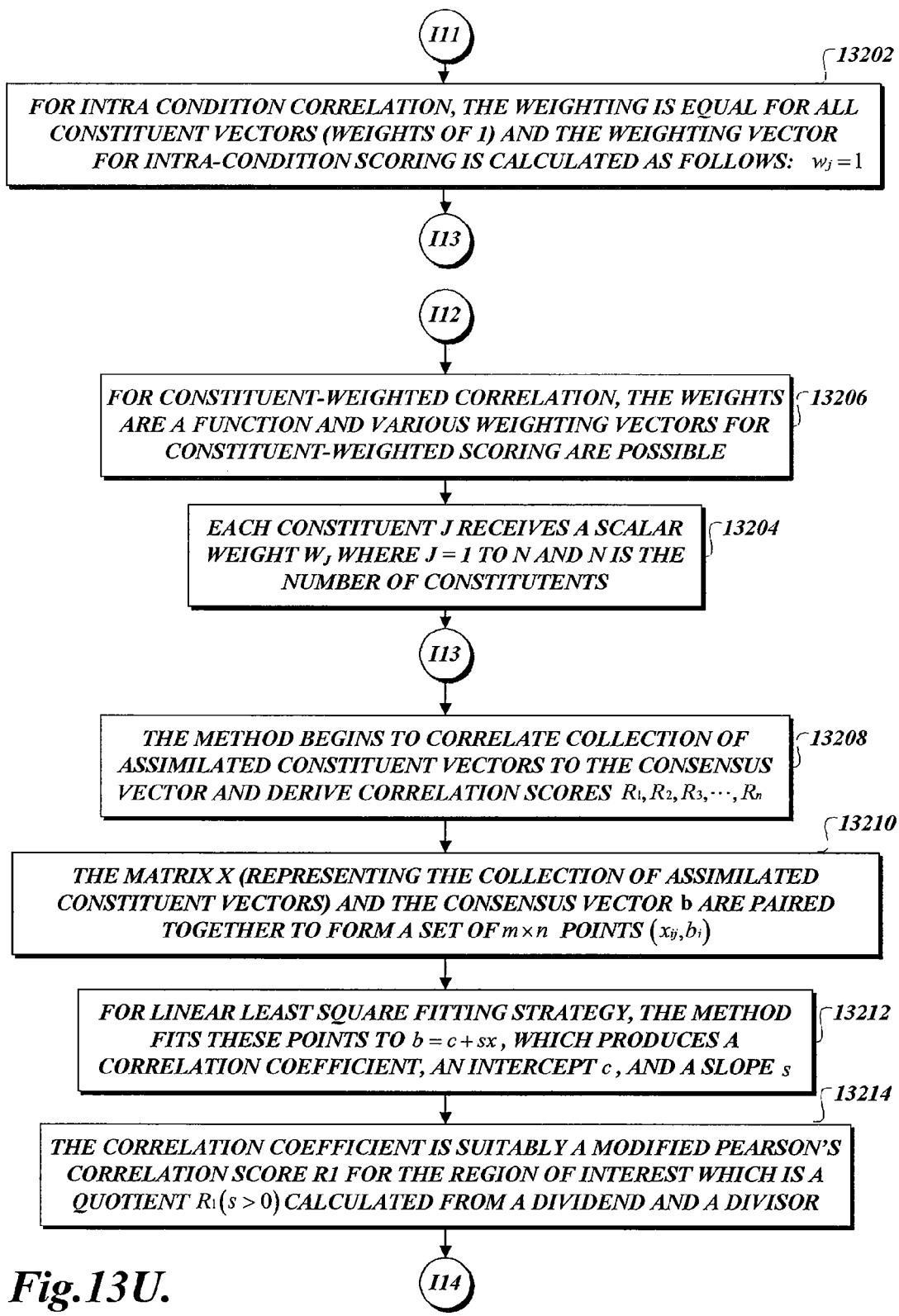
Figure 13V:
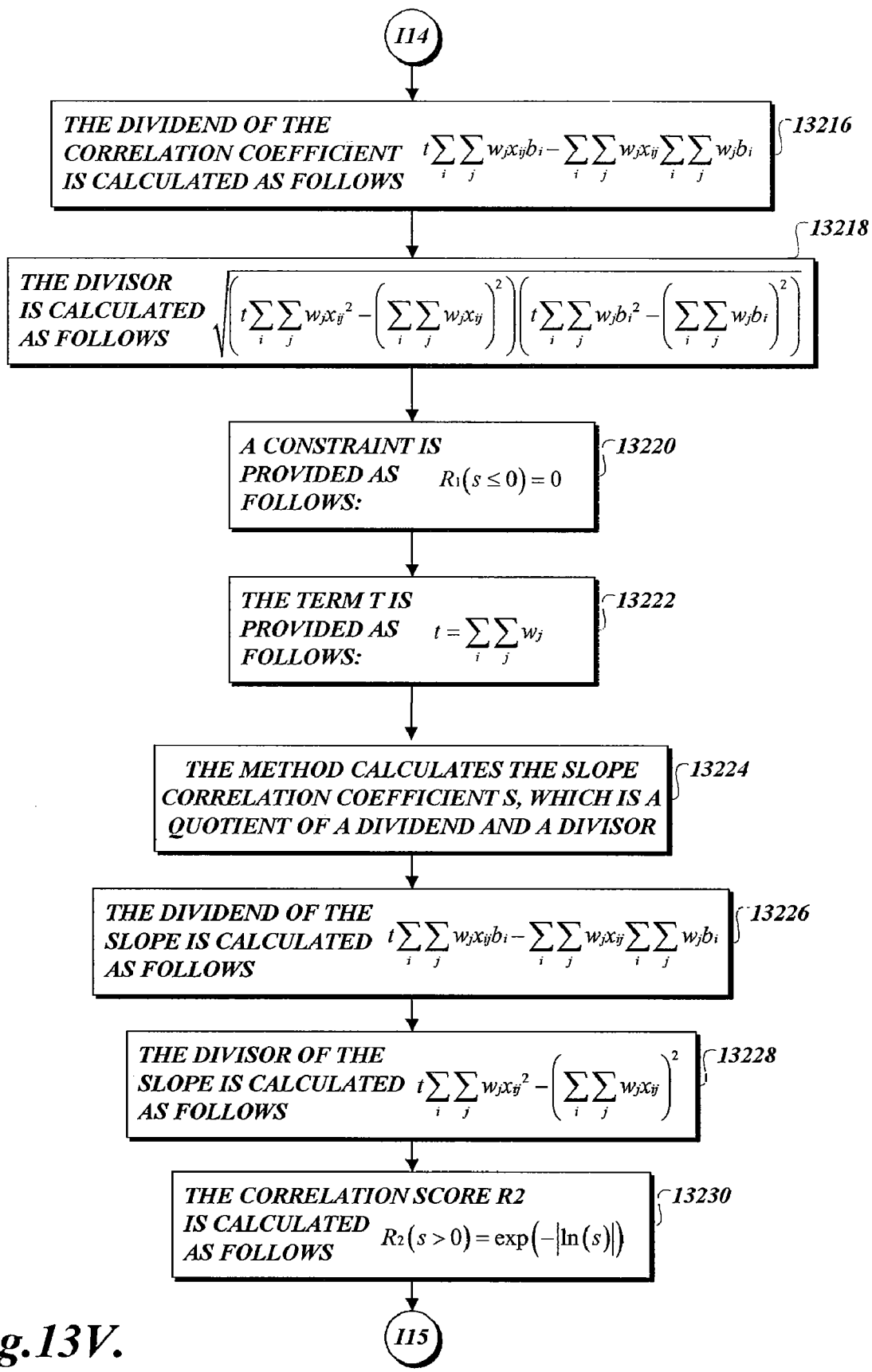
Figure 13W:
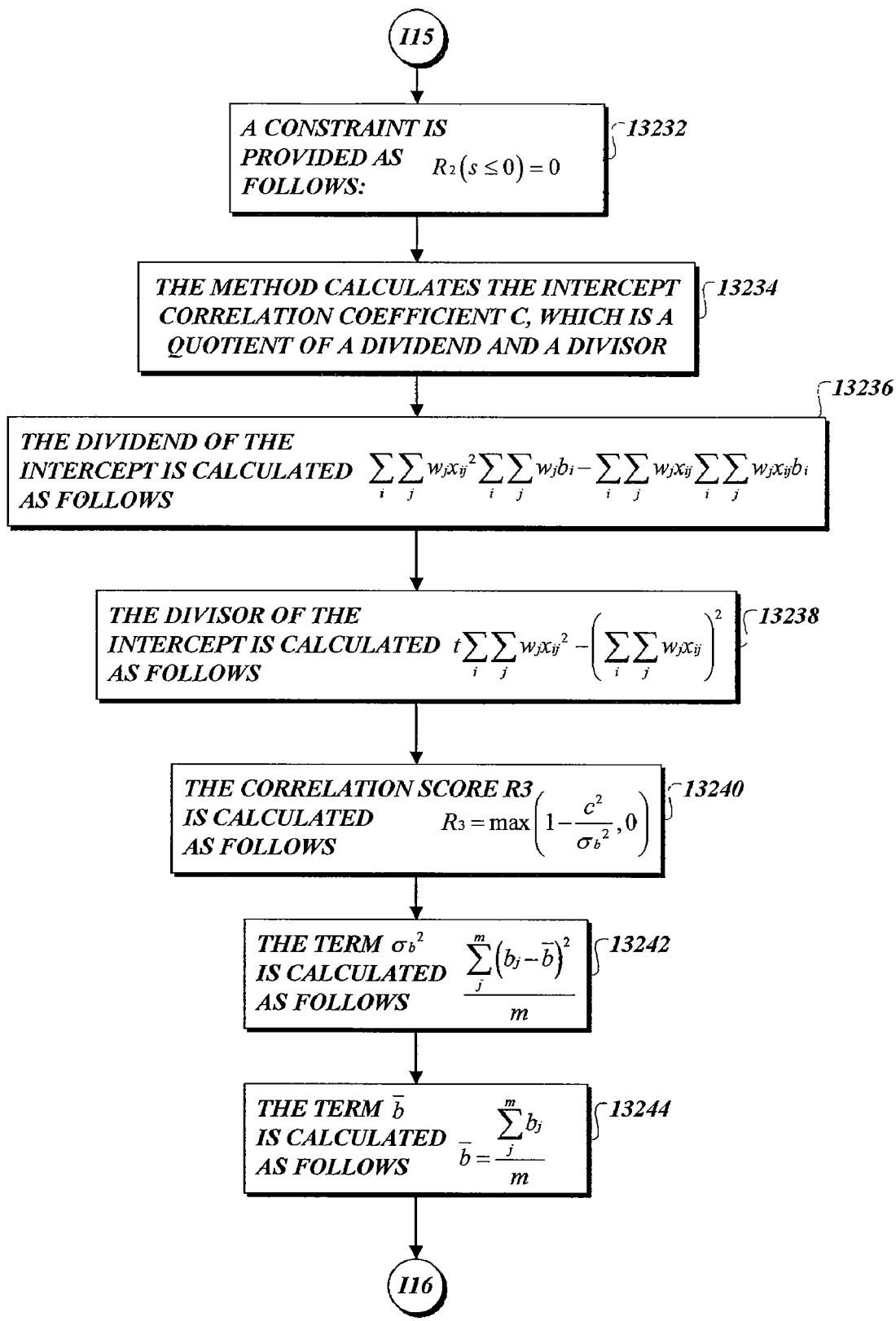
Figure 13X:
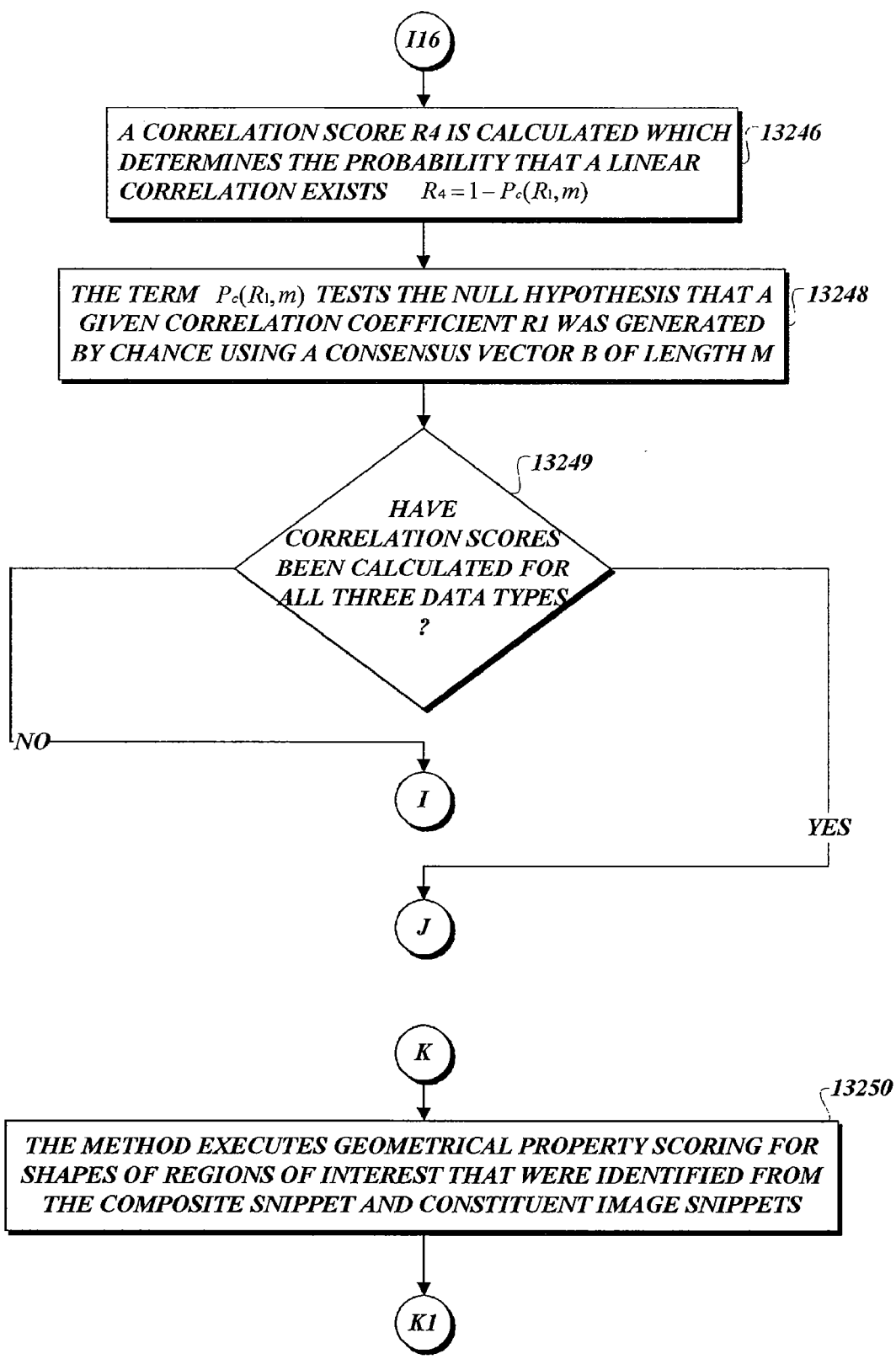
Figure 13Y:
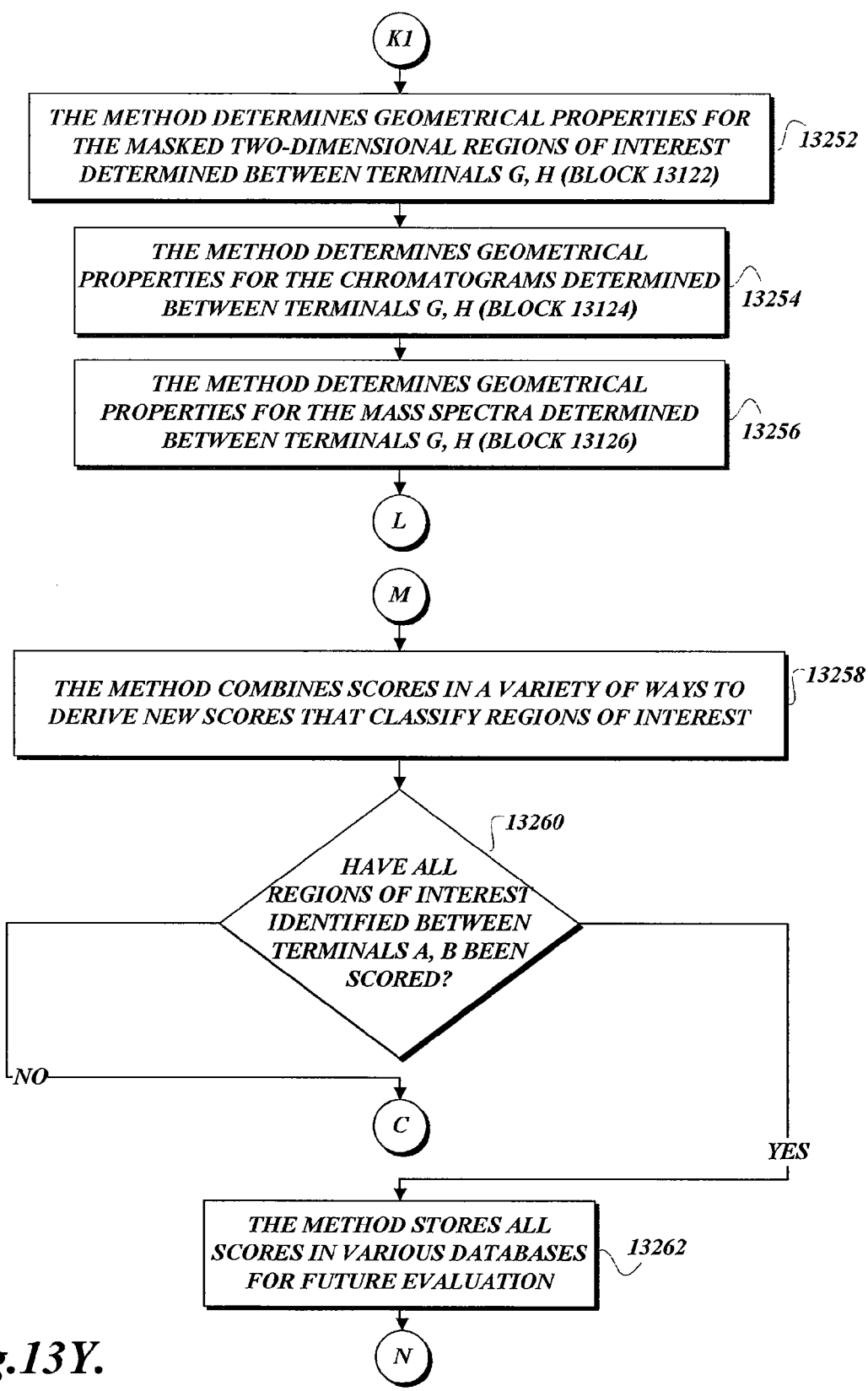

FIGS. 13A-13Y illustrate a method 13000 for processing regions of interest to discover biological features. From a start block, the method 13000 proceeds to a set of method steps 13002, defined between a continuation terminal ("terminal A") and an exit terminal ("terminal B"). The set of method steps 13002 describes the execution of a data selection process, in which data is extracted from prepared biological samples. From terminal A (FIG. 13D), the method 13000 proceeds to block 13018 to execute LC/MS processing to produce a set of LC/MS images (constituent images). At block 13020, the method optionally executes a time-warp algorithm to align the set of constituent images. A composite image is formed from the set of constituent images in a block 13022. The method 13000 then identifies regions of interest in a composite image by detecting variations in the composite image (such as peak detection) in block 13024. At block 13026, the method obtains the coordinates defining the various regions of interest in the composite image. Using the coordinates, the method 13000 defines various regions of interest in the constituent images that relate to respective regions of interest in the composite image in block 13028. At block 13030, the method receives instructions to select a subset of constituent images based on certain criteria (such as experimental definition, experimental condition, or biological variation). The method 13000 then proceeds to exit terminal B.

The subset of constituent images participates in the subsequent scoring process to produce score which may pertain to a single region of interest from one constituent image or to a set of corresponding regions of interest for a collection of constituent images (one region of interest per constituent image). In selecting constituent images for correlation scoring, it is suitable to recognize that a chemical species (registered as an ion) may be present in one condition but not in another condition. When the selected constituent images are from multiple treatment conditions or biological variations, poor correlation on important variations (such as peaks) can be expected because an absent signal from one condition is compared to the presence of another signal derived by the existence of a chemical species in another condition. Since these scores may be used to distinguish reliable from unreliable data, pertinent variations among conditions may be mistaken as unreliability. This situation may be addressed by selecting a suitable condition to represent related regions from various constituent images. For example, one may choose the average, median, best, worst, or most intense score among the scores to represent a particular condition at a time. The regions of interest for all constituent images inherit this one score. This method is named intra-condition correlation scoring and is discussed later. In principle, this technique may be applied to two or more images regardless of their conditions. Alternately, a different statistical method can be employed which allows use of weighted constituents from multiple conditions where the chemical species appears in only some of these conditions. This latter method is named constituent-weighted correlation scoring and is discussed later. This method can be used in cases where the number of constituent images in a condition is small, causing a questionable statistical conclusion.

From terminal B (FIG. 13A), the method 13000 proceeds to a set of method steps 13004, defined between a continuation terminal ("terminal C") and an exit terminal ("terminal D"). The set of method steps 13004 executes a microalignment process that is optional to align regions of interest without having to resort to macroalignment.

From terminal C (FIG. 13E), the method 13000 proceeds to block 13032 where the method identifies an original region of interest in the composite image that has not been scored yet for processing. At block 13034, the method identifies regions of interest in the subset of constituent images that relate to the original region of interest in the composite image. At block 13036, the method measures the width of the original region of interest (in the retention time dimension) in the composite image. The method then causes each identified region of interest in various constituent images to have the same measured width (see block 13038). At block 13040, the method further expands the width of each identified region of interest backward and forward in the retention time dimension. The expansion allows inclusion of pertinent signal that may have been excluded in the initial definition of the region of interest. One embodiment uses an expansion in both directions by the measured width, resulting in a three-fold increase widthwise. The method optionally reduces the height of each identified region of interest to focus on a chromatogram at a central M/Z modified by a tolerance, such as 1 in a block 13042. At block 13044, the method begins a process to identify a master image for micro-alignment. The method then continues to another continuation terminal ("terminal C1").

From terminal C1 (FIG. 13F), the method 13000 proceeds to decision block 13046 where a test is performed to determine whether the original region of interest is selected as the master snippet. If the answer to the test at decision block 13046 is NO, the method 13000 proceeds to block 13048 where the master snippet is selected from among the constituent images and the composite image. The method then continues to another continuation terminal ("terminal C7"). If, instead, the answer is YES to the test at decision block 13046, the method continues to another continuation terminal ("terminal C2").

From terminal C2 (FIG. 13F), the method 13000 proceeds to block 13050 where the method begins to find a region of interest (as the prospective master snippet) in the subset of constituent images that correlates with the original region of interest. At block 13052, the original region of interest is a matrix $U=u_{ij}$ and the prospective master snippet is defined as $V=v_{ik}$. As shown in block 13054, the variable k has a range from $j-n, \ldots, j+n$, where n is the width of the original region of interest (in pixels), the variable i ranges from 1 to m in the mass/charge dimension, and the variable j ranges from 1 to n along the retention time dimension. At block 13056, $v(q)$ is a vector derived from the prospective master snippet. The variable q represents the retention time shift and ranges from $-n, \ldots, n$ as shown in block 13056. The method 13000 then continues to another continuation terminal ("terminal C3").

From terminal C3 (shown in FIG. 13G), the method prepares to calculate normalized cross-correlation maximum $t_1(q)$ in a block 13058. At block 13060, the method calculates the term $$\overline{u} = \frac{1}{mn}\sum_i^m \sum_j^n u_{ij}.$$

The term $\overline{u}$ is the result of the above mathematical operation. At block 13062, the method further calculates the following term $$\overline{v(q)} = \frac{1}{mn}\sum_i^m \sum_j^n v_{i(j-q)}.$$

The resulting $\overline{v(q)}$ is the result of such a mathematical operation. The method 13000 proceeds to block 13064 where the method calculates $t_1(q)$ from the following term $$t_1(q) = \frac{1}{(mn-1)^2}\sum_i^m \sum_j^n \frac{(u_{ij} - \overline{u})(v_{i(j-q)} - \overline{v(q)})}{\sqrt{\sum_i \sum_j (u_{ij} - \overline{u})^2}\sqrt{\sum_i \sum_j (v_{i(j-q)} - \overline{v(q)})^2}}$$

The method 13000 continues to another continuation terminal ("terminal C4"). From terminal C4 (FIG. 13G), the method proceeds to block 13066 where the method prepares to calculate linear correlation coefficient maximum $t_2(q)$, which is a quotient of a dividend and a divisor. At block 13068, the dividend is calculated as follows:

$$mn\sum_i^m \sum_j^n u_{ij}v_{i(j-q)} - \sum_i^m \sum_j^n u_{ij} \sum_i^m \sum_j^n v_{i(j-q)}$$

At block 13070, the divisor is calculated as follows:

$$\sqrt{\left(mn\sum_i^m \sum_j^n u_{ij}^2 - \left(\sum_i^m \sum_j^n u_{ij}\right)^2\right)\left(mn\sum_i^m \sum_j^n v_{i(j-q)}^2 - \left(\sum_i^m \sum_j^n v_{i(j-q)}\right)^2\right)}$$

The method 13000 then continues to another continuation terminal ("terminal C5").

From terminal C5 (FIG. 13H), the method prepares to calculate normalized least-square difference minimum $t_3(q)$. See block 13072. The method calculates the following expression:

$$t_3(q) = \sum_i \left(\frac{\sum_j v_{i(j-q)}}{\sum_i \sum_j v_{i(j-q)}} - \frac{\sum_j u_{ij}}{\sum_i \sum_j u_{ij}}\right)^2$$

See block 13074. The method then continues to another continuation terminal ("terminal C6"). From terminal C6 (FIG. 13H), the method proceeds to block 13076 where a score for the region of interest is selected among normalized cross-correlation maximum, linear correlation coefficient maximum, and normalized least-square difference minimum. The method 13000 proceeds to decision block 13078 where a test is performed to determine whether there is another region of interest to evaluate. If the answer to the test at decision block 13078 is YES, the method proceeds to terminal C2 and loops back to block 13050 where the above-identified processing steps are repeated. Otherwise, if the answer to the test at decision block 13078 is NO, then the method proceeds to block 13080 where the region of interest with a score that best correlates with the original region of interest in a composite image is selected as the master snippet for microalignment. The method then continues to another continuation terminal ("terminal C7").

From terminal C7 (FIG. 13I1), the method selects a region of interest (an image snippet) in a constituent image in the subset for microalignment with the master snippet. See block 13082. The master snippet is a matrix $U=u_{ij}$ and the image snippet to be microaligned is defined as $V=v_{ik}$. See block 13084. Furthermore, n is the width of the original region of interest (in pixels) and i ranges from 1 to m in the mass/charge dimension, and j ranges from 1 to n along the retention time dimension, and k ranges from j–n to j+n along the retention time dimension. See blocks 13083, 13085. v(q) is derived from the image snippet $v_{ik}$ by shifting k (in the retention time dimension) by q, which ranges –m, . . . , n. See block 13086. q is calculated based on a suitable correlation of the intensity of v(q) with the master snippet $u_{ij}$ excluding any pixels that do not match up because k–q≠j. See block 13088. Various strategies to time alignment may be used. What follows are some example strategies.

One value of q is calculated such that $t_1(q)$ is maximized using the normalized cross-correlation maximum described between terminals C3, C4. See block 13090. The method 13000 proceeds to another continuation terminal ("terminal C11").

From terminal C11 (FIG. 13I2), another value of q is calculated such that $t_2(q)$ is maximized using the linear correlation coefficient maximum described between terminals C4, C5. See block 13092. A further value of q is calculated such that $t_3(q)$ is minimized using the normalized least-square difference minimum described between terminals C5, C6. See block 13094. The method 13000 then proceeds to another continuation terminal ("terminal C8").

From terminal C8 (FIG. 13J), the method proceeds to decision block 13096 where a test is performed to determine whether there is a correlation that identifies a suitable microalignment. If the answer to the test at decision block 13096 is YES, the shifted image snippet that provides a suitable correlation with the master snippet is kept for further processing. See block 13098. The method then continues to another continuation terminal ("terminal C9"). If the answer to the test at decision block 13096 is NO, the method continues to another decision block 13100 where a test is performed to determine whether centroid alignment should be used. If the answer to the test at decision block 13100 is YES, the method shifts the retention time of the image snippet such that its maximum or centroid coincides with the maximum or centroid of the master snippet. See block 13102. The method then continues to terminal C9. If the answer to the test at decision block 13100 is NO, the method continues to another continuation terminal ("terminal C10").

From terminal C10 (FIG. 13K), the method proceeds to decision block 13104 where a test is performed to determine whether another method of alignment such as adaptive alignment should be used. If the answer to the test at decision block 13104 is YES, the method executes the other form of alignment to microalign the image snippet with the master snippet. See block 13106. The method then continues to terminal C9. If the answer to the test at decision block 13104 is NO, the method continues to terminal C9 and further proceeds to decision block 13108 where a test is performed to determine whether there is another region of interest for microalignment. If the answer to the test at decision block 13108 is YES, then the method proceeds to terminal C7 and loops back to block 13082 where the above-identified processing steps are repeated. Otherwise, if the answer to the test at decision block 13108 is NO, then the method continues to exit terminal D.

From terminal D (FIG. 13A), the method 13000 proceeds to a set of method steps 13006 defined between a continuation terminal ("terminal E") and an exit terminal ("terminal F"). The set of method steps 13006 executes a revised region of interest detection process to focus on pixels that are suitable for a subsequent scoring process.

From terminal E (FIG. 13L), the method proceeds to decision block 13110 where a test is performed to determine whether microalignment was executed. If the answer to the test at decision block 13110 is NO, the method proceeds to exit terminal F. Otherwise, if the answer to the test at decision block 13110 is YES, then the method executes steps to create a composite snippet (different from the original region of interest in the composite image) in block 13112.

At block 13114, the method combines portions (pixel by pixel) of shifted image snippets if they overlay the original region of interest and the master snippet $u_{ij}$ such that k−q=j for an image $v_{ik}$ is shifted by q. At block 13116, the method redetects regions of interest guided by the newly created composite image snippet. The method executes variation detection (such as peak or spot detection) by thresholding, watershed analysis, horizontal or radial edge detection by a Laplace of Gaussian convolution to identify new peak masks in a composite snippet. See block 13118. At block 13120, the method selects a way to describe the region of interest, including the use of a two-dimensional mask of the scripted pixels. The two-dimensional mask identifies the pixels that participate in calculation of a correlation score and a geometric score. The method then continues to exit terminal F.

From terminal F (FIG. 13B), the method 13000 proceeds to a set of method steps 13008, defined between a continuation terminal ("terminal G") and an exit terminal ("terminal H"). The set of method steps 13008 executes data extraction to prepare for a scoring process. From terminal G (FIG. 13M), the method applies the two-dimensional mask to each constituent image of the subset to obtain new regions of interest. See block 13122. The method 13000 then continues to block 13123 where each two dimensional image is serialized. This means that for each snippet the method produces a one-dimensional vector of pixel intensities. In other words, the numerical values of the pixel intensities from one snippet are strung together in a linear fashion to form a vector. Given a snippet whose masked area contains P pixels, the method labels each pixel with a unique number from 1 to P. The numbers establish an arbitrary pixel order that sets the intensities of a vector of length P to the intensities of the 2D image snippet. Specifically the intensity at position j in the vector is set to the intensity of the pixel in the 2D image snippet whose label is j. In other words, the labels constitute an arbitrary pixel order that relates the intensities of the 2D image snippet to the intensities of a vector of length P. Any pixel order may be used, as long as the same order is used for all related masked regions of interest. This vector will be correlated with other image snippets that had been masked with the same mask and that were serialized in the same order. At block 13124, the method determines a characteristic chromatogram from each region of interest (constituent snippet) of the constituent images. These characteristic chromatograms may be determined where the chromatogram of the masked pixels with the central m/z with certain tolerance is used. Tolerance is typically one pixel but may range from zero up to the boundaries of the image snippet. The central m/z may be determined in any suitable techniques including the use of the centroid or maximum of the masked pixels in their respective image snippets. Alternately, characteristic chromatograms may be obtained by integrating or averaging the masked pixels over all m/z at each retention time.

At block 13126, the method determines characteristic mass spectra from each region of interest (constituent snippet) of the constituent images. Each characteristic spectrum may be taken at the retention time of the intensity maximum or the centroid with a tolerance of the characteristic chromatogram of the image snippet. Tolerance is typically one pixel but may range from zero up to the retention time boundaries of the image snippet. Alternately, the characteristic spectra may be obtained by integrating or averaging the masked pixels over all retention times at each m/z interval.

At block 13128, the method selects members of a set of constituent snippets to extract geometrical properties, for which members may include a composite snippet to which the constituent snippets relate. At block 13130, the method further selects members of a set of constituent snippets to calculate correlation scores, for which members may include the composite snippet to which the constituent snippets relate. The method then continues to exit terminal H.

From terminal H (FIG. 13B), the method 13000 proceeds to a set of method steps 13010 defined between a continuation terminal ("terminal I") and an exit terminal ("terminal J"). The set of method steps 13010 calculates correlation scores for extracted data sets from among mass/charge spectra, liquid chromatography chromatograms, and/or serialized two-dimensional LC/MS snippets.

From terminal I (FIG. 13N1), the method 13000 proceeds to block 13131 where the method prepares to determine which type of data (serialized images, chromatograms, or spectra) are to be processed. The method continues to decision block 13132 where a test is performed to determine whether the method has already calculated the correlation scores for the serialized snippets of the related regions of interest. If the answer to the test at decision block 13132 is NO, then the method 13000 continues to block 13133. Otherwise, if the answer to the test at decision block 13132 is YES, then the method proceeds to another continuation terminal ("terminal I1A"). At block 13133 the serialized image snippets, one for each constituent, are prepared for correlation. The serialized image snippets are considered a set of vectors of equal length that can be packaged as a matrix. The method proceeds to another continuation terminal ("terminal I2"). From terminal I1A (FIG. 13N2) the method 13000 proceeds to decision block 13134 where a test is performed to determine whether the method has already calculated the correlation scores for the chromatograms of the related regions of interest. If the answer to the test at decision block 13134 is NO, then the method 13000 continues to block 13135. Otherwise, if the answer to the test at decision block 13134 is YES, then the method proceeds to block 13136. At block 13135 the chromatograms, one for each constituent, are prepared for correlation. The chromatograms are considered a set of vectors of equal length that can be packaged as a matrix. At block 13136, the spectra, one for each constituent, are prepared for correlation. The spectra are considered a set of vectors of equal length that can be packaged as a matrix.

The method proceeds to another continuation terminal ("terminal I2").

From terminal I2 (FIG. 13O), the method proceeds to block 13140 where the method begins to determine the correlation score (a measure of signal reliability) using the collection of one-dimensional vectors that constitute an n by m matrix. The input to the correlation evaluator 210 is a set of ordered vectors of equal length, each vector representing one constituent image snippet. The set may contain the chromatograms, as determined in block 13124, or spectra, as determined in block 13126, or serialized two dimensional variations (such as peaks), as determined in block 13123, that pertain to a common region of interest. The output of the correlation evaluator 210 is a score which indicates how well these vectors correlate with each other. This correlation is interpreted as a measure of signal reliability. The method takes the vectors representing constituent images 1, 2, 3, ..., n, and represents them as constituent vectors $a_1$, $a_2$, $a_3$, ..., $a_n$ all of length m in a block 13142. At block 13144, these constituent vectors form an n×m matrix $A=a_{ij}$ where n is the number of constituent images and m is the number of data points that can be correlated:

$$a_j = \begin{bmatrix} a_{1j} \\ a_{2j} \\ a_{3j} \\ \vdots \\ a_{mj} \end{bmatrix};$$

$$\Rightarrow A = [a_1 \; a_2 \; a_3 \; \ldots \; a_n] = \begin{bmatrix} a_{11} & a_{12} & a_{13} & \ldots & a_{1n} \\ a_{21} & & & & a_{2n} \\ a_{31} & & \ddots & & a_{3n} \\ \vdots & & & & \vdots \\ a_{m1} & a_{m2} & a_{m3} & \ldots & a_{mn} \end{bmatrix}.$$

Matrix A is the input to the correlation evaluator 210.

At block 13146, the method begins to determine a consensus vector. The method proceeds to decision block 13148 where a test is performed to determine whether constituent vector outliers should be excluded. If the answer to the test at decision block 13148 is NO, the method continues to another continuation terminal ("terminal I4"). If instead the answer to the test at decision block 13148 is YES, the method proceeds to block 13150 where it finds constituent vectors that produce the smallest correlation coefficient with the central tendency vector. The method continues to another continuation terminal ("terminal I3").

From terminal I3 (FIG. 13P), the method excludes found constituent vectors that are outliers from participating in the determination of a consensus vector. See block 13152. Alternately, a vector can be found among $a_1$, $a_2$, $a_3$, ..., $a_n$ that correlates best (with highest Pearson's R) with the central tendency vector. In this scenario, the best correlated vector is the new consensus vector.

The method then continues to terminal I4, which proceeds to block 13154, where the correlation evaluator creates a consensus vector b that suitably represents a central tendency out of the set of constituent vectors $a_1$, $a_2$, $a_3$, ..., $a_n$ in matrix A. The method 13000 proceeds to block 13156 where a test is performed to determine whether the mean vector should be used. If the answer to the test at decision block 13156 is NO, the method proceeds to another continuation terminal ("terminal I5"). Otherwise, if the answer to the test at decision block 13156 is YES, then the method proceeds to block 13158 where the consensus vector is calculated as follows:

$$b_i = \frac{1}{n}\sum_j^n a_{ij}.$$

The method then continues to another continuation terminal ("terminal I7").

From terminal I5 (FIG. 13Q), the method 13000 proceeds to decision block 13160 where a test is performed to determine whether the median vector should be used. If the answer to the test at decision block 13160 is NO, the method proceeds to another continuation terminal ("terminal I6"). Otherwise, if the answer to the test at decision block 13160 is YES, then the method proceeds to block 13162 where the consensus vector is calculated as follows:

$$b_i = \text{median}(a_{ij}), \text{ where } j=1, \ldots, n$$

The method then continues to another continuation terminal ("terminal I7").

From terminal I6 (FIG. 13Q), the method 13000 proceeds to block 13164 where correlation is used to determine a vector among $a_1$, $a_2$, $a_3$, ..., $a_n$ that suitably correlates with the central tendency vector (highest Pearson's R) and defines it as the consensus vector. Differences in intensity among the set of vectors in the matrix are important for discovering biological features. However, in various embodiments of the present subject matter, differences in the amount of expression are not the focus; instead, the correlation evaluator 210 determines whether the signal correlates from one constituent image to another within a region of interest.

The assimilation process allows signal correlation among related regions of interest without considering consistent differences in signal magnitude. See block 13166. The method then continues to terminal I7. From terminal I7 (FIG. 13R), the method assimilates independently each of the constituent vectors $a_1$, $a_2$, $a_3$, ..., $a_n$ to the consensus vector b using a scaling or linear transformation, such as the equation $x_j = c_j + s_j a_j$; The term $x_j$ is the assimilated form of the $j^{th}$ constituent vector $a_j$. See block 13170. $c_j$ and $s_j$ are determined through linear fitting of constituent vector $a_j$ to the consensus vector b. See block 13172. At block 13174, using a least-squares linear correlation of each constituent vector $a_j$ to the consensus vector b, parameters $c_j$ and $s_j$ can be determined via the relationship $b = c_j + s_j a_j$. The method 13000 proceeds to decision block 13176 where a test is performed to determine whether the data of the constituent images is well formed. Well formed data can be modeled by a linear relationship wherein $a_{ij} > 0$; $b_i > 0$; $c_j = 0$; and $s_j > 0$. This model assimilates the constituent vectors based on a presumption that the represented variations (such as peaks) are isolated and the background is negligible. To the extent that image snippets contain significantly differing backgrounds, a linear regression forced through the origin may result in a greater variance and thus a lower correlation score.

If the answer to the test at decision block 13176 is NO, the method proceeds to another continuation terminal ("terminal I8"). Otherwise, if the answer to the test at decision block 13176 is YES, then the method proceeds to another continuation terminal ("terminal I9").

From terminal I8 (FIG. 13S), the term $c_j$ is a quotient of a dividend and a divisor. See block 13178. At block 13180, the dividend of the term $c_j$ is calculated as follows:

$$\sum_i^m a_{ij}^2 \sum_i^m b_i - \sum_i^m a_{ij} \sum_i^m a_{ij} b_i$$

At block 13182, the divisor of the term $c_j$ is calculated as follows:

$$m \sum_i^m a_{ij}^2 - \left(\sum_i^m a_{ij}\right)^2$$

At block 13184, the term $s_j$ is a quotient of a dividend and a divisor. The dividend of the term $s_j$ is calculated as follows:

$$m \sum_i^m a_{ij} b_i - \sum_i^m a_{ij} \sum_i^m b_i$$

At block 13188, the divisor of the term $s_j$ is calculated as follows:

$$m \sum_i^m a_{ij}^2 - \left(\sum_i^m a_{ij}\right)^2$$

At block 13190, the variable i ranges i=1 . . . m which represents an ordering of intensity signal (pixels) in vector and the variable j ranges j=1 . . . n, which represents a constituent reference. The method then continues to another continuation terminal ("terminal I10").

From terminal I9 (FIG. 13T), the method proceeds to block 13192 where the term $c_j$ equates to zero. At block 13194, the term $s_j$ is calculated as follows:

$$s_j = \frac{\sum_i b_i^2}{\sum_i a_{ij} b_i}$$

The method proceeds to another continuation terminal ("terminal I10") and proceeds further to block 13196 where the resulting collections of assimilated constituent vectors $x_1$, $x_2$, $x_3$, . . . , $x_n$ constitute n×m matrix X: $x_{ij} = c_j + s_j a_{ij}$.

From block 13198, the method begins to calculate weighting vectors to apply to constituent vectors $x_1$, $x_2$, $x_3$, . . . , $x_n$. The method then proceeds to decision block 13200 where a test is performed to determine whether a constituent weighting correlation is to be used. If the answer to the test at decision block 13200 is NO, the method proceeds to another continuation terminal ("terminal I11"). Otherwise, if the answer to the test at decision block 13200 is YES, then the method proceeds to another continuation terminal ("terminal I12").

From terminal I11 (FIG. 13U), the method proceeds to block 13202 where for intra-condition correlation, the weighting is equal for all constituent vectors (weights of 1). The weighting vector for intra-condition scoring is calculated as follows: $w_j = 1$. The method then continues to another continuation terminal ("terminal I13"). From terminal I12 (FIG. 13U), the method proceeds to block 13206 where for constituent-weighted correlation, the weights are a function, and various weighting vectors for constituent-weighted scoring are possible. One exemplary function includes a function of the assimilation that was used to minimize its difference from the consensus vector. A higher scaling leads to a lower weighting. In other words, the amount of scaling of a constituent that is required to minimize its difference from the consensus could be inversely proportional to the weight. Alternately, the weighting may be based on the importance of a given constituent. The importance could be modeled by intensity (volume). Each constituent j receives a scalar weight $w_j$ where j=1 to n and n is the number of constituents.

Three examples of weighting vectors for constituent-weighted scoring are provided. In a first example, a model can be provided in which the scaling the vector will scale corresponding signal and noise in an equal fashion. Consequently, the weighting of the scaled vector could be the inverse of the scaling value:

$$w_j = \frac{1}{|s_j|}$$

In a second example, an assumption can be made that a non-zero intercept indicates that there exists significant background signal. In this case the weighting could be modeled as follows:

$$w_j = \frac{\max\left(1 - \frac{c_j^2}{\sigma_{x(j)}^2}, 0\right)}{|s_j|}$$

$$\sigma_{x(j)} = \sqrt{\frac{1}{m-1} \sum_i^m (x_{ij} - \bar{x}_j)^2}$$

$$\bar{x}_j = \frac{1}{m} \sum_i^m x_{ij}$$

In a third example, a model of the weighting is based on the integrated intensities of un-scaled (non-assimilated) region of interest. This model presumes that the constituents that have the most intensity within the region-of-interest are most important:

$$w_j = \sum_i a_{ij}$$

Where $a_{ij}$ for i=1 . . . m are the vectorized intensities of the $j^{th}$ constituent. The third example can be extended by combining the integrated intensities with the weights from either the first or the second example in the following ways:

$$w_j = \frac{1}{|s_j|} \sum_i a_{ij}$$

$$w_j = \frac{\max\left(1 - \frac{c_j^2}{\sigma_{x(j)}^2}, 0\right)}{|s_j|} \sum_i a_{ij}.$$

The method then continues to terminal I13 (FIG. 13U) and further proceeds to block 13208 where the method begins to correlate the collection of assimilated constituent vectors to the consensus vector and derive correlation scores $R_1, R_2, R_3, \ldots, R_n$. At block 13210, the matrix x (representing the collection of assimilated constituent vectors) and the consensus vector b are paired together to form a set of n×m points $(x_{ij}, b_i)$. At block 13212, following the least-squares fitting strategy, the method fits these points to b=c+sx which produces a correlation coefficient, an intercept c and a slope s. At block 13214, the correlation coefficient is suitably a modified Pearson's correlation score R1 for the region of interest, which is a quotient $R_1(s>0)$ calculated from a dividend and a divisor. The method then continues on to another continuation terminal ("terminal I14").

From terminal I14 (FIG. 13V), the dividend of the correlation coefficient is calculated as follows:

$$t\sum_i\sum_j w_j x_{ij} b_i - \sum_i\sum_j w_j x_{ij} \sum_i\sum_j w_j b_i$$

See block 13216. At block 13218, the divisor is calculated as follows:

$$\sqrt{\left(t\sum_i\sum_j w_j x_{ij}^2 - \left(\sum_i\sum_j w_j x_{ij}\right)^2\right)\left(t\sum_i\sum_j w_j b_i^2 - \left(\sum_i\sum_j w_j b_i\right)^2\right)}$$

A constraint at block 13220 is provided as follows:

$R_1(s \leq 0)=0$

At block 13222, the term t is provided as follows:

$$t = \sum_i\sum_j w_j$$

At block 13224, the method calculates the slope correlation coefficient s, which is a quotient of a dividend and a divisor. At block 13226, the dividend of the slope is calculated as follows:

$$t\sum_i\sum_j w_j x_{ij} b_i - \sum_i\sum_j w_j x_{ij} \sum_i\sum_j w_j b_i$$

At block 13228, the divisor of the slope is calculated as follows:

$$t\sum_i\sum_j w_j x_{ij}^2 - \left(\sum_i\sum_j w_j x_{ij}\right)^2$$

At block 13230, the correlation score R2 is calculated as follows:

$R_2(s>0)=\exp(-|\ln(s)|)$

The method then continues to another continuation terminal ("terminal I15"). From terminal I15 (FIG. 13W), a constraint is provided as follows:

$R_2(s \leq 0)=0$

The method 13000 proceeds to block 13234 where the method calculates the intercept correlation coefficient c, which is a quotient of a dividend and a divisor. The dividend of the intercept is calculated as follows:

$$\sum_i\sum_j w_j x_{ij}^2 \sum_i\sum_j w_j b_i - \sum_i\sum_j w_j x_{ij} \sum_i\sum_j w_j x_{ij} b_i$$

The divisor of the intercept is calculated as follows at block 13238:

$$t\sum_i\sum_j w_j x_{ij}^2 - \left(\sum_i\sum_j w_j x_{ij}\right)^2$$

At block 13240, the correlation score R3 is calculated as follows:

$$R_3 = \max\left(1 - \frac{c^2}{\sigma_b^2}, 0\right)$$

The term $\sigma_b^2$ is calculated as follows:

$$\frac{\sum_j^m (b_j - \bar{b})^2}{m}$$

At block 13244 the term $\bar{b}$ is calculated as follows:

$$\bar{b} = \frac{\sum_j^m b_j}{m}$$

The method then continues to another continuation terminal ("terminal I16"). From terminal I16 (FIG. 13X), a correlation score R4 is calculated, which determines the probability that a linear correlation exists:

$R_4=1-P_c(R_1,m)$

See block 13246. At block 13248, the term $P_c(R_1,m)$ tests the null hypothesis that a given correlation coefficient R1 was generated by chance using a consensus vector b of length m. In other words, the method 13000 can determine the probability that a linear correlation exists ($R_4$), and this probability may be used to modify $R_1$. The probability $P_c(R_1,m)$ of the null hypothesis is that a given correlation coefficient $R_1$ was generated by chance using a vector b of length m. This null hypothesis states that given the Pearson's R for a linear regression and the number of degrees of freedom ($f=m-2$), the "scaled constituent vectors" in matrix A or vector x are not correlated with the "repeated consensus vector" b or y. $P_c(R_1,m)$ is the probability that a linear correlation of a random sample of m uncorrelated intensities would result in a correlation coefficient of $R_1$ or larger. The method then continues to decision block 13249 where a test is performed to determine whether the method has already calculated the correlation scores for all three types of vectors: serialized image snippets, chromatograms, and spectra. If the answer to the test at decision block 13249 is YES, then the method proceeds to the terminal ("terminal J"). Otherwise, if the answer to the test at decision block 13249 is NO, then the method proceeds back to terminal I and loops back to block 13248 where the above identified processing steps are repeated.

From terminal J (FIG. 13B), the method 13000 proceeds to a set of method steps 13012, defined between a continuation terminal ("terminal K") and an exit terminal ("terminal L"). The set of method steps 13012 calculates geometrical properties of the regions of interest. From terminal K (FIG. 13X), the method proceeds to block 13250 where the method executes geometrical property scoring for shapes of regions of interest that were identified from the composite snippet and image snippets. The method then continues to another continuation terminal ("terminal K1").

From terminal K1 (FIG. 13Y), the method 13000 proceeds to block 13252 where the method determines geometrical properties for the masked two-dimensional regions of interest determined between terminals G, H (block 13122). At block 13254, the method determines geometrical properties for the chromatograms determined between terminals G, H (block 13124). At block 13256, the method determines geometrical properties for the mass spectra determined between terminals G, H (block 13126). The method then continues to exit terminal L.

From terminal L (FIG. 13C), the method 13000 proceeds to a set of method steps 13014 defined between a continuation terminal ("terminal M") and an exit terminal ("terminal N"). The set of method steps 13014 combines and evaluates the scores according to selected algorithms. From terminal M (FIG. 13Y), the method 13000 combines scores in a variety of ways to derive new scores that classify regions of interest. See block 13258.

As a first example, geometrical properties from composite images can be combined. Geometrical properties can be derived from a single region of interest on a composite image that was derived from any set of constituent images. This method requires well-aligned constituents that comprise the composite image and may benefit from microalignment and regional redefinition. Various geometrical properties (solidity, elliptical assimilation, etc.) can be combined from a single region of interest to create a new geometrical property.

As a second example, geometrical properties from individual constituents can be combined. One type of geometrical property (solidity, elliptical assimilation, and so on) can be combined from corresponding regions of interest like those within a feature. This method does not require a composite image and therefore also does not require microalignment, but the method may benefit from regional redefinition. As a third example, geometrical properties within an individual constituent can be combined. Many types of geometrical properties (solidity, elliptical assimilation, and so on) can be combined from a single region of interest to create a new geometrical property. This new geometrical property may in turn be combined with the same geometrical property type of the corresponding regions of interest from a given set of constituents.

As a fourth example, correlation scores can be combined. Researchers may want a final score that is a combination of the individual components. Such a score allows the researchers to rank regions of interest in a useful manner. If the various correlation scores $R_1, R_2, R_3, \ldots, R_n$ from one set of vectors can be interpreted as probabilities ranging from 0 to 1, where 1 indicates optimal correlation, these scores can be combined by multiplication to create a composite score that also ranges from 0 to 1. Each score $R_i$ can be individually weighted to emphasize or de-emphasize its contribution. The weightings $w_i$ for $R_i$ are exponents. The result is a score between 0 and 1, where a perfect score is 1.

$$R = \prod_{i=1} R_i^{w(i)}$$

$w(i)$ is the weighting factor for the $i^{th}$ score. Equal weightings such as $w_{(i)}=1$ can be used. Other weightings are also useful, such as $w(1)=w(4)$; $w(2)=w(3)$; and $w(1)=2*w(2)$. One suitable weighting would be as follows: $R=R_1^2 R_2^1 R_3^1 R_4^2$.

As a fifth example, geometrical property scores from different constituent images can be combined. To make a feature/composite shape score from individual shape scores, the following relationship is observed:

$$R = R_1^{I_1/I_i} R_2^{I_2/I_i} R_3^{I_3/I_i} \ldots R_n^{I_n/I_i}$$

$$R = \prod_i R_i^{w(i)}$$

$$w(i) = I_i / I_T$$

$$I_T = \sum_i I_i$$

$I_i$ the integrated intensity of the scored region of interest.

Regarding inheritance, one of the correlation scores or a combination of correlation scores can be attributed from one set of constituents or from one image to the region of interest in general (composites, sets of constituents, individual constituents). For example, the maximum intra-condition correlation score could represent the region of interest on all constituent images. A single-constituent score refers to a single region of interest and primarily to a single image, as opposed to a composite image.

Regarding inheritance of geometrical property scores, geometrical properties are scores that are derived from a single region of interest on a single image snippet. This single image snippet may be from one constituent (replicate) or could be a composite image from multiple overlaid image snippets (composite). Multiple geometrical properties from a collection of constituent image snippets can be combined to form a well shaped score that pertains to the region of interest of the set of these constituent images and their composite.

Regarding inheritance of correlation scores, given a region of interest and that there are multiple sets of constituents, like conditions, one may derive a correlation score from each set of constituents. One of these correlation scores will be selected to represent the region of interest. The selection can be based on a variety of methods (e.g., the best, the worst, the median, the arithmetic mean, the geometric mean, or the intensity weighted arithmetic mean). The choice of which method to use depends on the researcher's expectation.

After all sets of constituents (e.g., conditions) have been analyzed and scored, the constituent set with the best score is generally chosen to represent the region of interest (and inherited by the region of interest). The rationale for this approach is to recognize a significant and correlating signal, even if it appears in only one set of constituents. Differences in peaks due to changes in treatment condition are generally the focus of experiments. The best score among a set of conditions may direct the researcher to an interesting piece of data even if some of the conditions have poor scores.

Regarding combination strategies for geometric property scores with correlation scores, correlation scores may be combined with other geometrical shape scores to form new scores. The score that is inherited by a region of interest that contains multiple conditions may be a constituent-weighted score, the best condition score, or the condition score of the most intense condition. The score that belongs to the condition that has the highest value where:

$$V(j) = \text{Score}(j) * \sum_j \sum_i i_{ij}$$

and $i_{ij}$ are the intensities of the pixels in condition j.

The method then continues to decision block 13260 where a test is performed to determine whether the method has already calculated the scores for all the regions of interest identified between terminal A and terminal B, specifically in block 13026. If the answer to the test at decision block 13260 is YES then the method continues to block 13262. Otherwise, if the answer to the test at decision block 13260 is NO, then the method proceeds back to terminal C and loops back to block 13258 where the above identified processing steps are repeated. At block 13262 the method stores the scores in a database which allows for future evaluations. The method then continues to exit terminal N. From terminal N (FIG. 13C), the method 13000 proceeds to a set of method steps 13016 defined between a continuation terminal ("terminal O") and an exit terminal ("terminal P") where biological candidates revealed by the classified scores are sent to researchers for further exploration. Proceeding beyond terminal P, the method 13000 terminates execution.

Figure 14A:
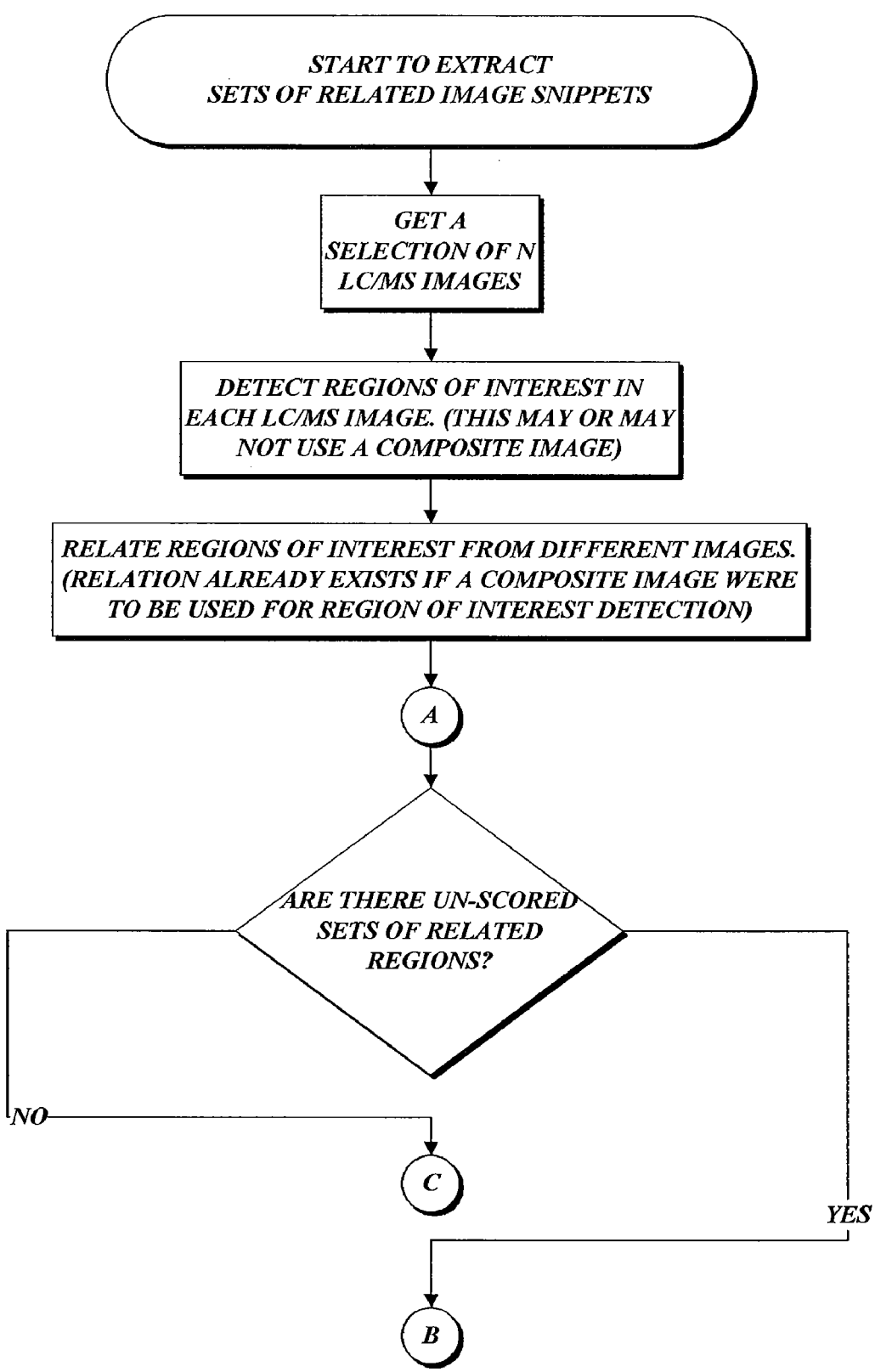
FIGS. 14A-14S are diagrams illustrating embodiments for processing regions of interest to discover biological features.
Figure 14B:
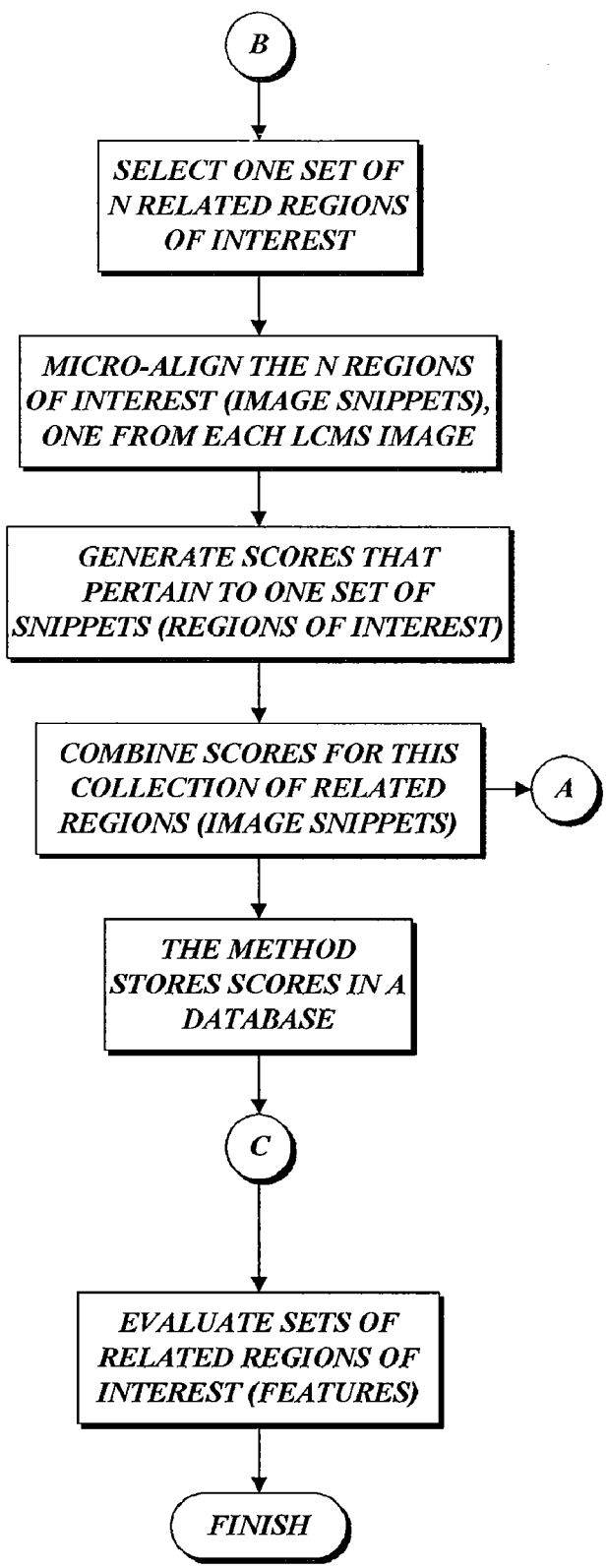
Figure 14C:
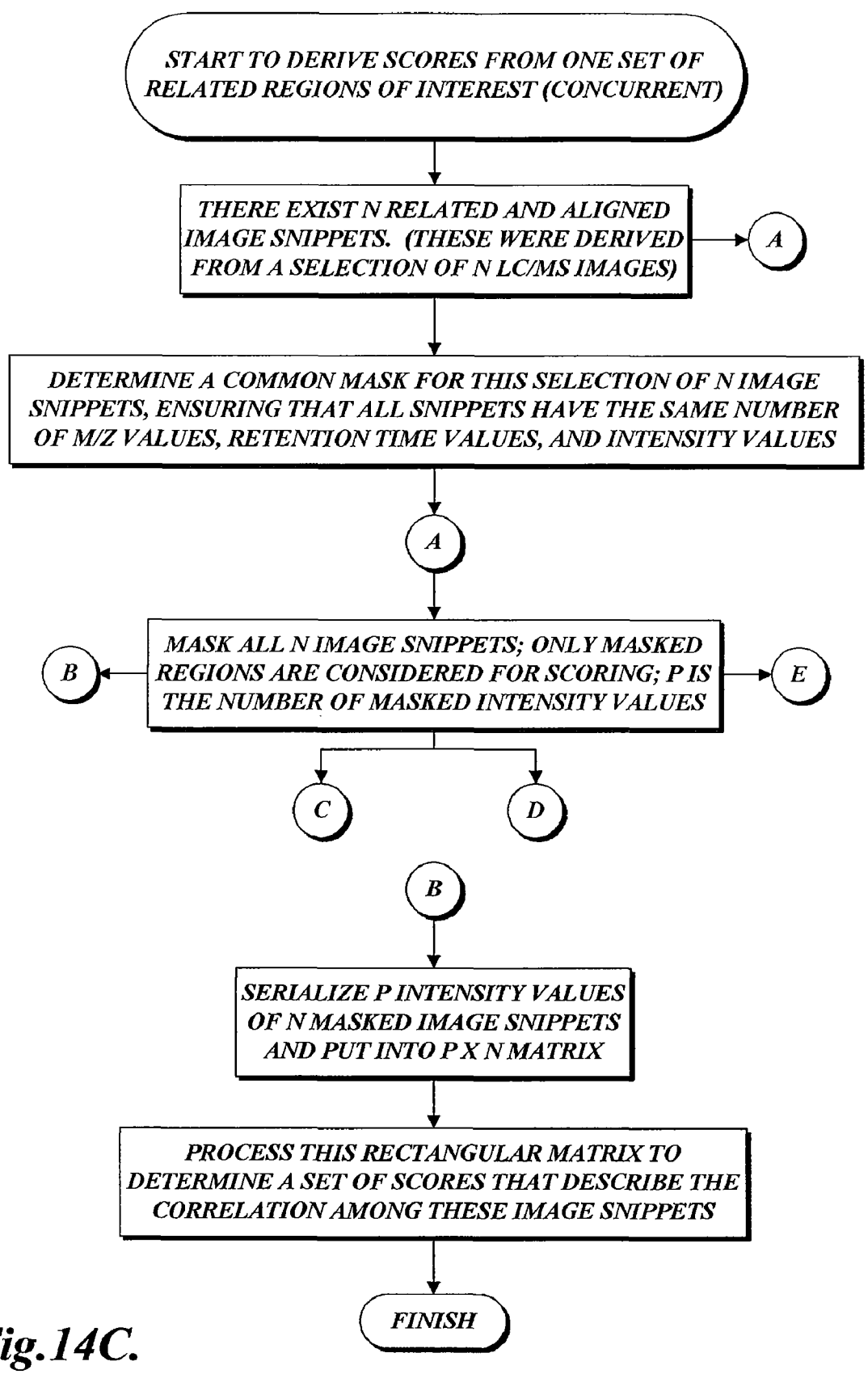
Figure 14D:
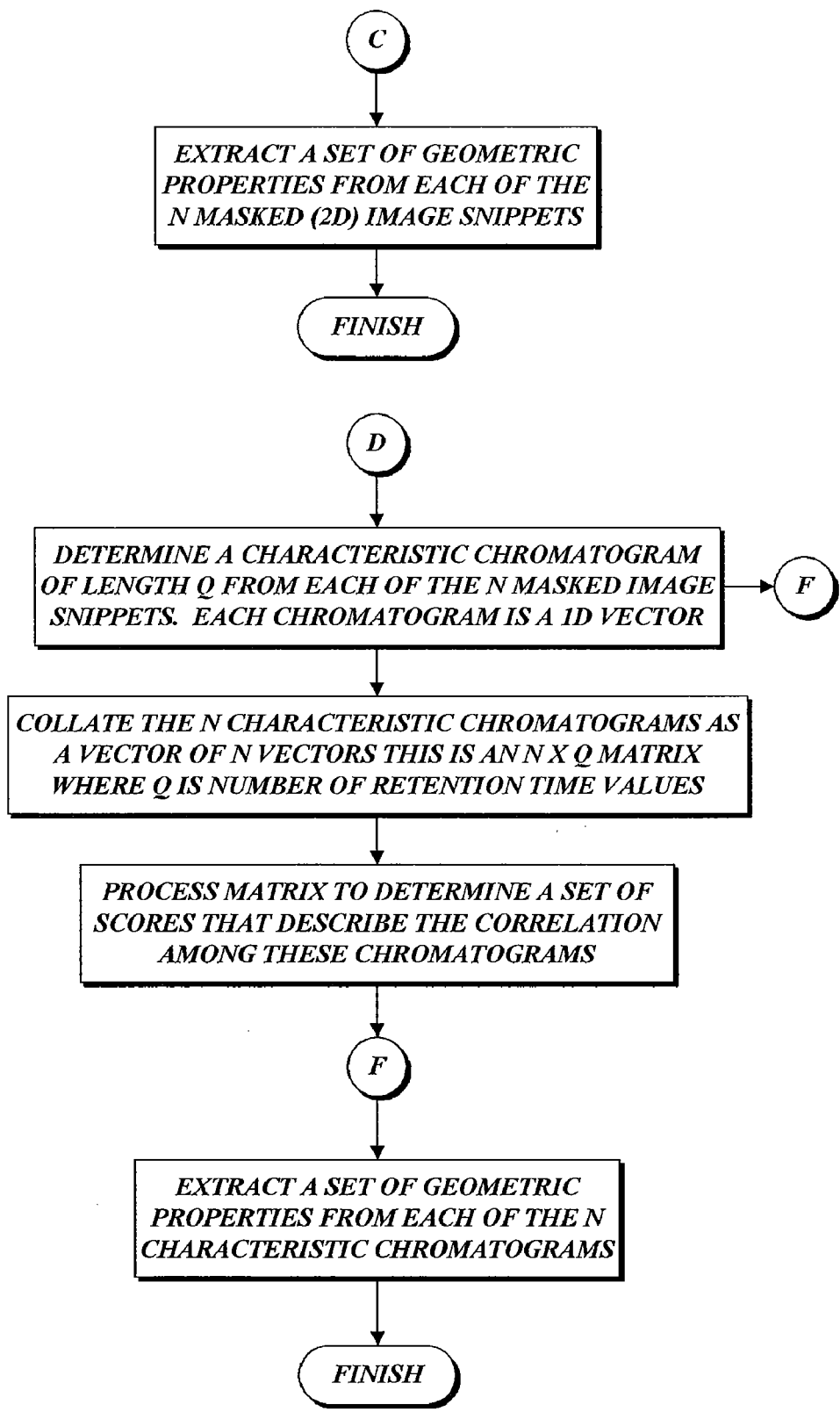
Figure 14E:
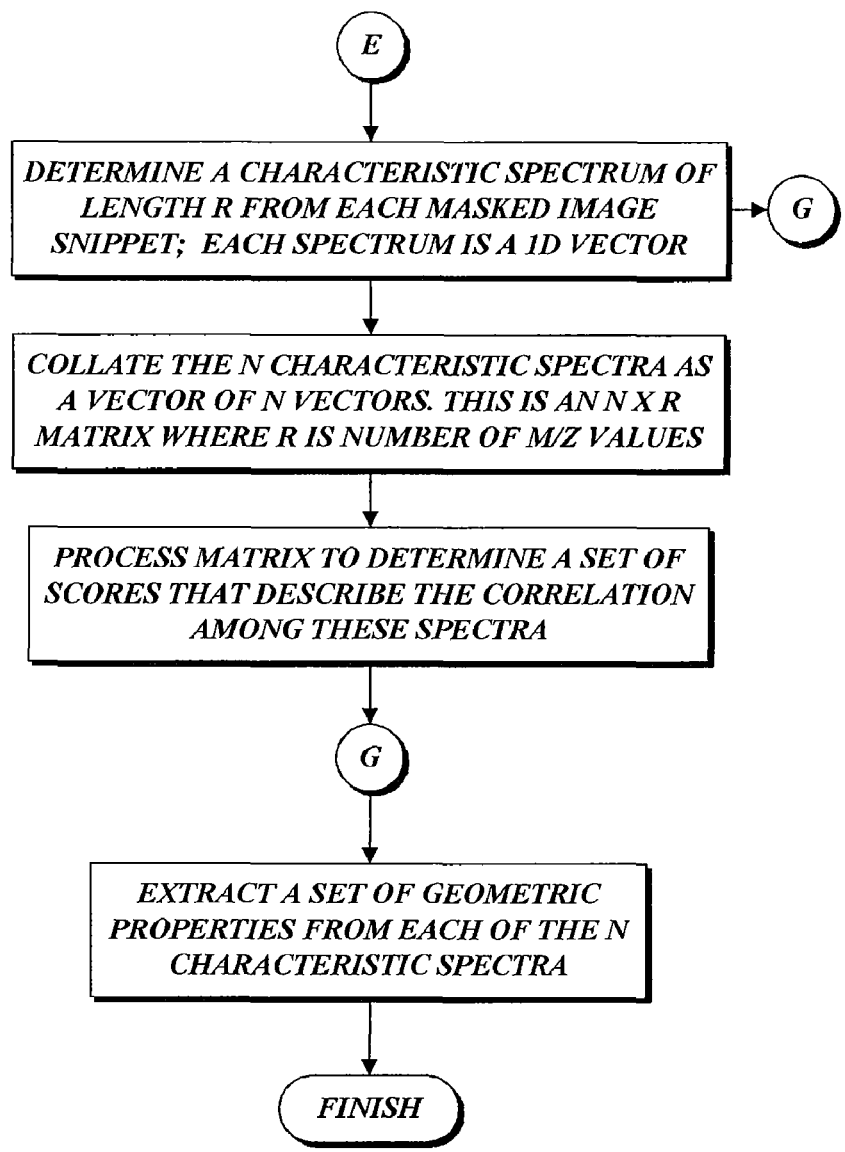
Figure 14F:
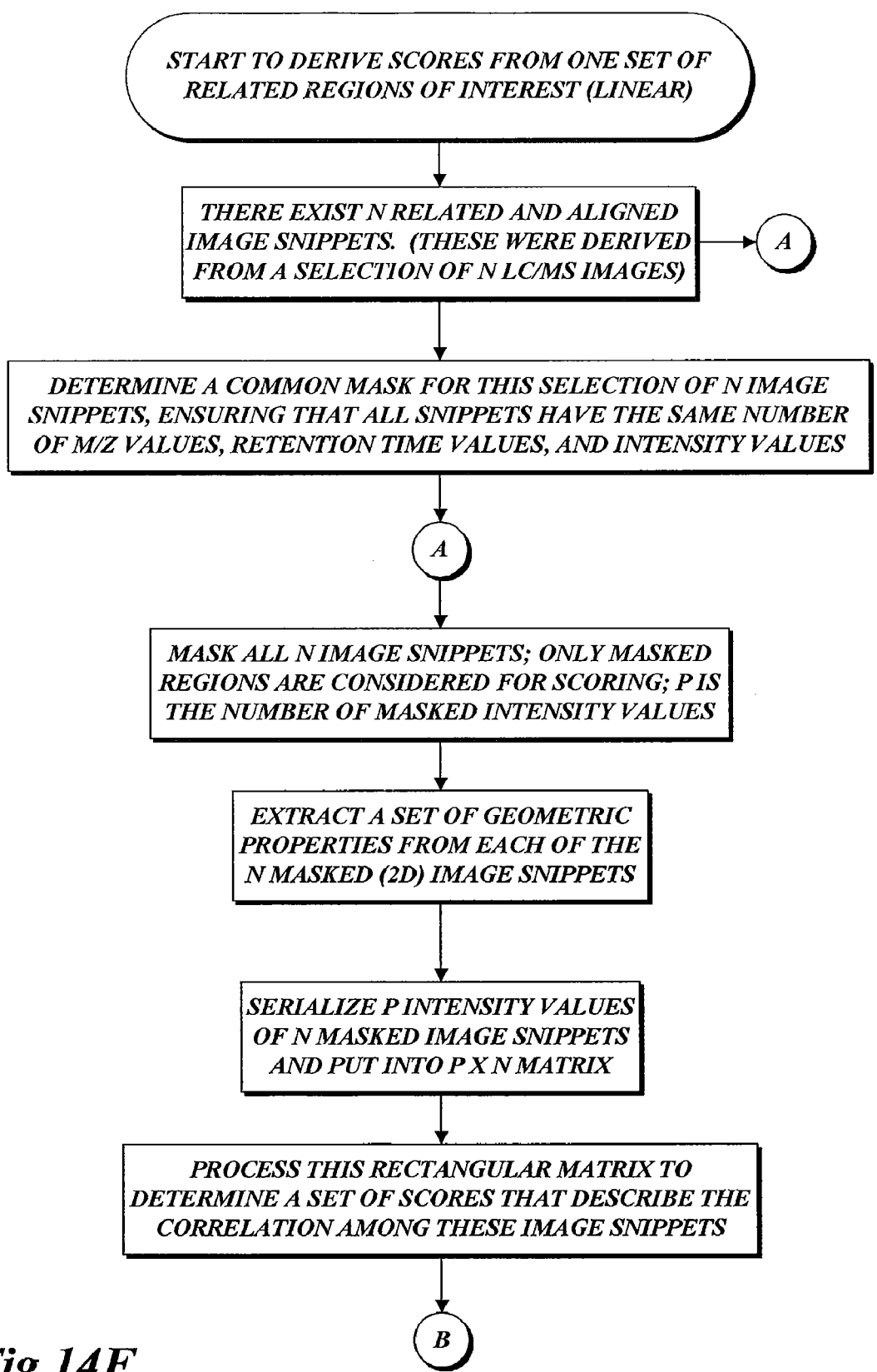
Figure 14G:
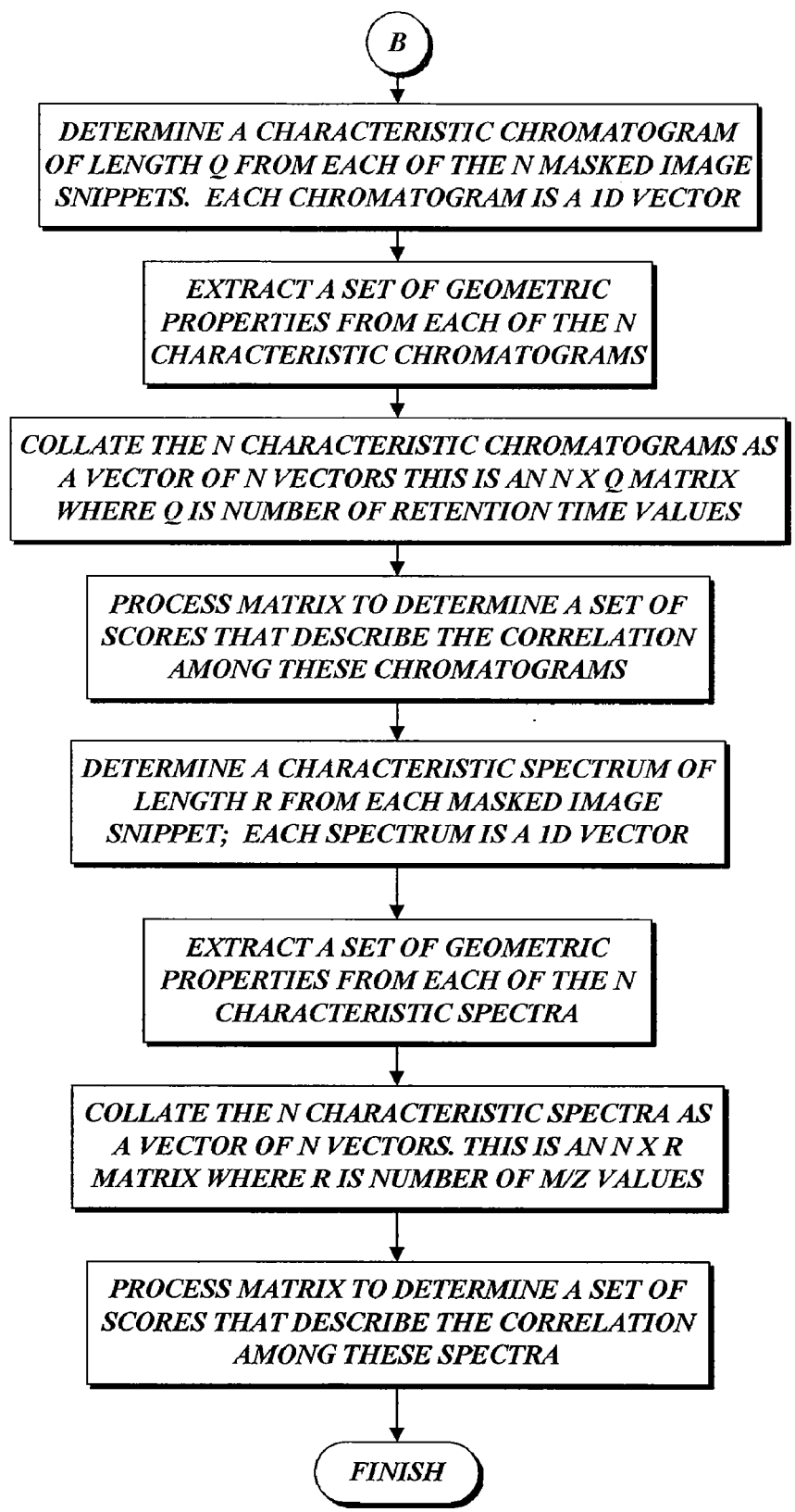
Figure 14H:
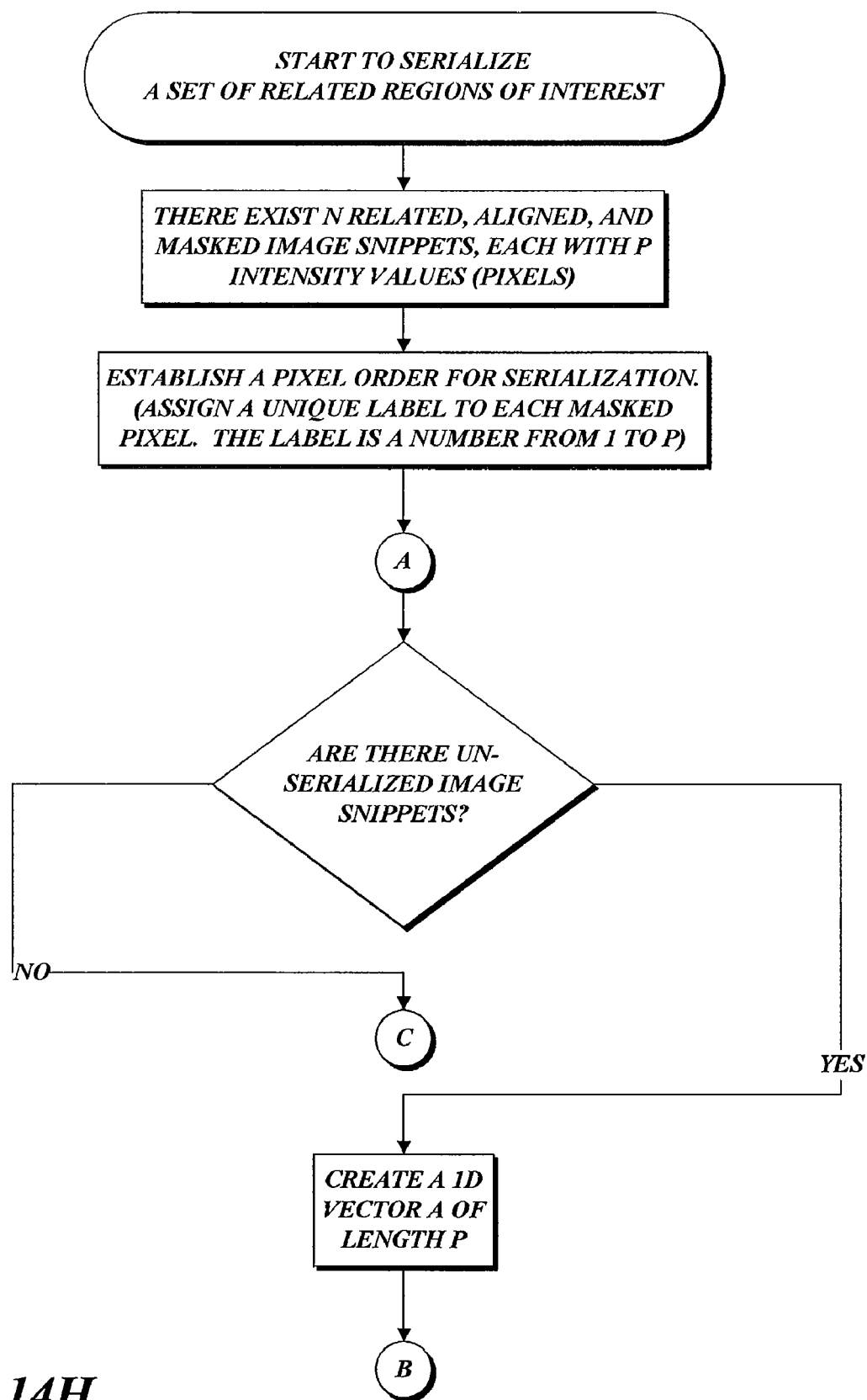
Figure 14I:
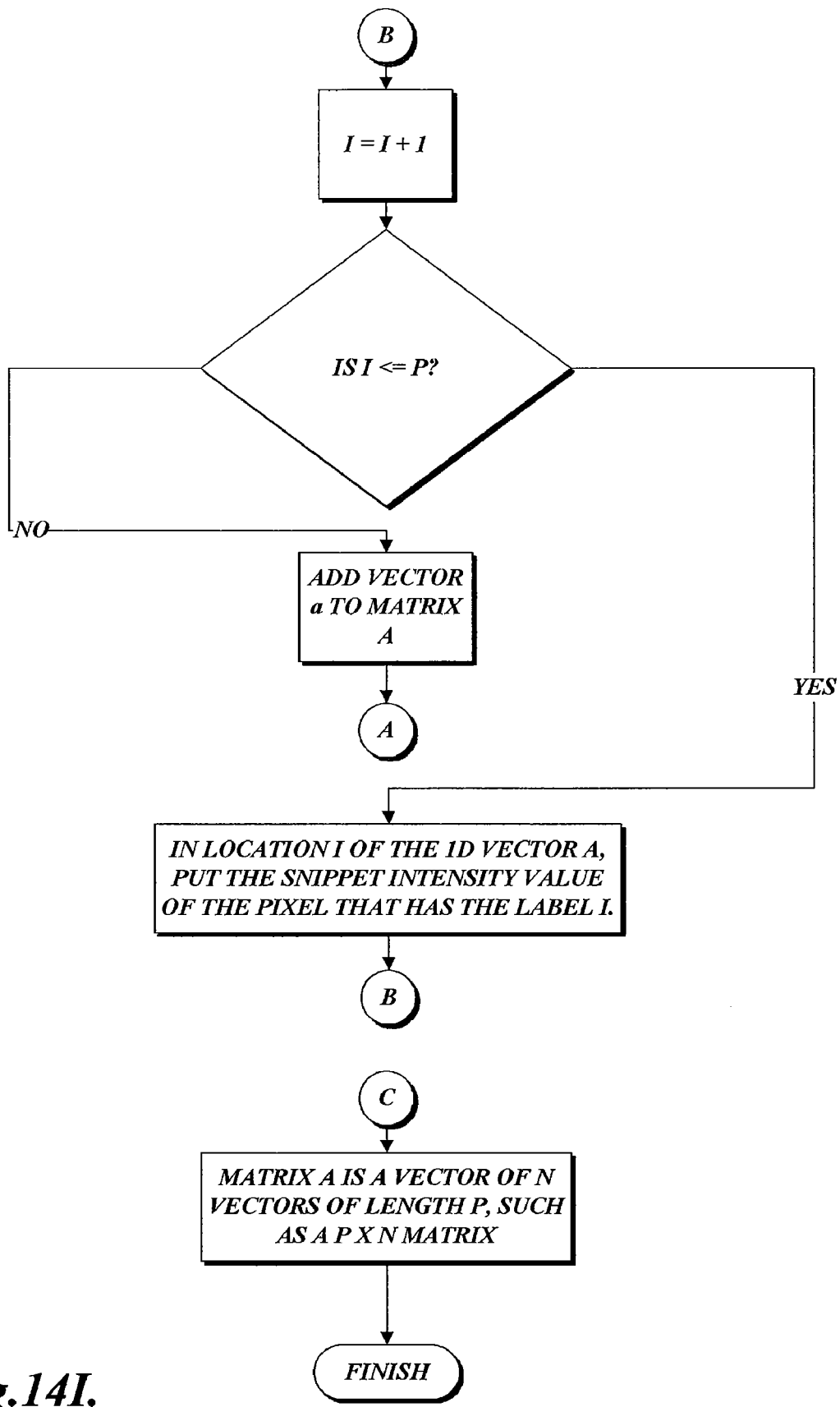
Figure 14J:
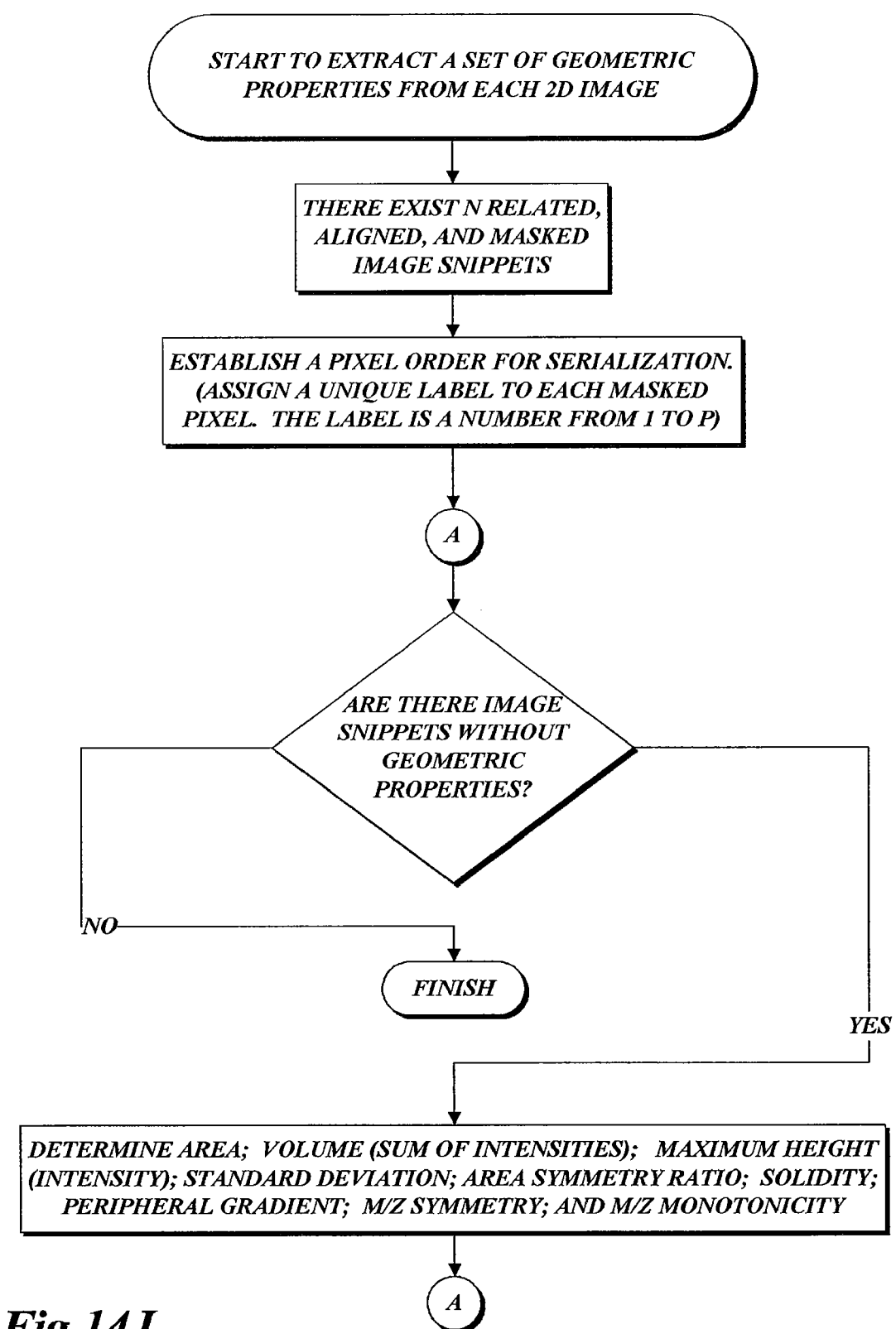
Figure 14L:
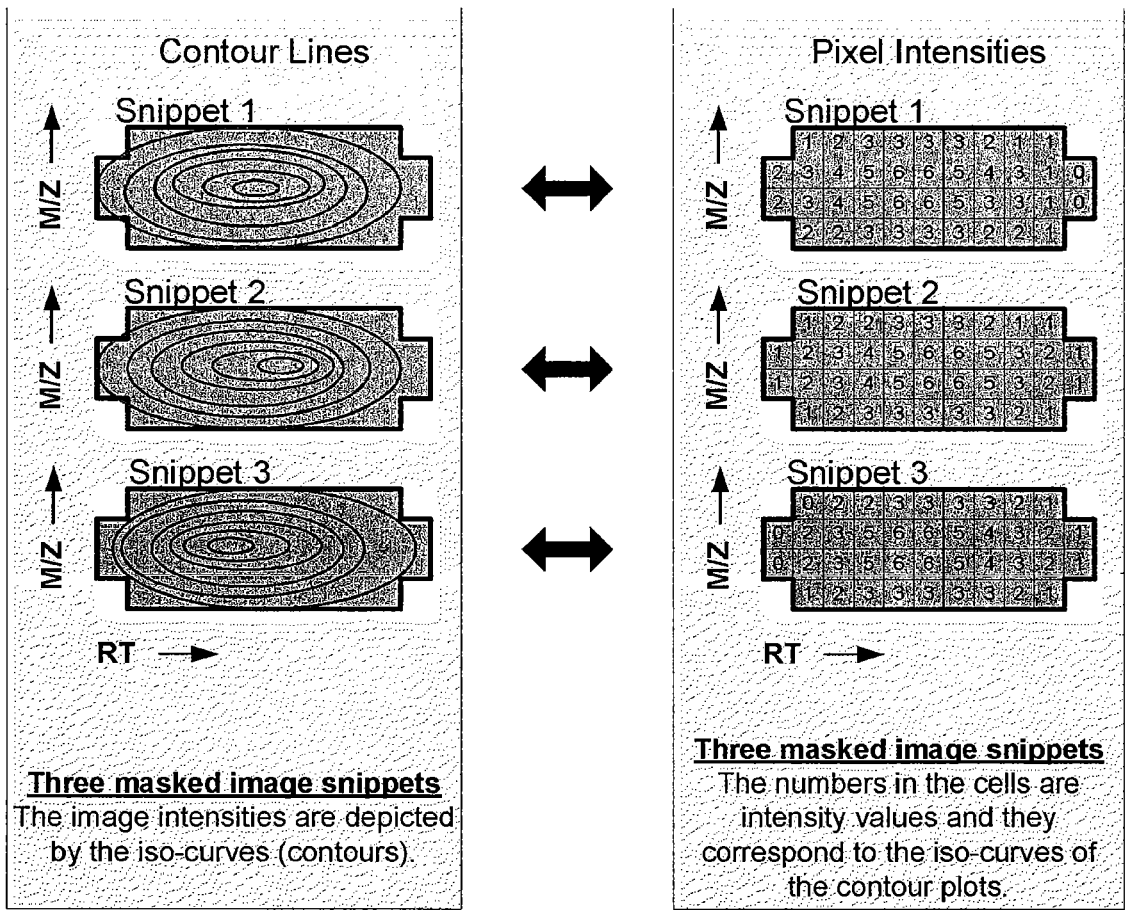
Figure 14M:
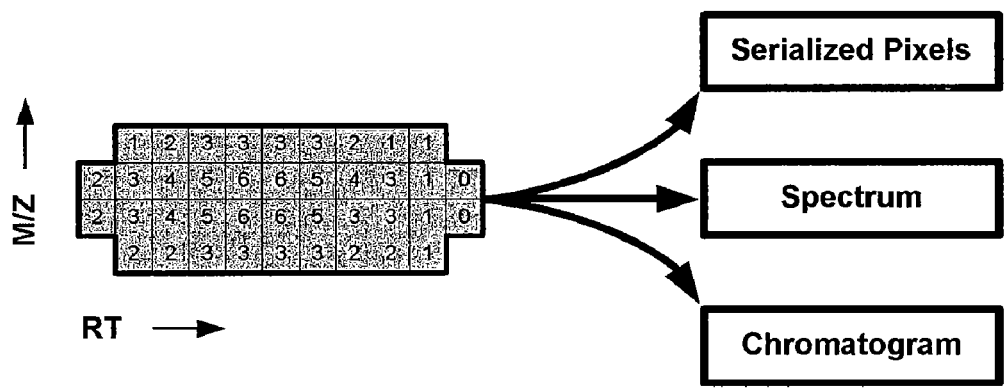
Figure 14N:
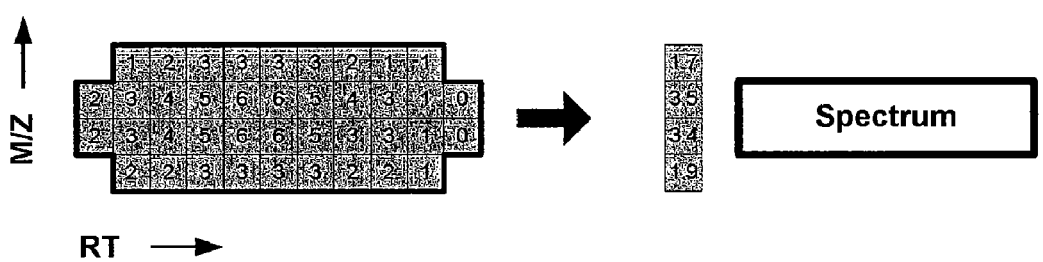
Figure 14O:
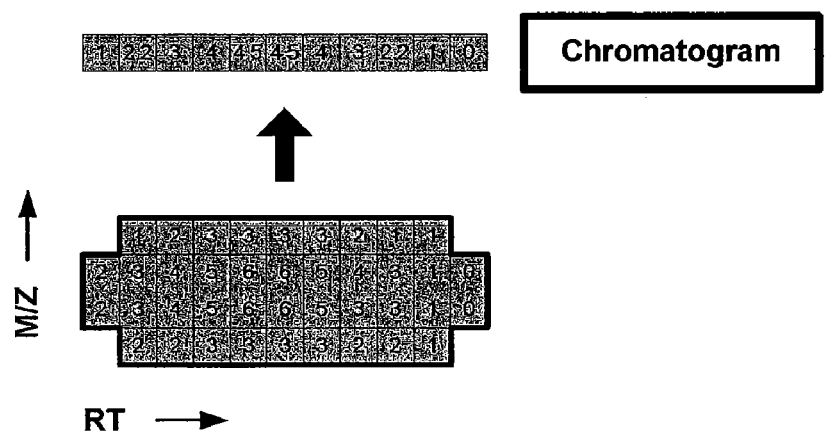
Figure 14P:
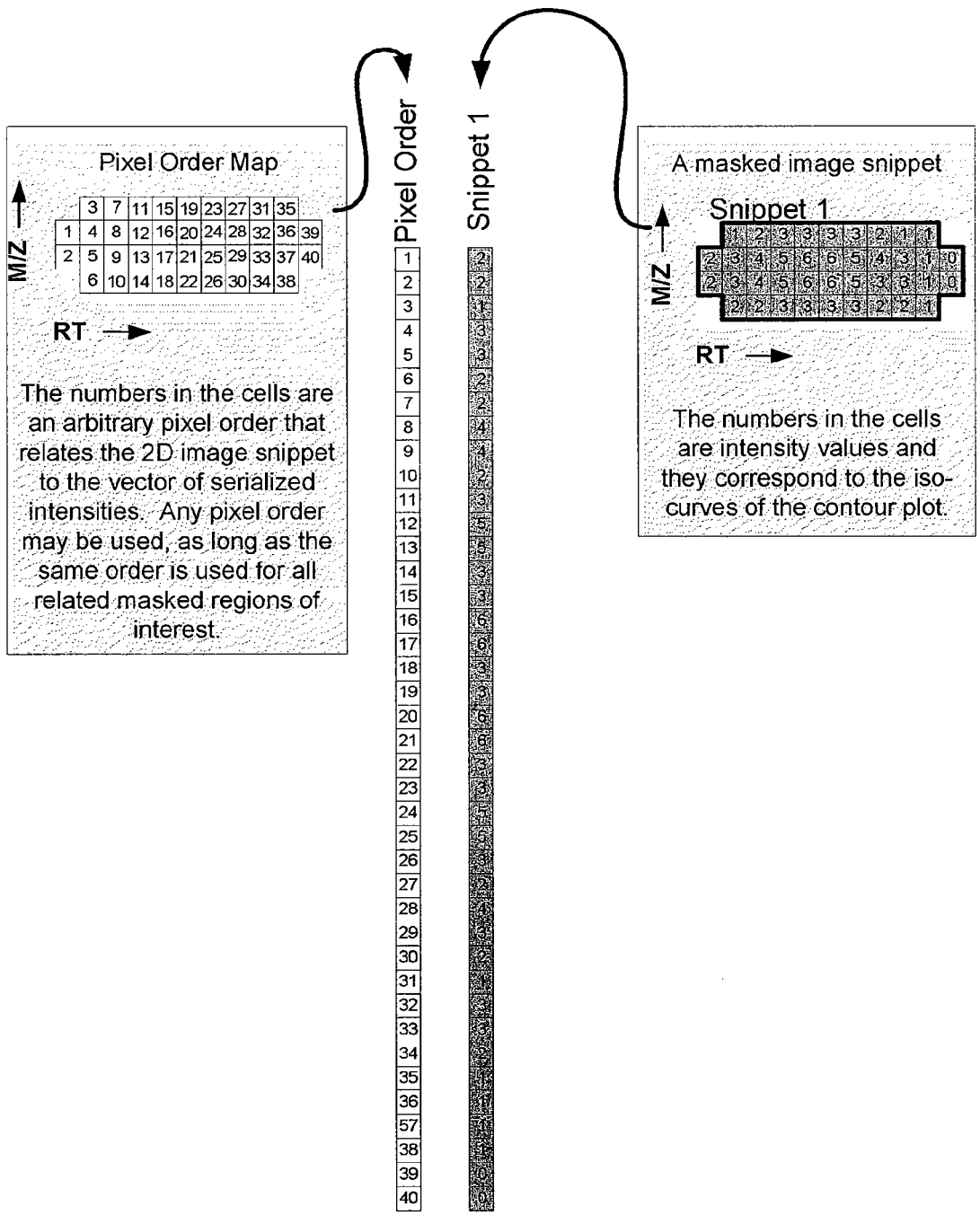
Figure 14Q:
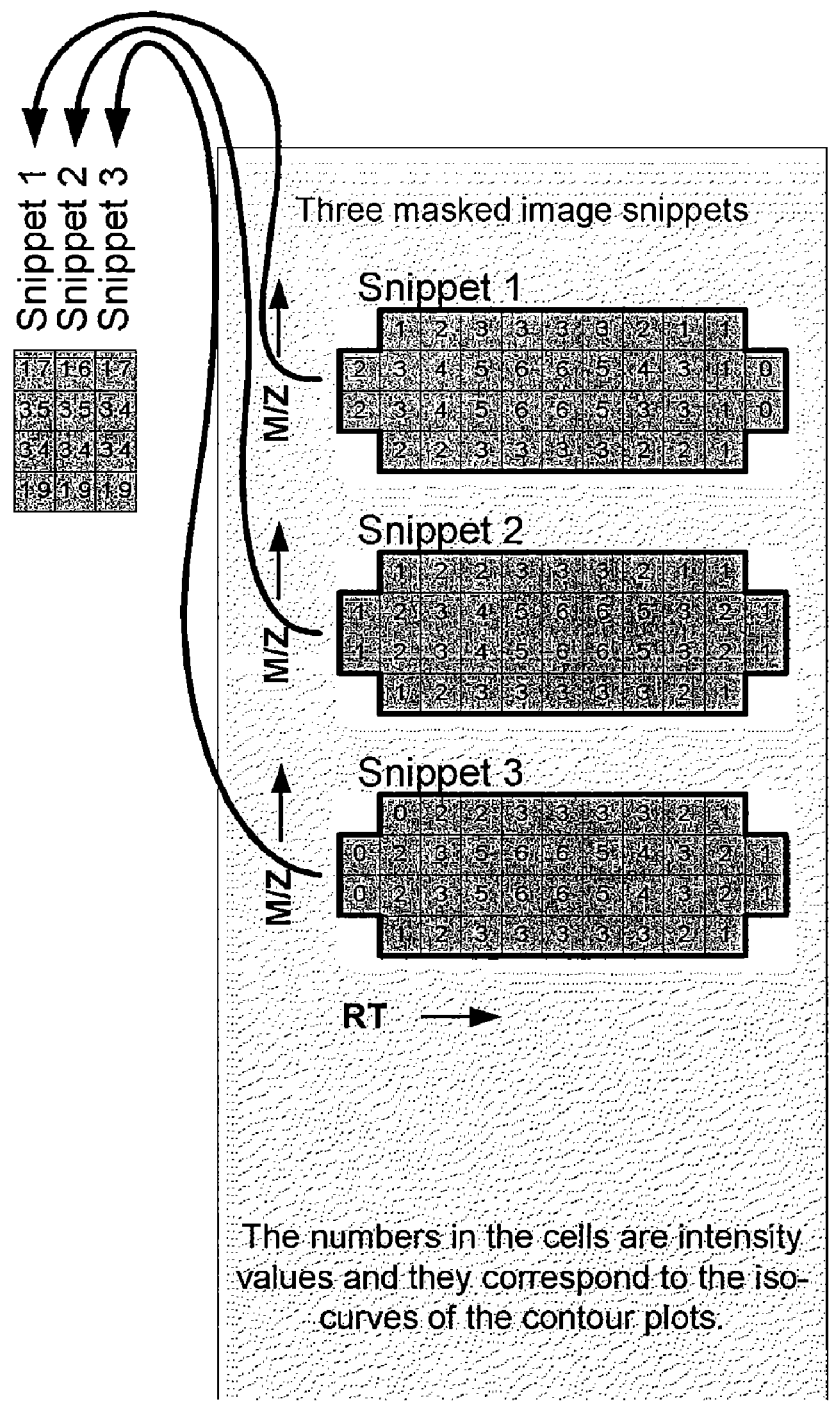
Figure 14R:
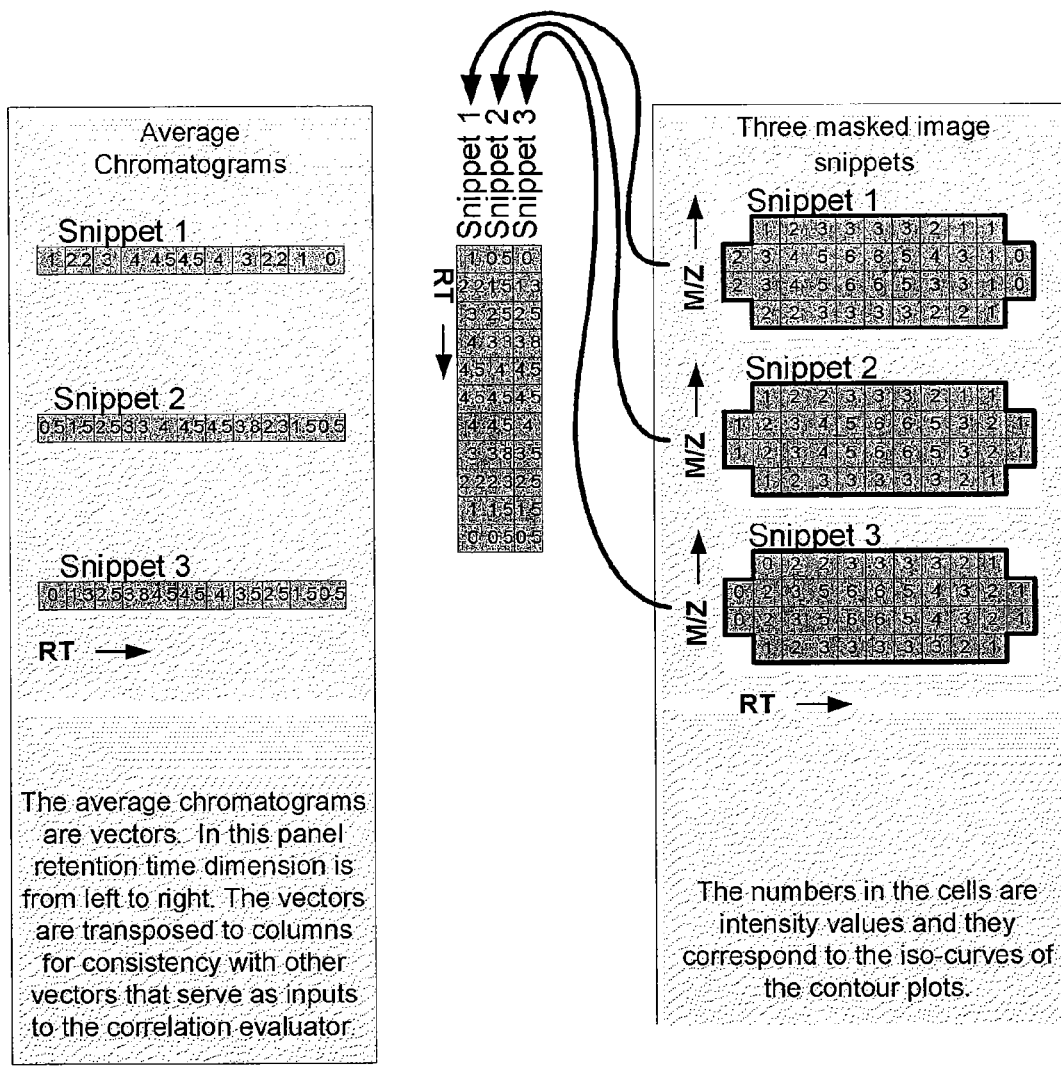
Figure 14S:
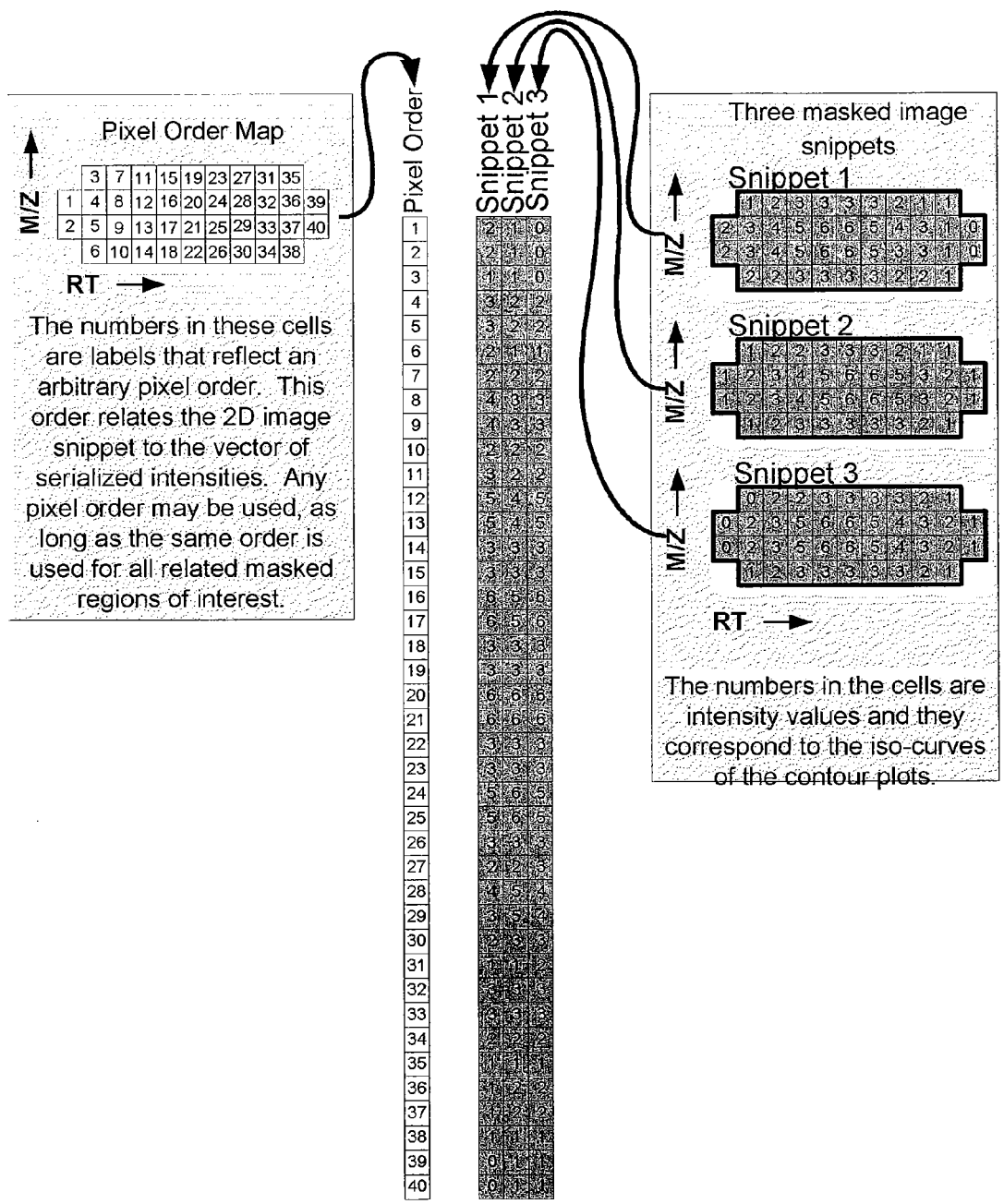

FIGS. 14A-14S illustrate other embodiments for processing regions of interest to discover biological features. FIGS. 14A, 14B illustrate that detected regions of interest are scored. A block in FIGS. 14A, 14B is shown in greater detail by FIGS. 14C-14E, which illustrate employment of concurrent execution branches to generate scores that pertain to one set of snippets (regions of interest). As an alternative to concurrent execution shown by FIGS. 14C-14E, FIGS. 14F, 14G illustrate a linear execution branch to generate scores that pertain to one set of snippets (regions of interest). FIGS. 14H, 14I illustrate a block in FIGS. 14C-14G in greater detail by showing steps connected with serializing P intensity values of N masked image snippets and put into P×N matrix. Specifically, input is a set of N equally masked images each with P intensity values. Each 2D image becomes a 1D vector. The vectors constitute a P×N matrix, where each column represents one of these images and each row represents comparable pixels. The output is this P×N Matrix. FIG. 14J illustrates a block in FIGS. 14C-14G in greater detail by showing steps connected with extracting a set of Geometric Properties from each of the N masked (2D) image snippets. Specifically, input is N equally masked image snippets.

The method determines G geometric properties from each image snippet. The output is N sets of G values.

FIG. 14K illustrates a masking process to define the region of interest. From these three corresponding snippets, each derived from a different image, a common mask is formed. The decision may be based on a composite of the three snippets and a new peak detection, which is regional redefinition. Alternately, the mask can be based on individual peak detections on the three snippets. FIG. 14L illustrates that image intensities can be depicted by the iso-curves (contours) or by pixel intensities and that these intensities can be masked. FIG. 14M illustrates that each masked 2D image snippet may be used to generate a characteristic chromatogram, a characteristic spectrum, and a serialized collection of the pixel intensities. FIG. 14N illustrates the process wherein an average m/z spectrum is derived from a masked 2D image snippet. FIG. 14O illustrates the process wherein an average chromatogram is derived from a masked 2D image snippet. FIG. 14P illustrates a serializing process to serialize a 2D image snippet into a 1D vector of pixel intensities. The numerical values of the pixel intensities may be strung together in a linear fashion. The order of the pixels must be consistent among the snippets. This vector will be correlated with other image snippets that were serialized in the same order. FIGS. 14Q-14S illustrate how image snippets from three images are processed into different matrices, each a suitable input to the correlation evaluator. FIG. 14Q illustrates a preparation process where each of the three columns is a vector. Each vector is the average mass spectrum of the masked image snippet. The three vectors together constitute a 2D matrix that is a suitable input to the correlation evaluator. FIG. 14R illustrates a preparation process where each of these three columns is a vector. Each vector is the average chromatogram of a different masked image snippet. The three vectors together constitute a 2D matrix that is a suitable input to the correlation evaluator. FIG. 14S illustrates a preparation process where each of these three columns is a vector. Each vector is an example of serialized pixel intensities from a different masked image snippet. The three vectors together constitute a 2D matrix that is a suitable input to the correlation evaluator.

While illustrative embodiments have been illustrated and described, it will be appreciated that various changes can be made therein without departing from the spirit and scope of the invention.

Figure 15:
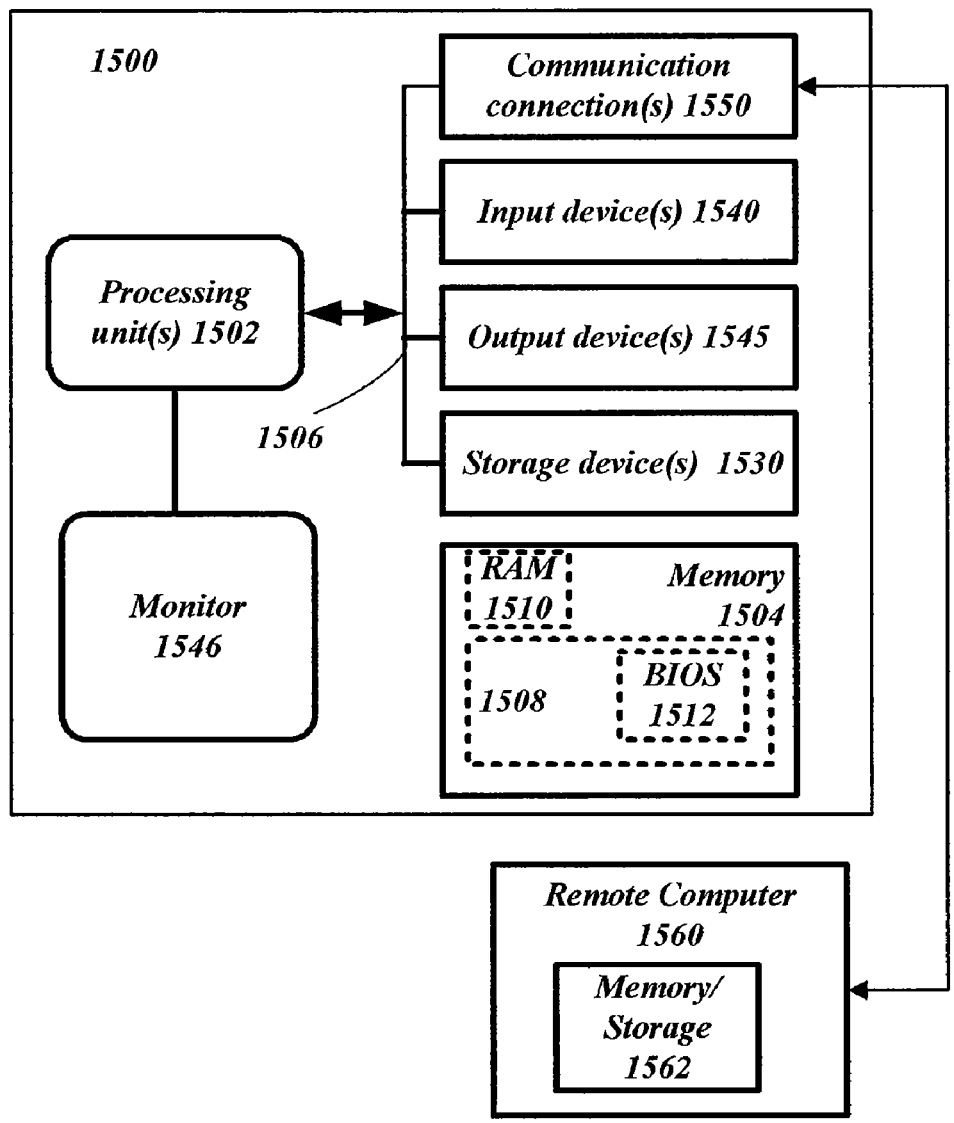
FIG. 15 is a schematic diagram illustrating representative hardware and a computing environment suitable for implementation of the disclosed methods.

A representative computing environment suitable for implementation of the above methods is shown in FIG. 15. FIG. 15 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 15, an exemplary system for implementing the disclosed technology includes a general purpose computing device in the form of an exemplary conventional PC 1500, including one or more processing units 1502, a system memory 1504, and a system bus 1506 that couples various system components including the system memory 1504 to the one or more processing units 1502. The system bus 1506 may be any of several types of bus structures including a memory bus or memory controller, a peripheral bus, and a local bus using any of a variety of bus architectures. The exemplary system memory 1504 includes read only memory (ROM) 1508 and random access memory (RAM) 1510. A basic input/output system (BIOS) 1512, containing the basic routines that help with the transfer of information between elements within the PC 1500, is stored in ROM 1508.

The exemplary PC 1500 further includes one or more storage devices 1530 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1506 by a hard disk drive interface, a magnetic disk drive interface, and an optical drive interface, respectively. The drives and their associated computer-readable media provide nonvolatile storage of computer-readable instructions, data structures, program modules, and other data for the PC 1500. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1530 including an operating system, one or more application programs, other program modules, and program data. A user may enter commands and information into the PC 1500 through one or more input devices 1540 such as a keyboard and a pointing device such as a mouse. Other input devices may include a digital camera, microphone, joystick, game pad, satellite dish, scanner, or the like. These and other input devices are often connected to the one or more processing units 1502 through a serial port interface that is coupled to the system bus 1506, but may be connected by other interfaces such as a parallel port, game port, or universal serial bus (USB). A monitor 1546 or other type of display device is also connected to the system bus 1506 via an interface, such as a video adapter. Other peripheral output devices, such as speakers and printers (not shown), may be included. In some examples, processed constituent image data is displayed or printed, or otherwise presented. In some examples, intermediate results can be displayed as well.

The PC 1500 may operate in a networked environment using logical connections to one or more remote computers, such as a remote computer 1560. In some examples, one or more network or communication connections 1550 are included. The remote computer 1560 may be another PC, a server, a router, a network PC, or a peer device or other common network node, and typically includes many or all of the elements described above relative to the PC 1500, although only a memory storage device 1562 has been illustrated in FIG. 15. The personal computer 1500 and/or the remote computer 1560 can be connected to a logical a local area network (LAN) and a wide area network (WAN). Such networking environments are commonplace in offices, enterprise-wide computer networks, intranets, and the Internet.

When used in a LAN networking environment, the PC 1500 is connected to the LAN through a network interface. When used in a WAN networking environment, the PC 1500 typically includes a modem or other means for establishing communications over the WAN, such as the Internet. In a networked environment, program modules depicted relative to the personal computer 1500, or portions thereof, may be stored in the remote memory storage device or other locations on the LAN or WAN. The network connections shown are exemplary, and other means of establishing a communications link between the computers may be used.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims. Alternatives specifically addressed in these sections are merely exemplary and do not constitute all possible alternatives to the embodiments described herein. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

APPENDIX

Regarding derivation of an assimilation scaling factor, and particularly assumptions and simplification, intensity (ion count) is presumed to be linear in respect to the eluting material whose data can be fitted to:

$$y = c + sx$$

An assumption is made that the peak is isolated and has no background besides noise. In other words, a presumption is made that at a given retention time and mass/charge only one species (ion) is available. To the extent that this assumption is not valid, the scored peak is less useful and this attribute will be reflected in a poorer fit with less correlation. Given these assumptions the linear correlation can be simplified to a fit to a linear function with an intercept at the origin and a positive slope:

$$y = sx; \; s > 0$$

In regard to the general error model, the error E can be modeled using the discrepancies of the points $(x_i, y_i)$ from this linear relationship. $E_i$ is the part of the error based on the discrepancy at point i given a slope s as described by function $f$.

$$E_{i(s)} = f(x_i, y_i)$$

$E_{(s)}$ is the error of the fit of the line to the points $(x_i, y_i)$ given a slope s.

$$E_{(s)} = \sum_i E_{i(s)}$$

Regarding the error solutions, error minimization is modeled by:

$$\frac{dE_{(s)}}{ds} = 0$$

The scaling factor s is solved as follows:

| Error Model | Slope | Comments |
|---|---|---|
| $E_i(s) = \|\Delta x_i \Delta y_i\|$; | $s = \sqrt{\dfrac{\sum_i y_i^2}{\sum_i x_i^2}}$ | |
| $E_i(s) = \Delta x_i^2$; | $s = \dfrac{\sum_i y_i^2}{\sum_i x_i y_i}$ | |
| $E_i(s) = \Delta d_i^2$; | $s = \dfrac{\sum_i y_i^2}{\sum_i x_i y_i}$  $d_i = \dfrac{sx_i + c - y_i}{\sqrt{1+s^2}}$ | $d_i$ is shortest distance between $(x_i, y_i)$ and $y = c + sx$ |
| $E_i(s) = \Delta y_i^2$; | $s = \dfrac{\sum_i x_i y_i}{\sum_i x_i^2}$ | |

Values can be set in one constituent vector to $x_i$ and the values of the consensus vector to $y_i$. Given that "assimilate" x to y is desired by scaling with s, an assumption can be made that the error lies within $x_i$. Therefore, generally the scaling factor is chosen as:

$$s = \frac{\sum_i y_i^2}{\sum_i x_i y_i}$$

Regarding an elaboration on a specific error model, the scaling factor can be derived for a linear assimilation that presumes an intercept at the origin and an error of $$E = \left|\sum_i (\Delta x_i \Delta y_i)\right|.$$

The error of a fit for a linear function can be estimated with a positive slope that goes through the origin. The error of a fit to this function can be estimated by the collection of points $(x_i, y_i)$. The discrepancies in x and y values may be given as:

$$\Delta y_i = |sx_i - y_i|$$
$$\Delta x_i = \left|\frac{y_i}{s} - x_i\right|$$

The error can be found:

$$E = \left|\sum_i (\Delta x_i \Delta y_i)\right| = \frac{1}{|s|}\sum_i y_i^2 + |s|\sum_i x_i^2 + \left|\sum_i (x_i y_i)\right|$$

The change in error (E) in respect to slope (s) is:

$$\frac{dE}{ds} = \sum_i \left(x_i^2 - \frac{y_i^2}{s^2}\right)$$

By setting $$\frac{dE}{ds}$$

to zero, it can be found:

$$|s| = \sqrt{\frac{\sum_i y_i^2}{\sum_i x_i^2}}.$$

We claim:

1. A region of interest processor, comprising:
a data selector configured to select regions of interest in a set of at least two constituent images;
a microaligner configured to align the selected regions of interest; and
an evaluator configured to produce an evaluation score based on the microaligned regions of interest, wherein the evaluator is at least one of a geometric scorer configured to score geometric properties of the microaligned regions of interest or a correlation evaluator configured to produce a correlation score based on the microaligned regions of interest, wherein the correlation score is associated with a reliability of a common variation in the regions of interest.

2. The region of interest processor of claim 1, wherein the data selector is configured to select a set of constituent images from a group consisting of chromatography/mass spectrometry images associated with a single treatment condition, a single biological variation, multiple treatment conditions, and multiple biological variations.

3. The region of interest processor of claim 1, further comprising a region of interest detector configured to redefine boundaries of the microaligned regions of interest.

4. The region of interest processor of claim 3, further comprising a data extractor configured to generate a two dimensional mask and produce redefined regions of interest based on the two dimensional mask.

5. The region of interest processor of claim 1, further comprising a geometric scorer configured to score geometric properties of one or more constituent images selected based on at least one of retention time symmetry, retention time monotonicity from a peak apex, area, volume, maximum height, standard deviation, area symmetry ratio, mass/charge symmetry, mass/charge monotonicity from the peak apex, solidity, peripheral gradient, and tangent volume ratio.

6. The region of interest processor of claim 1, further comprising a score combiner configured to combine at least one of geometric scores and correlation scores.

7. The region of interest processor of claim 6, further comprising a score classifier configured to rank scores so as to classify features of interest.

8. A method for processing regions of interest, comprising:
microaligning set of at least two corresponding regions of interest to each other, wherein each region of interest is from a different constituent image; and calculating a correlation score based on a set of regions of interest; and storing the correlation score.

9. The method of claim 8, wherein the regions of interest are represented as pixel arrays, wherein each pixel is associated with at least first and second coordinate values and an intensity, and further comprising serializing pixels in the regions of interest to form a two dimensional array in which a first dimension is indicative of a number of constituent images serialized and a second dimension is indicative of a number of serialized intensities, wherein the correlation score is calculated based on the serialized intensities.

10. The method of claim 9, wherein the serialized intensities associated with the regions of interest define corresponding constituent vectors, and further comprising calculating a consensus vector that represents a central tendency based on the constituent vectors, the consensus vector being calculated as an arithmetic mean or an arithmetic median.

11. The method of claim 10, wherein the constituent images are chromatography/mass spectrometry images.

12. The method of claim 11, further comprising producing an aggregated chromatogram by combining pixel intensities associated with a plurality of mass to charge ratios for each chromatographic retention time.

13. The method of claim 11, further comprising serializing the pixels arrays based on a common random order.

14. The method of claim 11, further comprising producing an aggregated mass spectrogram by combining pixel intensities for a plurality of retention times for each mass to charge ratio.

15. A computer-readable medium having computer-executable instructions stored thereon for implementing a method for processing regions of interest in constituent images associated with multi-dimensional separations, comprising:

microaligning a set of at least two regions of interest to each other, wherein each region of interest is from a different constituent image; and calculating a correlation score for masked pixels in the regions of interest, the correlation score indicating reliability of a variation in the regions of interest.

16. The computer-readable medium of claim 15, wherein the method further comprises expanding a width of each region of interest backward and forward in the retention time dimension by a selected width expansion factor.

17. The computer-readable medium of claim 16, wherein the method further comprises identifying a master snippet for microalignment of regions of interest.

18. The computer-readable medium of claim 16, further comprising determining a shift quantity that provides a correlation using a metric selected from a group consisting of normalized cross-correlation maximum, linear correlation coefficient maximum, and normalized least square difference minimum.

19. The computer-readable medium of claim 15, wherein the method further comprises determining that a correlation-based shift quantity is unavailable, and microaligning based on centroid alignment or adaptive alignment.

20. The computer-readable medium of claim 15, wherein the method further comprises calculating a correlation score associated with a probability of a linear correlation based on a null hypothesis test.

* * * * *